United States Patent
Ochi et al.

(10) Patent No.: US 9,745,914 B2
(45) Date of Patent: Aug. 29, 2017

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventors: Yuta Ochi, Susono (JP); Toshimi Kashiwagura, Susono (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 124 days.

(21) Appl. No.: 14/921,380

(22) Filed: Oct. 23, 2015

(65) Prior Publication Data

US 2016/0115895 A1 Apr. 28, 2016

(30) Foreign Application Priority Data

Oct. 27, 2014 (JP) .................................. 2014-218251
Sep. 11, 2015 (JP) .................................. 2015-179905

(51) Int. Cl.
*F02D 41/40* (2006.01)
*F02D 41/30* (2006.01)
(Continued)

(52) U.S. Cl.
CPC .......... *F02D 41/403* (2013.01); *F02B 23/101* (2013.01); *F02D 41/0007* (2013.01);
(Continued)

(58) Field of Classification Search
CPC .............................. F02D 41/402; F02D 41/403
(Continued)

(56) References Cited

U.S. PATENT DOCUMENTS 7,219,002 B2 * 5/2007 Negishi ............... F02D 41/0007
60/601
7,870,845 B2 * 1/2011 Sasaki .................. F02D 35/024
123/299

FOREIGN PATENT DOCUMENTS

| JP | 2001-159356 A | 6/2001 |
| JP | 2002-276442 A | 9/2002 |
| JP | 2003-254105 A | 9/2003 |

* cited by examiner

*Primary Examiner* — Erick Solis
*Assistant Examiner* — Robert Werner
(74) *Attorney, Agent, or Firm* — Andrews Kurth Kenyon LLP

(57) ABSTRACT

An object is to improve the combustion condition in an internal combustion engine equipped with a supercharger and performing diesel combustion using fuel having a relatively high self-ignition temperature in an operation state in which the engine load is increased or decreased. A control apparatus performs first injection during the compression stroke, causes spray guide combustion to occur, and starts to perform second injection at such a second injection time that combustion of injected fuel is started by flame generated by the spray guide combustion, thereby causing self-ignition and diffusion combustion of fuel to occur. During a response delay period in changing the boost pressure when changing the engine load of the internal combustion engine to a target engine load, the ratio of the quantity of fuel injected by the first injection to the total fuel injection quantity in one combustion cycle is made higher than the ratio of the quantity of fuel injected in the first injection to the total fuel injection quantity in one combustion cycle during the time when the engine load is equal to the target engine load and the actual boost pressure is equal to a target boost pressure corresponding to the target engine load.

6 Claims, 20 Drawing Sheets

(51) Int. Cl.
*F02B 23/10* (2006.01)
*F02P 5/15* (2006.01)
*F02D 41/00* (2006.01)
F02D 41/10 (2006.01)
F02D 41/12 (2006.01)
F02B 75/12 (2006.01)

(52) U.S. Cl.
CPC ..... *F02D 41/3017* (2013.01); *F02D 41/3023* (2013.01); *F02D 41/402* (2013.01); *F02P 5/1504* (2013.01); F02B 2023/102 (2013.01); F02B 2023/103 (2013.01); F02B 2075/125 (2013.01); F02D 41/10 (2013.01); F02D 41/12 (2013.01); F02D 41/3041 (2013.01); F02D 41/401 (2013.01); F02D 41/405 (2013.01); F02D 2200/0406 (2013.01); Y02T 10/123 (2013.01); Y02T 10/125 (2013.01); Y02T 10/144 (2013.01); Y02T 10/44 (2013.01); Y02T 10/46 (2013.01)

(58) Field of Classification Search
USPC ..... 13/299, 559.1, 559.2; 701/103, 104, 110
See application file for complete search history.

FUEL SPRAY

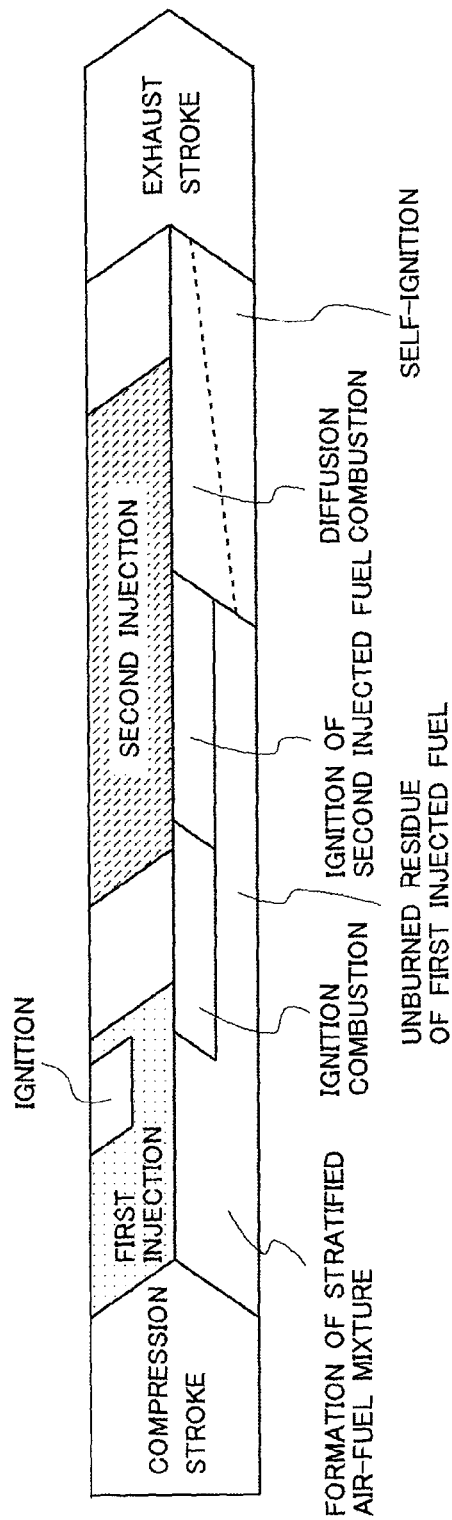
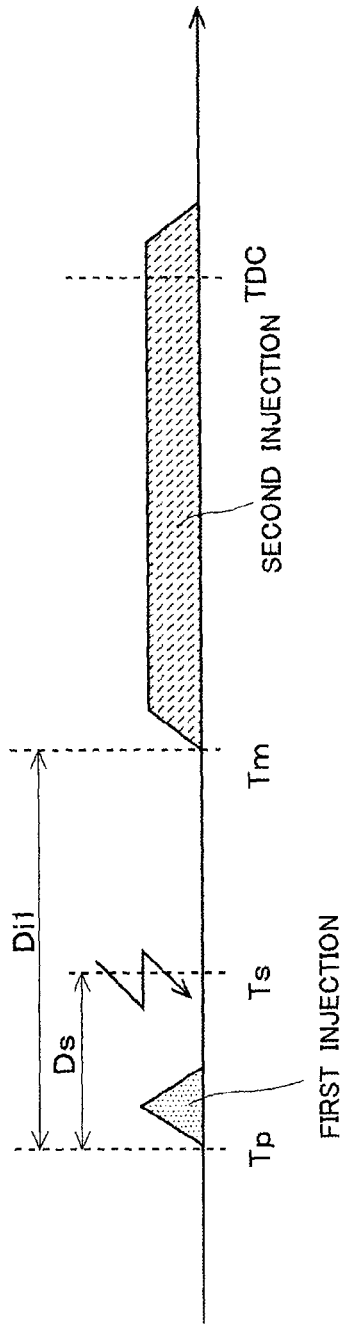
Fig. 3A
Fig. 3B

Fig. 17A
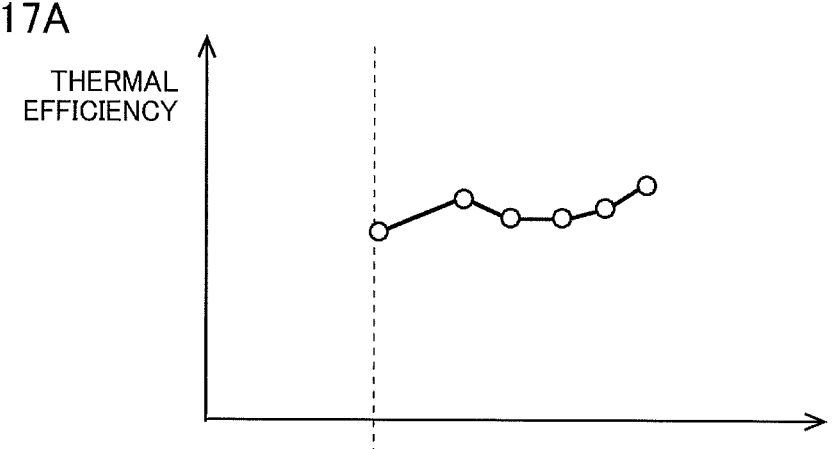
Fig. 17B
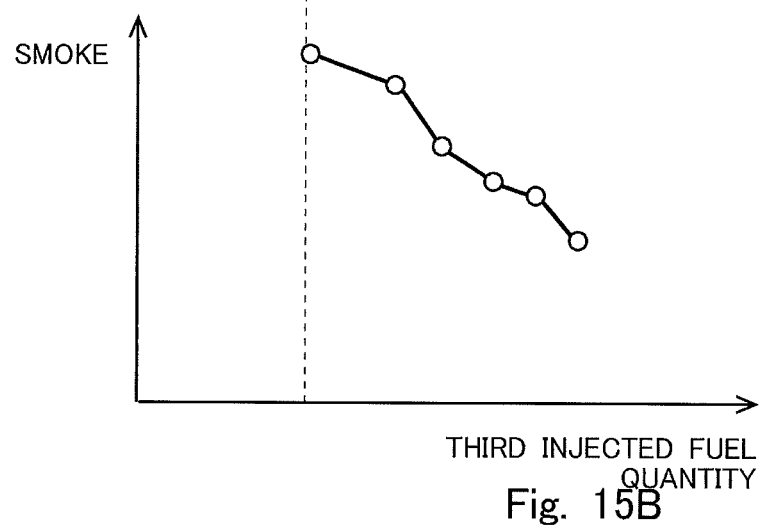
Fig. 15B

CONTROL APPARATUS FOR INTERNAL COMBUSTION ENGINE

TECHNICAL FIELD

The present invention relates to a control apparatus for an internal combustion engine equipped with a supercharger.

BACKGROUND ART

What is called diesel combustion, in which fuel is directly injected into compressed air in the combustion chamber, self-ignites, and is burned by diffusion combustion, has a higher thermal efficiency as compared to combustion by spark ignition. In recent years, in order to enjoy this advantage of diesel combustion also in gasoline engines, technology for causing gasoline to self-ignite and burn by diffusion combustion has been developed.

For example, in the technology disclosed in PTL 1, a first fuel injection is performed by a fuel injection valve in a cylinder during the first half of the compression stroke to form substantially homogeneous air-fuel mixture in the entirety of the combustion chamber. Then, the air-fuel mixture formed by the first fuel injection is spark-ignited. Thereafter, a second fuel injection is performed, and the injected fuel is burned. Moreover, the remaining fuel self-ignites with a rise in the temperature and pressure in the combustion chamber resulting from the burning.

PTL 2 discloses a technology enabling diesel combustion using as fuel natural gas or the like having a relatively high self-ignition temperature. According to PTL 2 disclosing this technology, fuel injection is performed in a predetermined spark-ignition region in the combustion chamber in an early or middle stage of the compression stroke to form air-fuel mixture that can be spark-ignited. Then, the air-fuel mixture formed in the spark-ignition region is ignited at a time immediately before the top dead center of the compression stroke to bring about combustion by spark ignition. Thus, a high-temperature, high-pressure condition enabling self-ignition of natural gas is established in the combustion chamber. Thereafter, fuel is injected directly into the combustion chamber in a high-temperature, high-pressure condition, so that the injected fuel is burned by diesel combustion.

In the case where an internal combustion engine that performs diesel combustion is equipped with a supercharger for supercharging the intake air, when the internal combustion engine is in an operation state in which the engine load is increased or decreased, there is a response delay in changing the boost pressure (supercharged pressure) in response to a change in the fuel injection quantity. If the air-fuel ratio of air-fuel mixture deviates from a desired range due to such a response delay in changing the boost pressure, there may arise a possibility of increase in the amount of smoke generated and a possibility of instable diesel combustion. PTL 3 discloses a technology for solving this problem arising in the operation state in which the engine load is increased or decreased in a supercharged diesel engine. More specifically, in the technology disclosed in PTL 3, gradual control by which the fuel injection quantity is changed gradually during transient operation.

CITATION LIST

Patent Literature

PTL 1: Japanese Patent Application Laid-Open No. 2002-276442

PTL 2: Japanese Patent Application Laid-Open No. 2003-254105

PTL 3: Japanese Patent Application Laid-Open No. 2001-159356

SUMMARY OF INVENTION

Technical Problem

An object of the present invention is to improve the combustion condition in an internal combustion engine equipped with a supercharger and performing diesel combustion using fuel having a relatively high self-ignition temperature, such as gasoline, in an operation state in which the engine load is increased or decreased.

Solution to Problem

In the apparatus according to the present invention, first injection is performed during the compression stroke by a fuel injection valve capable of injecting fuel into the combustion chamber of the internal combustion engine, and the fuel injected by the first injection (which will be sometimes referred to as the "first injected fuel") is ignited by spark ignition. Thereafter, second injection that mainly determines the power of the internal combustion engine is started at a time before the top dead center of the compression stroke. As a consequence, combustion of the fuel injected by the second injection (which will be sometimes referred to as the "second injected fuel") is started by flame generated by spark ignition of the first injected fuel, and self-ignition and diffusion combustion of fuel occur.

In the present invention, during a response delay period in changing the boost pressure when changing the engine load of the internal combustion engine to a target engine load, the ratio of the first injected fuel quantity to the total fuel injection quantity in one combustion cycle is made larger than the ratio of the first injected fuel quantity to the total fuel injection quantity in one combustion cycle during the time when the engine load is equal to the target engine load and the actual boost pressure is equal to a target boost pressure corresponding to the target engine load.

More specifically, a control apparatus for an internal combustion engine according to the present invention comprises a supercharger that supercharges intake air of an internal combustion engine, a fuel injection valve capable of injecting fuel into a combustion chamber of the internal combustion engine, an ignition plug whose position relative to said fuel injection valve is set in such a way that fuel spray injected through said fuel injection valve passes through an ignition-capable region and the ignition plug can ignite the fuel spray directly, and a controller comprising at least one processor configured to perform first injection through said fuel injection valve at a first injection time during the compression stroke, ignites pre-spray formed by the first injection by said ignition plug, and starts to perform second injection through said fuel injection valve at a second injection time after the ignition of said pre-spray by said ignition plug and before the top dead center of the compression stroke with a predetermined first injection interval between said first injection time and said second injection time, said first injection interval being set in such a way that combustion of the fuel injected by said second injection is started by flame generated by ignition of said pre-spray, thereby causing self-ignition of fuel to occur and causing at least a portion of fuel injected by said second injection to be burned by diffusion combustion, wherein in a first operation state by which the engine load of the internal combustion engine is changed to a target engine load, said controller performs, in at least a part of a period until the actual boost pressure reaches a target boost pressure corresponding to said target engine load, first fuel injection control in which a first injection ratio, which is defined as the ratio of the fuel injection quantity in said first injection to the total fuel injection quantity in one combustion cycle, is made larger than a base first injection ratio, which is defined as the ratio of the fuel injection quantity in said first injection to the total fuel injection quantity in one combustion cycle in a second operation state in which the engine load of the internal combustion engine is equal to said target engine load and the actual boost pressure is equal to said target boost pressure.

In the apparatus according to the present invention, the position of the ignition plug relative to the fuel injection valve is set in such a way that the ignition plug can directly ignite passing fuel spray, which is fuel spray injected through the fuel injection valve and passing through the ignition-capable region. In a known typical mode of igniting fuel spray, air-fuel mixture is brought to the ignition-capable region of the ignition plug by means of gas flow formed in the combustion chamber when the intake valve is opened or utilizing the shape of a cavity or the like located on top of the piston, so that the fuel spray is ignited by the ignition plug. In such a generally employed mode of ignition, in order to enable satisfactory ignition of fuel spray, the injection time at which injection through the injection valve is to be performed is limited by the opening time of the intake valve, the position of the piston in the cylinder, and other factors. In contrast to this, in the control apparatus for an internal combustion engine according to the present invention, since the relative position of the fuel injection valve and the ignition plug is set relative to each other as described above, control of the fuel injection time and the ignition time has very high flexibility, enabling control of fuel injections by the controller, which will be described later. Preferably, the ignition plug employed with the present invention is adapted to be capable of directly igniting the passing fuel spray injected through the fuel injection valve at desired time regardless of the opening time of the intake valve or the piston position of the internal combustion engine.

In the combustion control according to the present invention, the first injection is firstly performed at the first injection time during the compression stroke, and the pre-spray formed by the first injected fuel is ignited by the ignition plug. Then, after the second injection is started at the second injection time before the top dead center of the compression stroke, self-ignition and diffusion combustion of fuel occur. Although the second injection is started at a time before the top dead center of the compression stroke, it may continue past the top dead center of the compression stroke.

The interval between the first injection time and the second injection time is a predetermined first injection interval. The first injection interval is set in such a way that combustion of the second injected fuel is started by flame generated by ignition of the pre-spray. In other words, the first injection time is not set as an arbitrary time during the compression stroke but determined in relation to the second injection time in such a way that ignition of the first injected fuel can generate flame serving as an ignition source for combustion of the second injected fuel. After combustion of the second fuel starts, the temperature and pressure in the combustion chamber rise, so that self-ignition of fuel occurs, and at least a portion of the second injected fuel is burned by diffusion combustion. Only a part of the first injected fuel is burned by propagation of flame generated by ignition by the ignition plug, and a large part of the first injected fuel remains unburned. The unburned residue of the first injected fuel is burned by self-ignition or diffusion combustion after the start of the second injection. In consequence, in the above-described combustion control, the first injected fuel and the second injected fuel both contribute to the power of the internal combustion engine. Therefore, diesel combustion having high thermal efficiency can be brought about.

In the apparatus according to the present invention, intake air is supercharged by the supercharger. In the first operation state in which the engine load of the internal combustion engine is changed, the boost pressure (or supercharged pressure) changes with the change in the engine load. In this process, there is a response delay in changing the boost pressure, that is, a delay in the change of the boost pressure relative to the change of the fuel injection quantity. During the response delay period in changing the boost pressure, namely during the period from the time when the operation state of the internal combustion engine becomes the first operation state (or from the time when the fuel injection quantity starts to be increased or decreased) until the actual boost pressure reaches the target boost pressure corresponding to the target engine load in the first operation state, there is a possibility that the quantity of air (or the quantity of oxygen) may become deficient or overabundant relative to the quantity of fuel in the combustion chamber of the internal combustion engine.

Specifically, in the case where the first operation state is the accelerating operation state in which the engine load of the internal combustion engine is increased, the actual boost pressure is lower than the target boost pressure during the response delay period in changing the boost pressure. This may lead to deficiency in the quantity of oxygen relative to the quantity of fuel in the combustion chamber in some cases. Consequently, in the accelerating operation state, it may be difficult to provide a sufficient quantity of oxygen needed to burn the second injected fuel satisfactorily in a region in the combustion chamber in which fuel spray is formed when the second injection is performed in some cases. In such cases, the amount of smoke generated increases. On the other hand, in the case where the first operation state is the decelerating operation state in which the engine load of the internal combustion engine is decreased, the actual boost pressure is higher than the target boost pressure during the response delay period in changing the boost pressure. This may lead to overabundance in the quantity of oxygen relative to the quantity of fuel in the combustion chamber in some cases. Consequently, in the decelerating operation state, the air-fuel ratio in a region in the combustion chamber in which pre-spray is formed may become too high in some cases. In such cases, the ignitability in ignition of the pre-spray by the ignition plug may deteriorate, making generation of flame by which combustion of the second injected fuel is to be started instable. Consequently, diesel combustion may become instable.

As described above, in the mode of combustion employed in the present invention, if deficiency or overabundance in the quantity of oxygen relative to the quantity of fuel occurs in the combustion chamber of the internal combustion engine due to response delay in changing the boost pressure in the first operation state, there is a possibility of deterioration in the combustion condition. In the present invention, in the first operation state in which the engine load of the internal combustion engine is changed to a target engine load, the first injection ratio is made higher than the base first injection ratio in at least a part of the response delay period in changing the boost pressure. The base first injection ratio is the first injection ratio in a second operation state in which the engine load of the internal combustion engine is equal to the target engine load in the first operation state and the actual boost pressure is equal to the target boost pressure in the first operation state. In other words, in at least a part of the response delay period in changing the boost pressure, the second injection ratio is made lower than the base second injection ratio defined as the second injection ratio in the second operation state.

When the first injection ratio is higher than the base first injection ratio, the first injected fuel quantity is larger than and the second injected fuel quantity is smaller than those in the case where the first injection ratio is controlled to the base first injection ratio. Consequently, in the apparatus according to the present invention, during the response delay period in changing the boost pressure in the first operation state, the quantity of fuel present in the region in which the pre-spray is formed at the time when the first injection is performed is larger than that in the second operation state, and the quantity of fuel present in the region in which fuel spray is formed when the second injection is performed is smaller than that in the second operation state.

Therefore, in the accelerating operation state, deficiency in the quantity of oxygen needed to burn the second injected fuel can be prevented from occurring. Consequently, the amount of smoke generated can be reduced. In connection with the above process, increasing the first injected fuel quantity leads to an increase in the quantity of the unburned residue of the first injected fuel. However, the unburned reside of the first injected fuel has been diffused more extensively than the region in the combustion chamber in which the spray of the second injected fuel is formed at the second injection time. Therefore, even during the response delay period in changing the boost pressure in the accelerating operation state, during which the quantity of oxygen in the combustion chamber is small, a sufficient quantity of oxygen needed to burn the unburned reside of the first injected fuel by self-ignition or diffusion combustion is available. In consequence, even if the first injection ratio is increased during the response delay period in changing the boost pressure in the accelerating operation state, the amount of smoke generated is unlikely to increase.

In the decelerating operation state, the air-fuel ratio in the region in which the pre-spray is formed can be prevented from becoming excessively high. Therefore, the ignitability in ignition of the pre-spray by the ignition plug can be enhanced, and it is possible to generate flame by which combustion of the second injected fuel is started with reliability. Therefore, the stability of diesel combustion can be improved. As described above, the present invention can improve the combustion condition in the operation state in which the engine load is increased or decreased.

In the apparatus according to the present invention, the controller may advance the first injection time from (or make the first injection time earlier than) the base first injection time defined as the first injection time in the second operation state. In connection with this, the advancement of the first injection time is performed to such an extent that the interval between the first injection time and the second injection time allows combustion of the second injected fuel to be started by flame generated by ignition of the pre-spray, in order to maintain the mode of combustion according to the present invention.

The larger the degree of advancement of the first injection time is, the lower the pressure in the cylinder at the first injection time is. Therefore, the larger the degree of advancement of the first injection time is, the higher the penetration of the pre-spray is. During the response delay period in changing the boost pressure in the accelerating operation state, the pressure in the cylinder is lower than that in the second operation state. Therefore, advancing the first injection time in this state helps the first injected fuel to diffuse extensively in the combustion chamber. Consequently, unburned residue rate of the first injected fuel (i.e. the proportion of the first injected fuel that is not burned by propagation of flame generated by ignition of the pre-spray by the ignition plug but remains unburned) becomes higher. Therefore, the quantity of the unburned residue of the first injected fuel can be increased by advancing the first injection time from the base first injection time when making the first injection ratio higher than the base first injection ratio. In consequence, the amount of smoke generated in the accelerating operation state can be further decreased, and the decrease in the thermal efficiency with the increase in the first injected fuel can be reduced. During the response delay period in changing the boost pressure in the decelerating operation state, the pressure in the cylinder is higher than that in the second operation state. Therefore, if the first injection time is controlled to the base first injection time, the pre-spray injected through the fuel injection valve may not be apt to reach the ignition plug. Advancing the first injection time helps the pre-spray to reach the ignition plug. Consequently, ignitability in ignition of the pre-spray can be further enhanced. During the response delay period in changing the boost pressure in the decelerating operation state, if the pre-spray is ignited by the ignition plug with the first injection time being set to the base first injection time, there is a possibility that the quantity of the first injected fuel that is burned by propagation of flame increases too much, because the first injected fuel is not apt to diffuse in this state. In this case, the quantity of oxygen available for combustion of the second injected fuel is deficient when the second injection is performed, leading to an increase in the amount of smoke generated. If the first injection time is advanced in this state, oxygen present around the ignition plug can be prevented from being consumed too much in combustion of the first injected fuel. Thus, the amount of smoke generated can be reduced.

In the apparatus according to the present invention, when the engine load of the internal combustion engine increases, it is necessary to increase the quantity of fuel injected into the combustion chamber. However, if the quantity of fuel injected in the first injection or the second injection is increased too much, the amount of smoke generated might increase. In the control apparatus for an internal combustion engine according to the present invention, in a high load range in which the engine load of the internal combustion engine is higher than a predetermined load, the controller may perform third injection through the fuel injection valve in addition to the first injection and the second injection at a third injection time prior to the first injection time during the compression stroke with a predetermined second injection interval between the first injection and the third injection. The second injection interval is set in such a way that the fuel injected by said third injection is burned by self-ignition or diffusion combustion after the start of the second injection.

The third injection is performed at the third injection time prior to the first injection time during the compression stroke. The interval between the first injection time and the third injection time is the predetermined second injection interval. The second injection interval is set in such a way that fuel injected by the third injection (which will be sometimes referred to as the "third injected fuel", hereinafter) is burned by self-ignition or diffusion combustion after the start of the second injection. In the period before the first injection time during the compression stroke, the pressure in the combustion chamber is relatively low. Consequently, fuel injected into the combustion chamber is apt to be diffused more extensively. If flame is generated by ignition of the pre-spray of the first injected fuel by the ignition plug, the third injected fuel, which has been diffused to locations in the combustion chamber away from the flame, is not apt to be burned in combustion started by the flame. Therefore, if the interval between the first injection time and the third injection time is set appropriately, it is possible to burn a large part of the third injected fuel not by propagation of flame caused by ignition of the pre-spray of the first injected fuel but by self-ignition or diffusion combustion after the start of the second injection. If the third injected fuel is burned by self-ignition or diffusion combustion after the start of the second injection, not only the first injected fuel and the second injected fuel but also the third injected fuel contributes to the power of the internal combustion engine. Therefore, in the case where the third injection is performed in addition to the first injection and the second injection also, diesel combustion with high thermal efficiency can be brought about.

Since the third injection time is prior to the first injection time, the third injected fuel is diffused more extensively in the combustion chamber at the second injection time than the unburned residue of the first injected fuel. Therefore, although the third injected fuel is present in the combustion chamber at the second injection time, the third injected fuel is less likely to overlap with the second injected fuel than the unburned residue of the first injected fuel. Therefore, the third injected fuel is less likely to be a cause of smoke than the first injected fuel and the second injected fuel.

In the high load range in which the engine load is higher than the predetermined load, in the case where the third injection is performed, at least one of the first injected fuel quantity and the second injected fuel quantity can be made smaller than in the case where a quantity of fuel required by the engine load of the internal combustion engine is injected only by the first injection and the second injection without performing the third injection also in the high load range. Therefore, diesel combustion can be brought about with reduced smoke.

In the apparatus according to the present invention, in the first operation state in an operation range in which the engine load of the internal combustion engine is equal to or lower than the predetermined load, the controller may perform said first fuel injection control, and in the first operation state in the high load range, the controller may perform second fuel injection control. In the second fuel injection control, the controller controls the first injection ratio to a value equal to said base first injection ratio and makes a third injection ratio, which is defined as the ratio of the fuel injection quantity in the third injection to the total fuel injection quantity in one combustion cycle, higher than a base third injection ratio, which is defined as the ratio of the fuel injection quantity in said third injection to the total fuel injection quantity in one combustion cycle in said second operation state, in at least a part of the period until the actual boost pressure reaches the target boost pressure.

When the third injection ratio is made higher than the base third injection ratio with the first injection ratio being kept at the base first injection ratio, the third injected fuel quantity is larger than and the second injected fuel quantity is smaller than when the third injection ratio is controlled to the base third injection ratio. Consequently, by the second fuel injection control, during the response delay period in changing the boost pressure in the first operation state, the quantity of fuel present in the region in which fuel spray is formed when the second injection is performed is smaller than that in the second operation state, as is also the case when the first injection ratio is made higher than the base first injection ratio in the first fuel injection control. Therefore, deficiency in the quantity of oxygen needed for combustion of the second injected fuel can be prevented from occurring in the accelerating operation state. In consequence, the amount of smoke generated can be reduced. As described above, the third injected fuel is less likely to be a cause of smoke than the first injected fuel and the second injected fuel. Therefore, increasing the third injection ratio during the response delay period in changing the boost pressure in the accelerating operation state is unlikely to lead to an increase in the amount of smoke generated.

As described above, a large part of the third injected fuel is not burned by propagation of flame generated by ignition of the pre-spray of the first injected fuel. Nevertheless, a portion of the third injected fuel present around the ignition plug at the time of ignition of the pre-spray of the first injected fuel is ignited by the ignition plug. When the third injected fuel quantity is increased, the quantity of the third injected fuel present around the ignition plug at the time of ignition of the pre-spray increases. Therefore, by the second fuel injection control, in the decelerating operation state, the air-fuel ratio in the region in which the pre-spray is formed can be prevented from becoming excessively high, as is also the case when the first injection ratio is made higher than the base first injection ratio in the first fuel injection control. Therefore, the ignitability in ignition of the pre-spray by the ignition plug can be enhanced, and it is possible to generate flame by which combustion of the second injected fuel is started with reliability. Therefore, the stability of diesel combustion can be improved. As described above, by the second fuel injection control, the combustion condition in the operation state in which the engine load is increased or decreased in the high load range in which the engine load is higher than the predetermined load can be improved.

In the apparatus according to the present invention, when performing the second fuel injection control, the controller may control the first injection time to the base first injection time, which is defined as the first injection time in the second operation state and advance the third injection time from (or make the third injection time earlier than) a base third injection time, which is defined as the third injection time in the second operation state. In connection with this, the advancement of the third injection time is performed to such an extent that the interval between the third injection time and the first injection time allows the third injected fuel to burn by self-ignition or diffusion combustion after the start of the second injection, in order to maintain the mode of combustion according to the present invention.

The more the third injection time is advanced, the lower the pressure in the cylinder at the third injection time is. Therefore, advancing the third injection time makes the penetration of the spray of the third injected fuel higher. Consequently, the third injected fuel tends to diffuse more extensively in the combustion chamber. Therefore, during the response delay period in changing the boost pressure in the accelerating operation state, advancing the third injection time in the second fuel injection control leads to a further increase in the quantity of the third injected fuel that is not burned by propagation of flame generated by ignition by the ignition plug. The advantageous effect same as advancing the first injection time from the base first injection time in the first fuel injection control can be enjoyed. Specifically, in the accelerating operation state, the amount of smoke generated can be further reduced, and the decrease in the thermal efficiency with the increase in the third injected fuel can be reduced. In the decelerating operation state, if the third injection time is controlled to the base third injection time, the third injected fuel is not apt to diffuse, and therefore there is a possibility that the quantity of the third injected fuel that is burned by propagation of flame generated by ignition of the pre-spray may increase excessively. If this is the case, oxygen available for combustion of the second injected fuel becomes deficient when the second injection is performed, leading to an increase in the amount of smoke generated. If the third injection time is advanced in this state, oxygen present around the ignition plug can be prevented from being consumed too much in combustion of the third injected fuel. Thus, the amount of smoke generated can be reduced.

Advantageous Effects of Invention

The present invention can improve the combustion condition in an internal combustion engine equipped with a super charger and performing diesel combustion using fuel having a relatively high self-ignition temperature, such as gasoline in an operation state in which the engine load is increased or decreased.

Further features of the present invention will become apparent from the following description of exemplary embodiments with reference to the attached drawings.

BRIEF DESCRIPTION OF DRAWINGS

FIGS. 3A and 3B are diagrams illustrating basic combustion control performed in the example of the present invention.

FIGS. 17A and 17B show the change in the thermal efficiency of the internal combustion engine and the change in the amount of smoke generated in relation to the change in the third injected fuel quantity Spp in the high load combustion control according to the example of the present invention.

DESCRIPTION OF EMBODIMENT

In the following, specific embodiments of the present invention will be described with reference to the drawings. The dimensions, materials, shapes, relative arrangements, and other features of the components that will be described in connection with the embodiments are not intended to limit the technical scope of the present invention only to them, unless particularly stated.

Example 1

Figure 1:
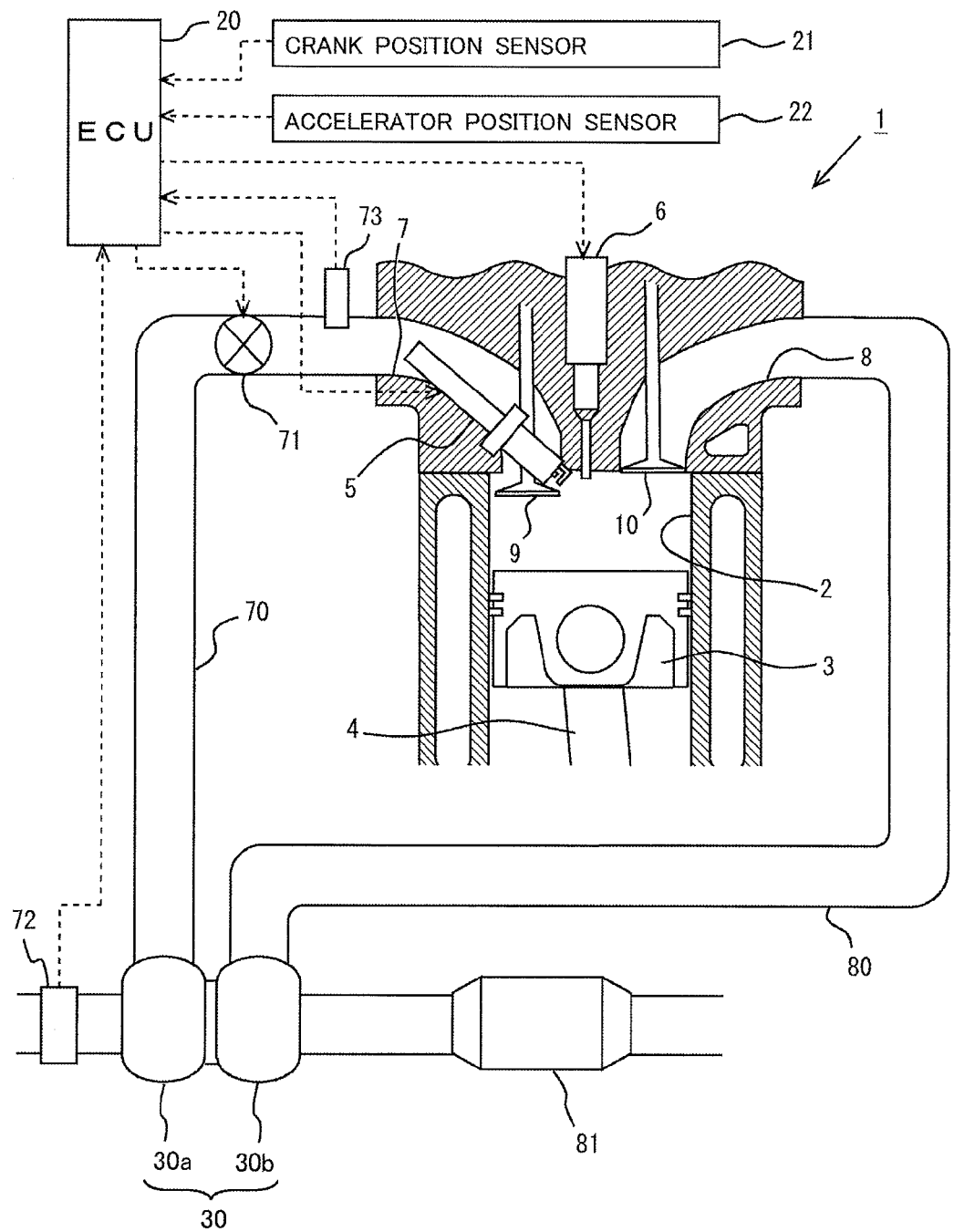
FIG. 1 is a diagram showing the general configuration of the air-intake and exhaust systems of an internal combustion engine to which an example of the present invention is applied.

FIG. 1 is a diagram showing the general configuration of the air-intake and exhaust systems of an internal combustion engine to which the present invention is applied. The internal combustion engine 1 shown in FIG. 1 is a four-stroke-cycle, spark-ignition internal combustion engine (gasoline engine) having a plurality of cylinders. FIG. 1 shows only one of the plurality of cylinders.

In each cylinder 2 of the internal combustion engine 1, a piston 3 is provided in a slidable manner. The piston 3 is linked with an output shaft (crankshaft), which is not shown in the drawings, by a connecting rod 4. The interior of the cylinder 2 is in communication with intake ports 7 and exhaust ports 8. An end of the intake port 7 opening into the cylinder 2 is opened/closed by an intake valve 9. An end of the exhaust port 8 opening into the cylinder 2 is opened/closed by an exhaust valve 10. The intake valve 9 and the exhaust valve 10 are driven to be opened/closed respectively by an intake cam and an exhaust cam not shown in the drawings.

Figure 2:
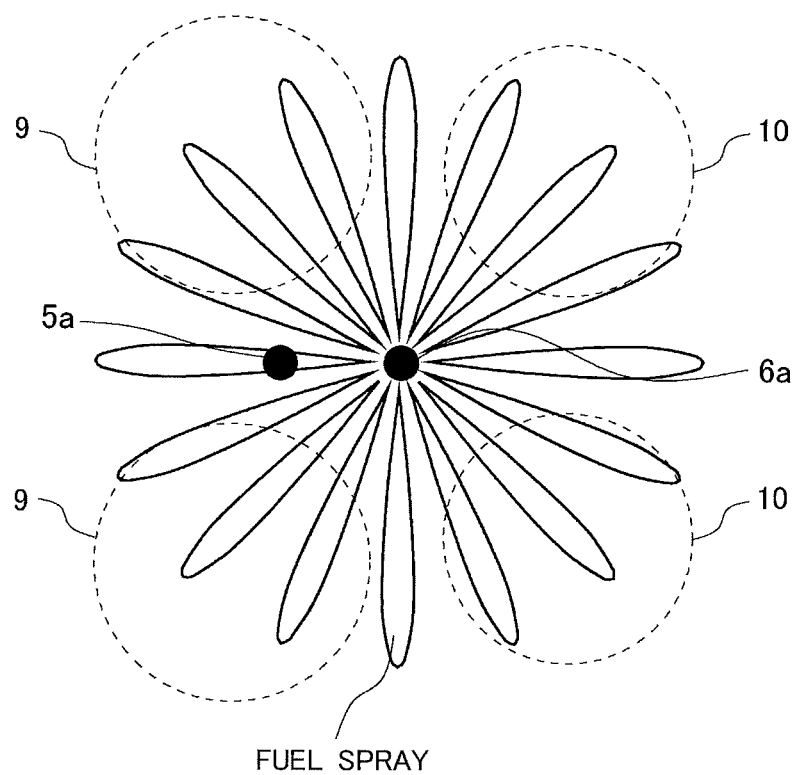
FIG. 2 is a diagram showing a mode of ignition by an ignition plug with which the internal combustion engine shown in FIG. 1 is equipped.

Furthermore, each cylinder 2 is provided with a fuel injection valve 6 for injecting fuel into the cylinder. The fuel injection valve 6 is arranged at the center on top of the combustion chamber formed in the cylinder 2. Moreover, an ignition plug 5 that can ignite fuel injected through the fuel injection valve 6 is provided in the cylinder head of the internal combustion engine 1. Specifically, the fuel injection valve 6 has an injection port 6a with which fuel can be injected nearly radially in (sixteen) directions as shown in FIG. 2. The position of the ignition plug 5 relative to the fuel injection valve 6 is arranged in such a way that at least one of the fuel sprays injected from the injection port 6a passes through a region 5a in which the ignition plug 5 is capable of igniting and that the fuel spray thus passing through this region 5a can be directly ignited by a spark generated between the electrodes in the region 5a. The ignition plug 5 is located between the two intake valves 9 so that it does not interfere with the operations of the intake valves 9 and the exhaust valves 10. The location of the ignition plug in the apparatus according to the present invention is not limited to a position between the two intake valves.

The ignition plug 5 and the fuel injection valve 6 configured as above can carry out spray guide combustion. In other words, the ignition plug 5, which is arranged in such a way as to be capable of directly igniting fuel injected through the fuel injection valve 6, and the fuel injection valve 6 are adapted to be capable of igniting injected fuel passing through the region 5a at any desired time regardless of the opening timing of the intake valves 9 of the internal combustion engine 1 or the position of the piston 3. Air guide combustion and wall guide combustion are also known as conventional combustion methods in which fuel injected through the fuel injection valve is ignited directly by the ignition plug. In the air guide combustion, fuel injected through the fuel injection valve is carried to the neighborhood of the ignition plug by means of air flowing into the combustion chamber with opening of the intake valve and ignited by the ignition plug. In the wall guide combustion, injected fuel is carried to the neighborhood of the ignition plug utilizing the shape of a cavity provided on top of the piston and ignited by the ignition plug. In the cases of the air guide combustion and the wall guide combustion, it is difficult to perform fuel injection and ignition unless a predetermined time for opening the intake valve is reached and a predetermined piston position is established. The spray guide combustion according to this example allows very flexible fuel injection and ignition timing control as compared to the air guide combustion and the wall guide combustion. In this example, as shown in FIG. 2, the fuel injection valve 6 and the ignition plug 5 are arranged in such a way that one of fuel sprays injected from the injection port 6a falls on the electrodes of the ignition plug 5. However, the ignition-capable region of the ignition plug 5 is not limited to the region 5a between the electrodes but includes a region around the electrode also. Therefore, it is not necessarily required that a fuel spray injected from the injection port 6a fall on the electrodes of the ignition plug 5. In other words, it is not necessarily required that the ignition plug 5a be located in line with the direction of fuel injection from the injection port 6a (namely, on the center axis of the fuel spray). Even in the case where the fuel spray injected from the injection port 6a is offset from the electrodes of the ignition plug 5, spray guide combustion started by a spark generated between the electrodes of the ignition plug 5 can be brought about, so long as the fuel spray passes the ignition-capable region. Thus, in this example, what is required is that the position of the ignition plug 5 relative to the fuel injection valve 6 be arranged in such a way that spray guide combustion can be brought about. Therefore, the ignition plug 5 may be offset from the direction of fuel injection (namely, the center axis of the fuel spray) from the injection port 6a.

Referring back to FIG. 1, the intake port 7 is in communication with an intake passage 70. The exhaust port is in communication with an exhaust passage 80. The intake passage 70 is provided with a compressor 30a of a turbocharger 30, which supercharges the intake air utilizing the energy of the exhaust gas. The exhaust passage 80 is provided with a turbine 30b of the turbocharger 30. In this example, the turbocharger 30 corresponds to the supercharger in the present invention. Nevertheless, the supercharger according to the present invention is not limited to the turbocharger, but it may be a supercharger using an electric compressor or mechanically-driven supercharger. An air flow meter 72 is provided in the intake passage 70 upstream of the compressor 30a. A throttle valve 71 is provided in the intake passage 70 downstream of the compressor 30a. A pressure sensor 73 is provided in the intake passage 70 downstream of the throttle valve 71. The pressure sensor 73 measures the pressure of the intake air supercharged by the turbocharger 30 (i.e. the boost pressure). An exhaust gas purification catalyst 81 used to purify the exhaust gas discharged from the internal combustion engine 1 is provided in the exhaust passage 80 downstream of the turbine 30b. As will be described later, the air-fuel ratio of the exhaust gas discharged from the internal combustion engine 1 is a lean air-fuel ratio higher than the stoichiometric air-fuel ratio. Therefore, a selective catalytic reduction NOx catalyst capable of removing NOx in the exhaust gas having a lean air-fuel ratio may be used as the exhaust gas purification catalyst 81, and a filter capable of trapping particulate matter (PM) in the exhaust gas may also be used.

An electronic control unit (ECU) 20 is annexed to the internal combustion engine 1. The ECU 20 is a unit that controls the operation state of the internal combustion engine 1 and the exhaust gas purification apparatus etc. The ECU 20 is electrically connected with the air flow meter 72, the pressure sensor 73, a crank position sensor 21, and an accelerator position sensor 22. Measurement values of these sensors are input to the ECU 20. Thus, the ECU 20 can recognize the operation state of the internal combustion engine 1, such as the intake air quantity measured by the air flow meter 72, the engine speed calculated based on the measurement value of the crank position sensor 21, and the engine load calculated based on the measurement value of the accelerator position sensor 22. The ECU 20 can also recognize the pressure of the intake air measured by the pressure sensor 73. The ECU 20 is also electrically connected with the fuel injection valve 6, the ignition plug 5, and the throttle valve 71 etc. These components are controlled by the ECU 20.

<Basic Combustion Control>

Basic combustion control performed in the internal combustion engine 1 having the above-described configuration will now be described with reference to FIGS. 3A and 3B. FIG. 3A schematically shows procedure of fuel injection and ignition in combustion control performed in the internal combustion engine 1 in time sequence from left to right of the diagram (see upper row of FIG. 3A) and phenomena relating to combustion which are considered to occur in succession in the combustion chamber as results of the fuel injection and ignition (see the lower row of FIG. 3A). FIG. 3B shows relationship between first injection and second injection, which are included in the fuel injections shown in FIG. 3A, and ignition in time line. The mode shown in FIGS. 3A and 3B are given only as a schematic illustration of the basic combustion control performed in this example, and the present invention should not be considered to be limited to this mode.

In the basic combustion control of this example, first injection and second injection are performed by the fuel injection valve 6 in one combustion cycle. The first injection is fuel injection performed during the compression stroke. The second injection is fuel injection started at a time after the first injection and before the top dead center (TDC) of the compression stroke. Although the second injection is started at a time before the top dead center, it may continue past the top dead center. As shown in FIG. 3B, the time of start of the first injection (which will be simply referred to as the "first injection time" hereinafter) is denoted by Tp, and the time of start of the second injection (which will be simply referred to as the "second injection time" hereinafter) is denoted by Tm. The interval between the first injection time and the second injection time (Tm−Tp) is defined as a first injection interval Di1. Combustion with the first injection is performed as the above-described spray guide combustion. That is to say, pre-spray of the fuel injected by the first injection (which will be hereinafter referred to as "first injected fuel") is ignited using the ignition plug 5. The time of this ignition is denoted by Ts as shown in FIG. 3B, and the interval from the start of the first injection to the time of ignition (Ts−Tp) is defined as the ignition interval Ds.

In the following, the procedure of the basic combustion control according to the present invention will be described.

(1) First Injection

In the basic combustion control, in one combustion cycle, the first injection is firstly performed at the first injection time Tp during the compression stroke. The first injection time Tp is determined in relation to the second injection time Tm, which will be described later. As the first injection is performed, the pre-spray of the first injected fuel injected through the fuel injection valve 6 passes through the ignition-capable region 5a of the ignition plug 5 in the combustion chamber, as shown in FIG. 2. Immediately after the start of the first injection, the pre-spray of the first injected fuel is not diffused extensively in the combustion chamber but travels in the combustion chamber by the penetrating force of injection while involving the air around at the leading end of the spay jet. Consequently, the pre-spray of the first injected fuel creates stratified air-fuel mixture in the combustion chamber.

(2) Ignition of First Injected Fuel

The pre-spray of the first injected fuel thus stratified is ignited by the ignition plug 5 at the ignition time Ts after the predetermined ignition interval Ds from the first injection time Tp. As described above, since the first injected fuel is stratified, the local air-fuel ratio around the ignition plug 5 is at a level allowing combustion by this ignition even though the first injected fuel quantity (i.e. the quantity of the first injected fuel) is small. By this ignition, spray guide combustion of the first injected fuel is brought about. In other words, the ignition interval Ds is set in such a way that the spray guide combustion can be brought about. In addition to a temperature rise caused by the effect of compression by the piston 3, a temperature rise is caused in the combustion chamber by the occurrence of the spray guide combustion. However, the fuel burned by the spray guide combustion is only a part of the first injected fuel, and a large part of the first injected fuel is not burned in the combustion caused by the ignition by the ignition plug 5 but remains in the combustion chamber as "unburned residual fuel" after the ignition. This is because the air-fuel ratio of the stratified air-fuel mixture formed by the first injected fuel is so high in regions relatively distant from the inter-electrode region of the ignition plug 5 that flame cannot propagate in such regions. However, the unburned residual fuel is exposed to a high-temperature atmosphere resulting from the combustion of a portion of the first injected fuel in the combustion chamber. Therefore, it is expected that at least a portion of the unburned residual fuel is reformed in its properties to have improved combustibility, by virtue of low temperature oxidation under a condition that does not cause it to be burned. It should be noted, however, that in the context of the present invention, the unburned residue of the first injected fuel refers to a portion of the first injected fuel that remains in the combustion chamber in an unburned state without having been burned in the combustion caused by the ignition by the ignition plug 5, and it is not essential for the unburned residual fuel to be in a condition showing specific properties.

(3) Second Injection

The second injection through the fuel injection valve is started at the second injection time Tm after the first injection interval Di1 from the first injection time Tp and before the top dead center of the compression stroke (in other words, at time Tm after the lapse of time equal to Di1−Ds from the time of ignition Ts by the ignition plug 5). In this internal combustion engine 1, the second injected fuel self-ignites and is burned by diffusion combustion to contribute to the engine power as will be described later. Therefore, the second injection time Tm is set to such a time that nearly maximizes the engine power attained by combustion of a quantity of the second injected fuel determined by the engine load and other factors. (This injection time will be hereinafter referred to as "proper injection time"). Combustion of the second injected fuel is started by flame generated by the ignition of the pre-spray of the first injected fuel as the ignition source. In other words, the first injection interval Di1 is set in such a way that the second injection time Tm is set to the proper injection time and that combustion of the second injected fuel is started by flame generated by the ignition of the pre-spray. If the second injection time Tm and the first injection interval Di1 are set in this way, the first injection time Tp is necessarily determined. After the combustion of the second injected fuel starts, the temperature in the combustion chamber rises further. Consequently, the unburned residue of the first injected fuel and the second injected fuel self-ignite in the raised temperature field and are burned by diffusion combustion. In connection with this, in cases where the combustibility of the unburned residue of the first injected fuel has been enhanced, the self-ignition of fuel after the start of the second injection is expected to be further promoted.

As described above, in the basic combustion control according to this example, the above-described series of combustion is caused to occur by the first injection, ignition, and second injection. In this specification, the correlation between the first injection and second injection that enables the combustion of the second injected fuel to be started by flame generated by the ignition of the pre-spray of the first injected fuel and then enables the unburned residue of the first injected fuel and the second injected fuel to self-ignite and be burned by diffusion combustion will be referred to as the "first-second injection correlation". In other words, the basic combustion control according to this example is adapted to perform the first injection and the second injection that is in the first-second injection correlation with the ignition of the first injected fuel.

Figure 4:
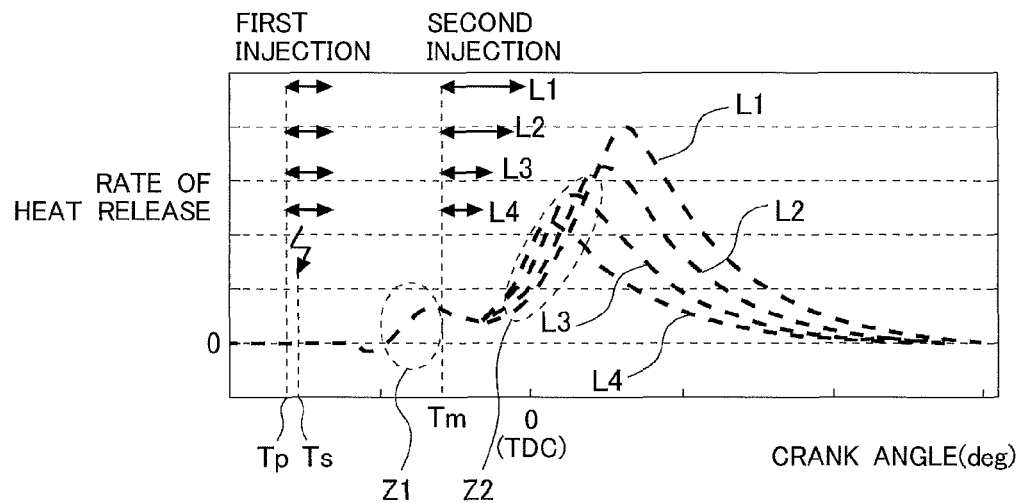
FIG. 4 is a graph showing the change in the rate of heat release in the combustion chamber in a case where the basic combustion control according to the example of the present invention is performed.

FIG. 4 shows the changes of rate of heat release in the combustion chamber in a case where the basic combustion control according to this example is performed. FIG. 4 shows the changes of the rate of heat release corresponding to four different control modes L1 to L4 in a case where the engine speed of the internal combustion engine 1 is 2000 rpm. In these control modes L1 to L4, while the first injection time Tp, the first injected fuel quantity (i.e. the duration of the first injection), the second injection time Tm, and the ignition time Ts are the same among the control modes, the second injected fuel quantity (i.e. the duration of the second injection) is varied among the control modes. Specifically, the second injected fuel quantity is varied like L1>L2>L3>L4. Therefore, FIG. 4 shows variation of the change of the rate of heat release resulting from variation in the second injected fuel quantity under the presupposition that the first-second injection correlation is established.

Figure 5:
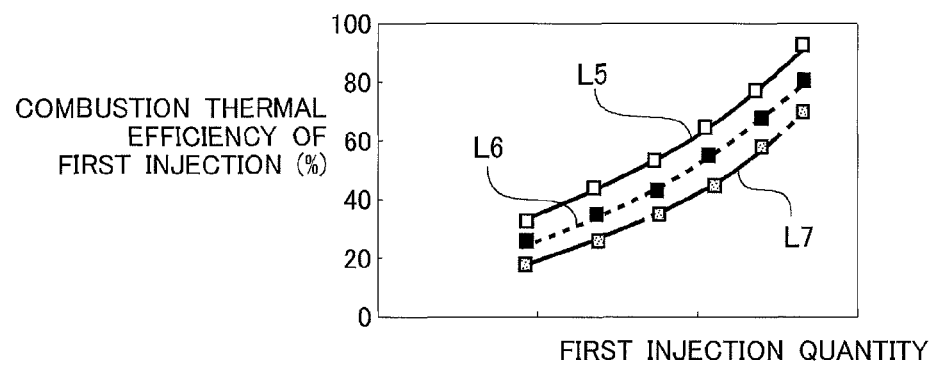
FIG. 5 is a graph showing relationship between the first injected fuel quantity and the combustion efficiency of the first injected fuel in a case where the first injection is performed in the basic combustion control according to the example of the present invention.

In FIG. 4, the rate of heat release shows a first peak in a portion Z1 encircled by a broken line. This first peak indicates heat generated by the combustion of the first injected fuel started by ignition (that is, heat generated by the spray guide combustion). At the time at which the rate of heat release shows the first peak, the second injection has not been performed yet, and flame generated by ignition of the first injected fuel and the unburned residual fuel, which is the portion of the first injected fuel that has not been burned by the ignition, are present in the combustion chamber. Now, the unburned residue of the first injected fuel will be discussed with reference to FIG. 5. FIG. 5 shows correlation of the first injected fuel quantity and the combustion efficiency of the first injected fuel (which will be hereinafter referred to as the "first combustion efficiency") for three combustion conditions L5 to L7, in the case where the first injection is performed according to the basic combustion control. Specifically, the first injection time Tp and the ignition time Ts, which are the combustion conditions, are advanced in the order of L5, L6, and L7, while the ignition interval Ds or the interval between time Tp and time Ts is fixed. FIG. 5 shows the above-described correlation in the case where only the first injection and ignition are performed but the second injection is not performed (namely, in the case where only the spray guide combustion is performed).

The first combustion efficiency and the unburned residue rate of the first injected fuel are in a relationship represented by the following equation 1. Specifically, the higher the combustion efficiency is, the lower the unburned residue rate is.

(unburned residue rate of first injected fuel)=1−
(combustion efficiency of first injected fuel)    (equation 1)

Referring to FIG. 5, if the first injection time Tp and the ignition time Ts are advanced (namely, the first injection interval Di1 is increased) while the first injected fuel quantity is fixed, the combustion efficiency of the first injected fuel tends to decrease, and the unburned residue rate tends to increase consequently. Conversely, even if the first injected fuel quantity is changed, it is possible to keep the combustion efficiency of the first injected fuel and the unburned residue rate constant by adjusting the degree of advancement of the first injection time Tp and the ignition time Ts. As described above, the basic combustion control according to this example can control the unburned residue rate of the first injected fuel, which is one of the factors of the first-second injection correlation, by controlling the first injected fuel quantity, the first injection time Tp, and the ignition time Ts (i.e. the first injection interval Di1).

Referring back to FIG. 4, the second injection is started at time Tm after the time at which the rate of heat release shows the first peak and before the top dead center of the compression stroke. Then, as described before, the second injected fuel is ignited by flame generated by the ignition of the pre-spray of the first injected fuel to start to burn, and thereafter self-ignites together with the unburned residue of the first injected fuel to burn by diffusion combustion. Consequently, a second peak, which is the highest peak, of the rate of heat release occurs at a time after the top dead center of the compression stroke. In the case shown in FIG. 4, as the second injected fuel quantity increases (namely as the duration of the second injection increases), the value of the second peak of the rate of heat release increases, and the time at which the second peak occurs becomes later. This means that as the second injected fuel quantity increases, the duration of the combustion of the second injected fuel increases. It is conjectured from this that the second injected fuel and the unburned residue of the first injected fuel are subjected to diffusion combustion or combustion that can be regarded to be substantially equivalent to diffusion combustion.

Figure 6:
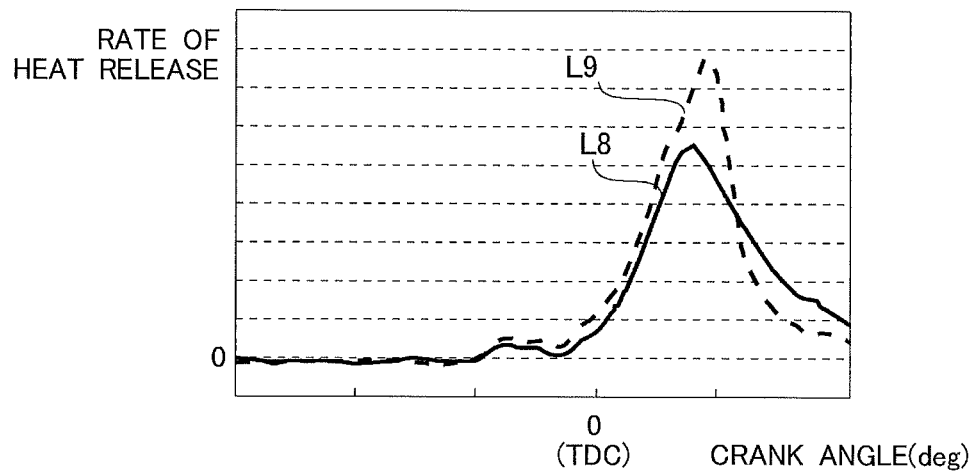
FIG. 6 shows the change of the rate of heat release in the combustion chamber for different modes between which the ratio of the first injected fuel quantity and the second injected fuel quantity is different in the basic combustion control according to the example of the present invention.

Self-ignition of fuel occurring in the basic combustion control according to this example will be described with reference to FIG. 6. FIG. 6 shows the change of the rate of heat release in the combustion chamber for two modes L8 and L9 between which the ratio of the first injected fuel quantity and the second injected fuel quantity is different, while the total injection quantity (i.e. the sum of the first injected fuel quantity and the second injected fuel quantity) in one combustion cycle is kept constant. In the case shown in FIG. 6, the engine speed of the internal combustion engine 1 is 2000 rpm. The proportion of the first injected fuel quantity is larger in mode L9 than in mode L8. In other words, the first injected fuel quantity is larger and consequently the unburned residue of the first injected fuel is also larger in mode L9 than in mode L8. As will be seen in FIG. 6, the value of the second peak of the rate of heat release occurring after the top dead center of the compression stroke is higher in mode L9 than in mode L8. Moreover, the falling rate from the second peak of the rate of heat release (or the inclination of the curve in the graph after the second peak) is higher in mode L9 than in mode L8. It is conjectured that the above facts suggest that after the start of the second injection, combustion of the unburned residue of the first injected fuel and the second injected fuel caused by self-ignition is more promoted (namely the proportion of fuel burned by self-ignition is larger, and the proportion of fuel burned by diffusion combustion is smaller) in mode L9 than in mode L8. It is considered from this that the unburned residue of the first injected fuel contributes to the promotion of self-ignition after the second injection. The inventors of the present invention verified that in the basic combustion control of this example, the self-ignition of fuel after the second injection is promoted also in the case where the unburned residue of the first injected fuel is increased by controlling the first injection time Tp and the ignition time Ts as well as the first injected fuel quantity. To sum up, in the basic combustion control according to this example, it is possible to promote self-ignition in burning the unburned residue of the first injected fuel and the second injected fuel after the start of the second injection, by adjusting parameters relating to the first injection and the ignition to increase the unburned residue rate.

As described above, in the basic combustion control according to this example, self-ignition and diffusion combustion of fuel is caused to occur by performing the second injection after the spray guide combustion caused by the first injection and the ignition by the ignition plug 5. Therefore, the combustion caused by the basic combustion control is similar to what is called diesel combustion or can be regarded to be substantially equivalent to diesel combustion. Consequently, the air-fuel ratio of the air-fuel mixture in the combustion chamber is allowed to be very high or lean (in the range between approximately 20 and 70). To bring about combustion at such lean air-fuel ratio, in the combustion control according to this example, the throttle valve 71 is opened to a degree higher than in the case of conventional combustion control (homogeneous stoichiometry control) for gasoline engines. Consequently, the pump loss in the internal combustion engine 1 can be made smaller. Moreover, since the combustion that contributes to the engine power is brought about by self-ignition and diffusion combustion, the cooling loss in the internal combustion engine 1 can also be made smaller than in the case of the homogeneous stoichiometry control. In consequence, the basic combustion control according to this example can attain high thermal efficiency that cannot be attained by conventional combustion control for gasoline engines.

<Description of First-Second Injection Correlation>

In the following, the first injected fuel quantity, the second injected fuel quantity, and the first injection interval, which are relevant technical factors for establishing the aforementioned first-second injection correlation, will be specifically described.

The second injection time is set to the proper injection time that nearly maximizes the engine power of the internal combustion engine 1. Therefore, the engine power required by an increase in the engine load can be attained up to some extent by increasing the second injected fuel quantity. However, since the second injection is performed at a time near the top dead center of the compression stroke at which the pressure in the combustion chamber is very high, the penetration of the fuel spray injected by the fuel injection valve 6 is low. In other words, the fuel spray injected by the second injection is unlikely to diffuse extensively. For this reason, if the second injected fuel quantity is increased too much, the quantity of oxygen present around the spray of the second injected fuel or the quantity of oxygen available for combustion of the second injected fuel becomes deficient relative to the quantity of fuel, possibly leading to an increase in the amount of smoke generated. Furthermore, in the basic combustion control according to this example, it is necessary that self-ignition of fuel occur after the second injection. If the second injected fuel quantity is excessively large, there is a possibility that the temperature in the combustion chamber may be lowered by the evaporation latent heat of the second injected fuel to make the combustion unstable.

On the other hand, the first injection is performed at the first injection time Tp during the compression stroke. Therefore, combustion of the first injected fuel ignited by the ignition plug 5 may be considered to be counteractive to the engine power of the internal combustion engine 1. However, what is required in the combustion of the pre-spray of the first injected fuel caused by ignition is only to produce flame serving as an ignition source for combustion of the second injected fuel. Therefore, the fuel burned in the combustion caused by the ignition is only a portion of the first injected fuel. Consequently, the effect of the spray guide combustion of the first injected fuel counteractive to the engine power is small. The unburned residue of the first injected fuel that has not been burned in the combustion caused by the ignition by the ignition plug 5 is burned in self-ignition and diffusion combustion together with the second injected fuel after the second injection to contribute to the engine power. Therefore, the engine power required by an increase in the engine load can be attained up to some extent also by increasing the first injected fuel quantity and increasing its unburned residue rate.

As described before, the first injection interval Di1, which is the interval between the first injection time and the second injection time in the basic combustion control according to this example, is set in such a way that combustion of the second injected fuel is started by flame generated by ignition of the pre-spray of the first injected fuel. Moreover, the first injection interval Di1 is determined taking into consideration the thermal efficiency of the overall combustion, the quantity of the unburned residue of the first injected fuel, and the amount of smoke generated.

Figure 7:
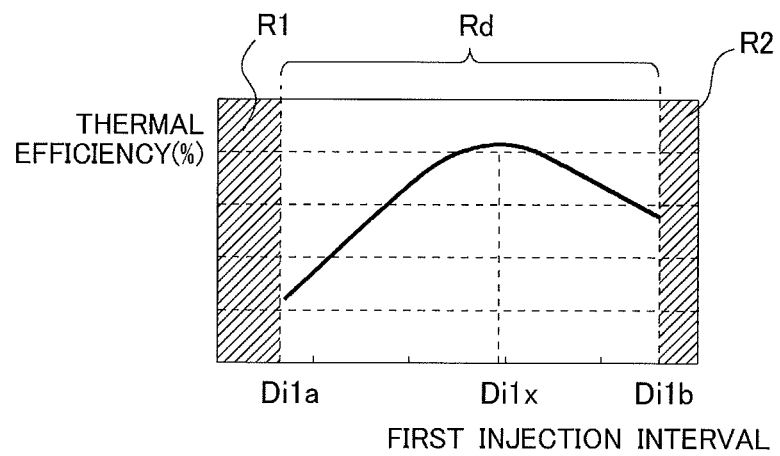
FIG. 7 is a graph showing relationship between the first injection interval Di1 and the thermal efficiency of the internal combustion engine in the basic combustion control according to the example of the present invention.

FIG. 7 shows relationship between the first injection interval Di1 and the thermal efficiency of the internal combustion engine 1. FIG. 7 shows this relationship in a case where the first injection interval Di1 is varied with the first injected fuel quantity, the second injected fuel quantity, and the ignition interval Ds being fixed.

In this example, the first injection and the second injection subsequent to it are performed by means of one fuel injection valve 6. Because of its mechanical structure, a fuel injection valve generally has a minimum injection interval that can be set in performing multiple times of injection consecutively. In FIG. 7, the range of the first injection interval that is infeasible because of the mechanical limitation of the fuel injection valve 6 (i.e. the range of Di1 below Di1a) is indicated as a mechanical limitation range R1. On the other hand, as the first injection interval Di1 is increased, the second injection is performed at a time closer to the end of the combustion process started by ignition of the first injected fuel. In the period near the end of the combustion process, since the combustion of the first injected fuel is about to end, it is difficult for combustion of the second injected fuel to be started by flame generated by combustion of the first injected fuel. For this reason, if the first injection interval Di1 is too large, there is a possibility that it may be impossible to burn the second injected fuel, leading to misfire. In FIG. 7, the range of the first injection interval Di1 in which misfire is highly likely to occur (i.e. the range of Di1 above Di1*b*) is indicated as a misfire occurrence range R2. The lower bound (Di1*b* in FIG. 7) of the misfire occurrence range R2 changes depending on the first injected fuel quantity. If the first injected fuel quantity is increased, the duration of the combustion of the first injected fuel started by ignition will continue for a longer period of time. Then, the second injected fuel can be burned with a longer first injection interval Di1.

As per the above, considering the thermal efficiency, it is preferred that the first injection interval Di1 be set to Di1*x*, which falls in the range Rd defined by the lower bound Di1*a* and the upper bound Di1*b* and at which the thermal efficiency of the internal combustion engine 1 has its peak value in FIG. 7.

As described before, in the basic combustion control according to this example, combustion of the second injected fuel is started by flame generated by combustion of the first injected fuel, and the second injected fuel self-ignites and is burned by diffusion combustion together with the unburned residue of the first injected fuel. In the early stage of combustion of the second injected fuel, flame generated by combustion of the first injected fuel and the unburned residue of the first injected fuel are distributed unevenly in the combustion chamber, and mixing of the second injected fuel and air in the combustion chamber tends not to be promoted. Therefore, if the unburned residue of the first injected fuel and the second injected fuel overlap in the combustion chamber when the second injection is performed, the quantity of oxygen present around the overlapping region or the quantity of oxygen available for combustion of the fuel in the overlapping region can be deficient relative to the quantity of fuel, and smoke is likely to be generated. The generation of smoke suggests that combustion is not proceeding in a good condition. Thus, the larger the amount of smoke generated is, the lower the thermal efficiency tends to be. To reduce the generation of smoke, it is necessary to reduce the overlapping of the unburned residue of the first injected fuel and the second injected fuel. However, as described above, the second injection time is set to the proper injection time before the top dead center of the compression stroke in order to improve the thermal efficiency of the internal combustion engine 1. Therefore, in order to reduce the overlapping of the unburned residue of the first injected fuel and the second injected fuel, which tends to lead to the generation of smoke, it is preferred to adjust the first injection interval Di1 while setting the second injection time to the proper injection time, namely it is preferred to adjust the first injection time.

Figure 8A:
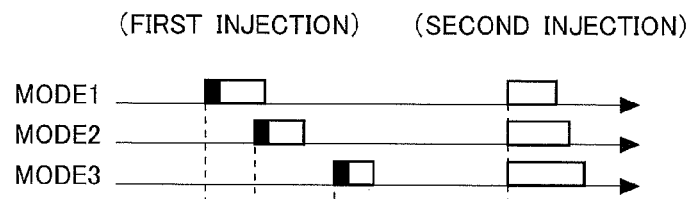
FIGS. 8A, 8B, and 8C show the change in the amount of smoke generated and the change in the thermal efficiency in a case where the second injection time Tm is fixed at a specific time before the top dead center of the compression stroke, and the first injection time Tp is varied, in the basic combustion control according to the example of the present invention.
Figure 8B:
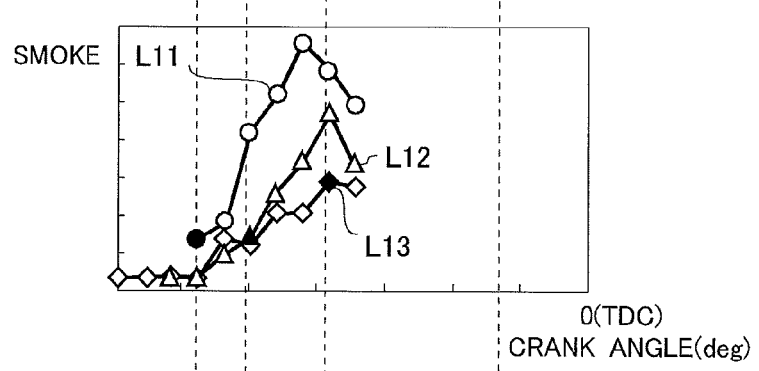
Figure 8C:
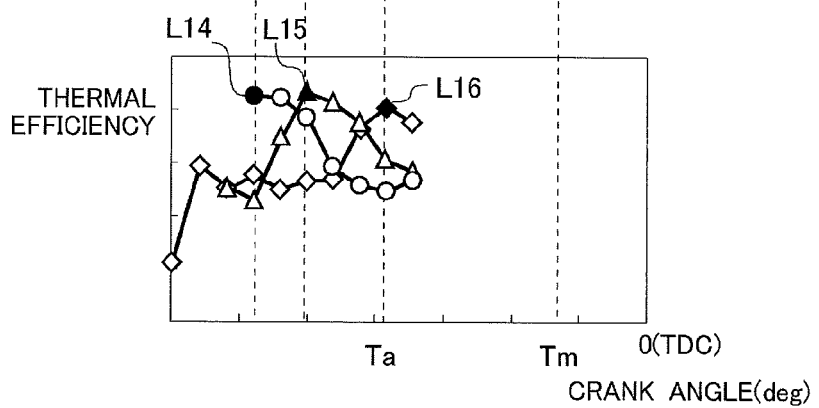

FIGS. 8A, 8B, and 8C show relation between the amount of smoke generated and the first injection time Tp (see graph of FIG. 8B) and relation between the thermal efficiency and the first injection time Tp (see graph of FIG. 8C) for three modes (see diagram of FIG. 8A), among which the proportion of the first injected fuel quantity and the second injected fuel quantity is varied with the total quantity of the first injected fuel and the second injected fuel being fixed, where the second injection time Tm is fixed at a predetermined time before the top dead center of the compression stroke and the first injection time Tp is varied. The ignition interval Ds (i.e. the length of time from the first injection time Tp to the ignition time Ts) is the same among all the modes. The relationships between the first injected fuel quantity and the second injected fuel quantity in respective modes 1 to 3 are as follows:

Mode 1: first injected fuel quantity=X1, second injected fuel quantity=Y1,
Mode 2: first injected fuel quantity=X2, second injected fuel quantity=Y2, and
Mode 3: first injected fuel quantity=X3, second injected fuel quantity=Y3,
where X1>X2>X3, and Y1<Y2<Y3.

In graph of FIG. 8B, the change of amount of smoke in mode 1 is represented by L11, the change of amount of smoke in mode 2 is represented by L12, and the change of amount of smoke in mode 3 is represented by L13. In graph of FIG. 8C, the change of the thermal efficiency in mode 1 is represented by L14, the change of the thermal efficiency in mode 2 is represented by L15, and the change of the thermal efficiency in mode 3 is represented by L16. In graph of FIGS. 8B and 8C, measurement points of the smoke and the thermal efficiency in mode 1 are represented by circles, measurement points of the smoke and the thermal efficiency in mode 2 are represented by triangles, and measurement points of the smoke and the thermal efficiency in mode 3 are represented by rhombuses. The measurement points of the smoke and the thermal efficiency with the first injection time Tp that makes the thermal efficiency highest in the respective modes are represented by solid black circles, triangles, and rhombuses.

Here, we consider shift from mode 3 to mode 2 and then to mode 1 while focusing on the aforementioned solid black measurement points. As we can see, by increasing the first injected fuel quantity and advancing the first injection time Tp, it is possible to keep the thermal efficiency of the internal combustion engine 1 at around the highest level while reducing or keeping the amount of smoke generated (see graph of FIG. 8B). If the sum total of the first injected fuel quantity and the second injected fuel quantity is the same, increasing the first injected fuel quantity necessarily leads to a decrease in the second injected fuel quantity. By advancing the first injection time Tp when the first injected fuel quantity is increased, it is possible to increase the unburned residue of the first injected fuel (namely it is possible to increase the unburned residue rate). It is considered that this is because if the first injection time is advanced, the first injection is performed when the pressure in the combustion chamber is lower and consequently, the penetration of the pre-spray of the first injected fuel is relatively higher to facilitate diffusion of the first injected fuel in the combustion chamber. Thus, since the first injected fuel is diffused more extensively in the combustion chamber, the quantity of unburned residual fuel to which flame generated by ignition has not propagated increases. Consequently, a larger quantity of unburned residual fuel is subjected to self-ignition and diffusion combustion together with the second injected fuel after the start of the second injection. In consequence, a decrease in the output power due to a decrease in the second injected fuel quantity can be compensated for by an increase in the power provided by combustion of the unburned residue of the first injected fuel. Moreover, the extensive diffusion of the first injected fuel in the combustion chamber can reduce the overlapping of the unburned residue of the first injected fuel and the second injected fuel after the second injection. Therefore, the generation of smoke due to the overlapping of the unburned residue of the first injected fuel and the second injected fuel can also be reduced. Thus, by increasing the first injected fuel quantity and advancing the first injection time Tp, it is possible to reduce the amount of smoke generated while keeping the thermal efficiency of the internal combustion engine 1 at a satisfactory level.

It will be understood from graph of FIG. 8C that if it is assumed that the first injection is performed according to modes 1 to 3 while fixing the first injection time Tp to, for example, the time Ta at which the highest thermal efficiency is attained in mode 3, as the first injected fuel quantity is increased, the amount of smoke generated increases and the thermal efficiency of the internal combustion engine 1 decreases. It will be understood from this fact also that the above-described way of controlling the first injection in which the injection time Tp is advanced with increases in the first injected fuel quantity is effective in terms of reduction of smoke and improvement in the thermal efficiency.

[Transient Operation Control]

Here, control performed in this example during transient operation in which the engine load of the internal combustion engine is changed will be described. In the internal combustion engine 1, the intake air is supercharged by the turbocharger 30. When the engine load of the internal combustion engine 1 changes, the boost pressure is changed in response to the change in the engine load. However, it takes some time for the boost pressure changes after the change of the fuel injection quantity of the internal combustion engine 1. Thus, when the internal combustion engine 1 is in the transient operation state, there is a response delay in change of the boost pressure, which is a delay in the change in the boost pressure relative to the change in the fuel injection quantity. During this response delay period in changing the boost pressure, there is a possibility that the quantity of air (or the quantity of oxygen) may be too small or too large relative to the fuel quantity in the combustion chamber of the internal combustion engine 1. Specifically, in the case of the accelerating operation state in which the engine load of the internal combustion engine 1 is increased, the actual boost pressure is lower than a target boost pressure corresponding to a target engine load during the response delay period in changing the boost pressure. In this state, the intake air quantity of the internal combustion engine 1 is smaller than in the state in which the actual boost pressure is equal to the target boost pressure. Therefore, the quantity of oxygen may be deficient relative to the fuel quantity in the combustion chamber in some cases. On the other hand, in the case of the decelerating operation state in which the engine load of the internal combustion engine 1 is decreased, the actual boost pressure is higher than the target boost pressure during the response delay period in changing the boost pressure. In this state, the intake air quantity of the internal combustion engine 1 is larger than in the state in which the actual boost pressure is equal to the target boost pressure. Therefore, the quantity of oxygen may be overabundant relative to the fuel quantity in the combustion chamber in some cases.

During transient operation, since there is a response delay in changing the boost pressure as described above, if the above-described basic combustion control is performed in the same way as during steady-state operation (namely the operation state in which the actual boost pressure is equal to the boost pressure corresponding to the engine load), the combustion state may deteriorate due to deficiency in the quantity of oxygen relative to the quantity of fuel in some cases. Specifically, as described above, since the penetration of the fuel spray in the second injection is low the second injected fuel is not apt to diffuse extensively in the combustion chamber. Therefore, in the decelerating operation state, it may sometimes be difficult to provide a sufficient quantity of oxygen needed to burn the second injected fuel satisfactorily in a region in the combustion chamber in which fuel spray is formed when the second injection is performed. This will lead to an increase in the amount of smoke generated. As described above, when the first injection is performed, pre-spray is formed around the ignition plug 5. Then, in the decelerating operation state, the air-fuel ratio in the region in the combustion chamber in which the pre-spray is formed may become too high in some cases. In such cases, the ignitability of the pre-spray of the first injected fuel by the ignition plug 5 is deteriorated, and the generation of flame by which combustion of the second injected fuel is started becomes unstable. Consequently, diesel combustion becomes unstable. In this example, in order to improve the combustion state during transient operation of the internal combustion engine 1, during transient operation by which the engine load is changed to a target engine load, the ratio of the first injected fuel quantity to the total fuel injection quantity in one combustion cycle (the first injection ratio) and the ratio of the second injected fuel quantity to the total fuel injection quantity (the second injection ratio) are set to values different from their values of the first injection ratio and the second injection ratio during steady-state operation (namely, the operation state in which the engine load of the internal combustion engine 1 is equal to the target engine load and the actual boost pressure is equal to the target boost pressure corresponding to the target engine load) for the same total fuel injection quantity in one combustion cycle. In the following, the first injection ratio during steady-state operation will be referred to as the "base first injection ratio", and the second injection ratio during steady-state operation will be referred to as the "base second injection ratio".

FIGS. 9A, 9B, 9C, 9D, 10A, 10B, 10C, and 10D show time charts of the changes in the engine load, the total fuel injection quantity in one combustion cycle, the first injected fuel quantity, the second injected fuel quantity, the first injection time, the second injection time, and the boost pressure, during transient operation of the internal combustion engine 1. FIGS. 9A, 9B, 9C, and 9D show the changes in the respective values during accelerating operation. FIGS. 10A, 10b, 10C, and 10D show the changes in the respective values during decelerating operation. In graph of FIGS. 9A and 10A, line Lq represents the change in the engine load of the internal combustion engine 1 with time. In graph of FIGS. 9B and 10B, line La represents the change in the total fuel injection quantity in one combustion cycle with time, line Lp represents the change in the first injected fuel quantity with time, and line Lm represents the change in the second injected fuel quantity with time. In graph of FIGS. 9C and 10C, line Ltp represents the change in the first injection time with time, and line Ltm represents the change in the second injection time with time. In graph of FIGS. 9D and 10D, line Lpin represents the change in the boost pressure with time.

In the case shown in FIGS. 9A, 9B, 9C, and 9D, the engine load of the internal combustion engine 1 increases to a target engine load Qet at time T1. In other words, the operation state of the internal combustion engine 1 is accelerating operation from time T1 on. At time T1, the total fuel injection quantity in one combustion cycle is increased to a target total fuel injection quantity Sat corresponding to the target engine load Qet. As the operation state of the internal combustion engine 1 is accelerating operation, the boost pressure increases. However, as described above, there is a response delay in the change in the boost pressure. Therefore, the actual boost pressure increases to reach the target boost pressure Pint corresponding to the target engine load Qet at time T2 in FIGS. 9A, 9B, 9C, and 9D. Therefore, during the response delay period dT1 in changing the boost pressure from time T1 to time T2, the actual boost pressure in the intake air is lower than the target boost pressure Pint, as shown in graph of FIG. 9D.

A base value of the first injected fuel quantity and a base value of the second injected fuel quantity that are determined based on the target total fuel injection quantity Sat will be referred to as "the base first injected fuel quantity" and "the base second injected fuel quantity" respectively. The values of the base first injected fuel quantity and the base second injected fuel quantity are determined on the assumption that the operation state of the internal combustion engine 1 is steady-state operation, namely on the assumption that the actual boost pressure is at a value adapted to the engine load. In graph of FIG. 9B, the base first injected fuel quantity corresponding to the target total fuel injection quantity Sat is indicated by Spb, and the base second injected fuel quantity corresponding to the target total fuel injection quantity Sat is indicated by Smb.

As described above, during the response delay period dT1 in changing the boost pressure or the period dT1 from time T1 to time T2, the actual boost pressure of the intake air is lower than the target boost pressure Pint. Consequently, during the response delay period dT1, the quantity of oxygen is deficient relative to the quantity of fuel in the combustion chamber. Therefore, if the second injected fuel quantity is controlled to be equal to the base second injected fuel quantity Smb during the response delay period dT1, it is difficult to keep a sufficient quantity of oxygen needed to burn the second injected fuel available in the region in which the spray of the second injected fuel is formed. In consequence, the amount of smoke generated will increase.

In view of the above circumstances, in this example, during the response delay period dT1 in changing the boost pressure in the accelerating operation state, the first injected fuel quantity and the second injected fuel quantity corresponding to the target total fuel injection quantity Sat are corrected as shown in graph of FIG. 9. Specifically, during the response delay period dT1 in changing the boost pressure, the first injected fuel quantity is made larger than the base first injected fuel quantity Spb, and the second injected fuel quantity is made smaller than the base second injected fuel quantity Smb. In other words, during the response delay period dT1, the first injection ratio is made higher than and the second injection ratio is made lower than those during the steady-state operation in which the engine load of the internal combustion engine 1 is equal to the target engine load Qet in the case shown in graph of FIG. 9A and the total fuel injection quantity in one combustion cycle is equal to the target total fuel injection quantity Sat in the case shown in graph of FIG. 9B (namely, the first injection ratio is made higher than the base first injection ratio in the case where the total fuel injection quantity in one combustion cycle is equal to the target total fuel injection quantity Sat, and the second injection ratio is made lower than the base second injection ratio in the case where the total fuel injection quantity in one combustion cycle is equal to the target total fuel injection quantity Sat). Thus, during the response delay period dT1 in changing the boost pressure, the quantity of oxygen needed to burn the second injected fuel when the second injection is performed becomes smaller. Therefore, deficiency in the quantity of oxygen needed to burn the second injected fuel can be prevented. Consequently, the amount of smoke generated can be reduced.

Increasing the first injected fuel quantity leads to an increase in the quantity of the unburned residue of the first injected fuel. The unburned residue of the first injected fuel has been diffused more extensively than the region in which the spray of the second injected fuel is formed in the combustion chamber at the second injection time. Consequently, oxygen present in a more extensive region in the combustion chamber is available for combustion of the unburned residue of the first injected fuel in the period after the second injection time. Therefore, even during the response delay period in changing the boost pressure during which the quantity of oxygen in the combustion chamber is small, a sufficient quantity of oxygen needed to burn the unburned residue of the first injected fuel by self-ignition or diffusion combustion is available. Therefore, making the first injected fuel quantity larger than the base first injected fuel quantity during the response delay period dT1 in changing the boost pressure in the accelerating operation state is unlikely to lead to an increase in the amount of smoke generated.

In the basic combustion control according to this example, the first injection time and the second injection time are determined in such a way that the second injection time is set to the aforementioned proper injection time and that the interval between the first injection time and the second injection time is set equal to the aforementioned first injection interval. Base values of the first injection time and the second injection time corresponding to the base first injected fuel quantity and the base second injected fuel quantity will be referred to as "the base first injection time" and "the base second injection time" respectively. The values of the base first injection time and the base second injection time are determined on the assumption that the operation state of the internal combustion engine 1 is steady-state operation, namely on the assumption that actual boost pressure is at a value adapted to the engine load. In graph of FIG. 9C, the base first injection time corresponding to the base first injected fuel quantity Spb is indicated by Tpb, and the base second injection time corresponding to the base second injected fuel quantity Smb is indicated by Tmb.

Figure 9A:
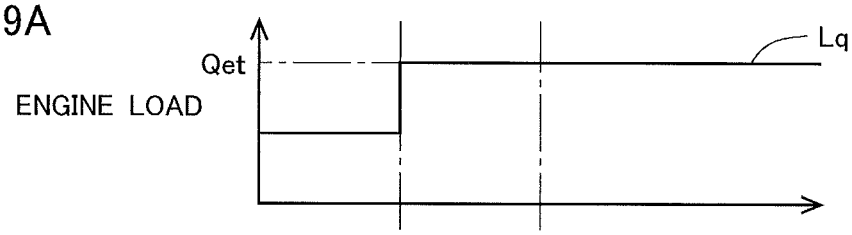
FIGS. 9A, 9B, 9C, and 9D are time charts showing the changes in the engine load, the total fuel injection quantity in one combustion cycle, the first injected fuel quantity, the second injected fuel quantity, the first injection time, the second injection time, and the boost pressure, during accelerating operation in the example of the present invention.
Figure 9B:
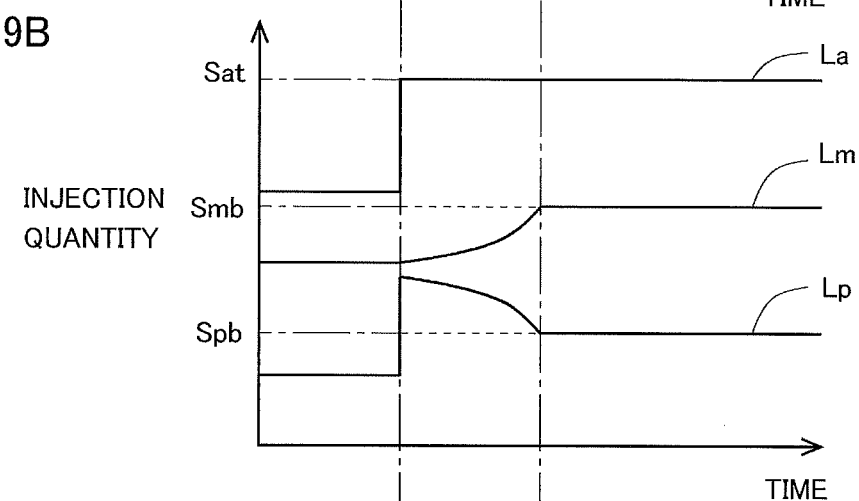
Figure 9C:
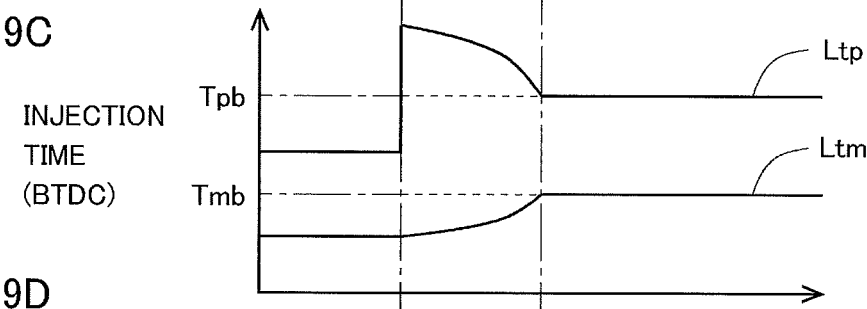
Figure 9D:
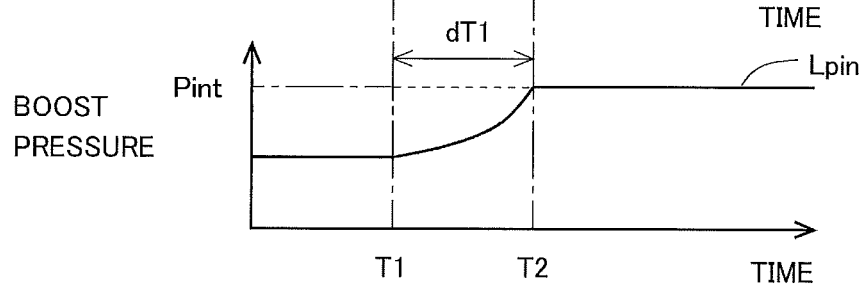

In this example, as shown in graph of FIG. 9C, during the response delay period dT1 in changing the boost pressure, during which the first injected fuel quantity and the second injected fuel quantity are corrected, the first injection time and the second injection time are also corrected. Specifically, during the response delay period dT1 in changing the boost pressure, the first injected fuel quantity is made larger than the base first injected fuel quantity Spb, and the first injection time is advanced from (or made earlier than) the base first injection time Tpb. In other words, during the response delay period dT1 in changing the boost pressure, the first injection time is advanced from (or made earlier than) that during the steady-state operation in which the engine load of the internal combustion engine 1 is equal to the target engine load Qet in the case shown in graph of FIG. 9A and the total fuel injection quantity in one combustion cycle is equal to the target total fuel injection quantity Sat in the case shown in graph of FIG. 9B. In this case, the degree of advancement of the first injection time from the base first injection time Tpb is set in accordance with the amount of increase in the first injected fuel quantity from the base first injected fuel quantity Spb. In the case where the first injection time is advanced, the time of ignition by the ignition plug 5 is also advanced so as to keep an optimum ignition interval.

As described above, the more the first injection time is advanced, the more the first injected fuel is apt to diffuse in the combustion chamber, and the higher the unburned residue rate of the first injected fuel is. During the response delay period dT1 in the accelerating operation state, since the boost pressure of the intake air is lower than the target boost pressure Pint, the pressure in the cylinder is lower than that during the steady-state operation in which the total fuel injection quantity in one combustion cycle is equal to the target total fuel injection quantity Sat. Hence, the effect of advancement of the first injection time is enhanced. Therefore, the amount of the unburned residue of the first injected fuel can further be increased by advancing the first injection time from the base first injection time Tpb when making the first injected fuel quantity larger than the base first injected fuel quantity Spb. As described above, oxygen present in a more extensive region in the combustion chamber is available for combustion of the unburned residue of the first injected fuel in the period after the second injection time. Therefore, increasing the amount of the unburned residue of the first injected fuel enables oxygen in the combustion chamber to be made available more efficiently for combustion of fuel during the response delay period dT1 in changing the boost pressure, during which the quantity of oxygen in the combustion chamber is small. Therefore, the amount of smoke generated can further be reduced. Moreover, deterioration in the thermal efficiency due to the increase in the first injected fuel can be prevented.

During the response delay period dT1 in changing the boost pressure, the second injected fuel quantity is made smaller than the base second injected fuel quantity Smb, and the second injection time is retarded from (or made later than) the base second injection time Tmb. In other words, during the response delay period dT1 in changing the boost pressure, the second injection time is retarded from (or made later than) that during the steady-state operation in which the engine load of the internal combustion engine 1 is equal to the target engine load Qet and the total fuel injection quantity in one combustion cycle is equal to the target total fuel injection quantity Sat. In this case, the degree of retardation of the second injection time from the base second injection time Tmb is set in accordance with the amount of decrease in the second injected fuel quantity from the base second injected fuel quantity Smb.

During the response delay period dT1 in changing the boost pressure, since the intake air quantity of the internal combustion engine 1 is small, the air-fuel ratio in the combustion chamber after the second injection is lower than that during the steady-state operation in which the total fuel injection quantity in one combustion cycle is equal to the target total fuel injection quantity Sat. Consequently, knocking is apt to occur after the second injection. By retarding the second injection time as described above, knocking can be prevented from occurring. Moreover, retarding the second injection time in accordance with the amount of decrease in the second injected fuel quantity allows the second injection time to be set to the proper injection time.

Also in cases where the above-described correction of the first injected fuel quantity and the second injected fuel quantity is performed during the response delay period dT1 in changing the boost pressure with the first injection time and the second injection time being set to the base first injection time Tpb and the base second injection time Tmb respectively, the amount of smoke generated can be reduced to some extent. Therefore, the correction of the first injection time and the second injection time during the response delay period in changing the boost pressure is not essential control that is necessary in order to reduce the amount of smoke generated.

In the case shown in FIGS. 10A, 10B, 10C, and 10D, the engine load of the internal combustion engine 1 decreases to a target engine load Qet at time T3. In other words, the operation state of the internal combustion engine 1 is decelerating operation from time T3 on. At time T3, the total fuel injection quantity in one combustion cycle is decreased to a target total fuel injection quantity Sat corresponding to the target engine load Qet. As the operation state of the internal combustion engine 1 is decelerating operation, the boost pressure decreases. Then, since there is a response delay in the change in the boost pressure, the actual boost pressure decreases to reach the target boost pressure Pint corresponding to the target engine load Qet at time T4 in FIGS. 10A, 10B, 10C, and 10D. Therefore, during the response delay period dT2 in changing the boost pressure from time T3 to time T4, the actual boost pressure is higher than the target boost pressure, as shown in graph of FIG. 10D.

Figure 10A:
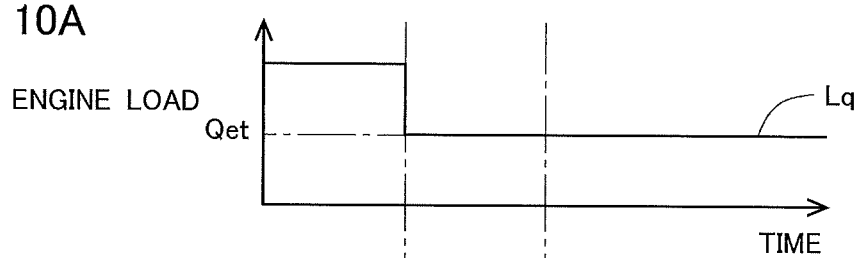
FIGS. 10A, 10B, 10C, and 10$d$ are time charts showing the changes in the engine load, the total fuel injection quantity in one combustion cycle, the first injected fuel quantity, the second injected fuel quantity, the first injection time, the second injection time, and the boost pressure, during decelerating operation in the example of the present invention.
Figure 10B:
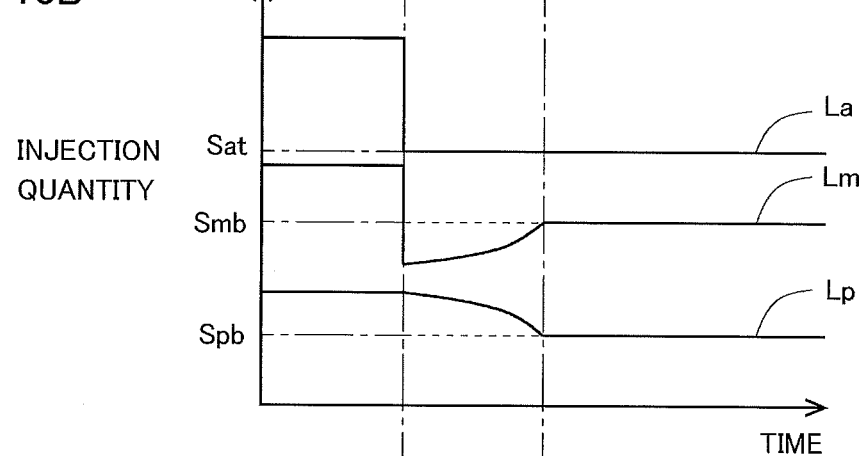

In graph of FIG. 10B, the base first injected fuel quantity corresponding to the target total fuel injection quantity Sat is indicated by Spb, and the base second injected fuel quantity corresponding to the target total fuel injection quantity Sat is indicated by Smb. In graph of FIG. 10C, the base first injection time corresponding to the base first injected fuel quantity Spb is indicated by Tpb, and the base second injection time corresponding to the base second injected fuel quantity Smb is indicated by Tmb.

As described above, during the response delay period dT2 in changing the boost pressure or the period dT2 from time T3 to time T4, the actual boost pressure of the intake air is higher than the target boost pressure Pint. Consequently, during the response delay period dT2, the quantity of oxygen is overabundant relative to the quantity of fuel in the combustion chamber. Therefore, if the first injected fuel quantity is controlled to be equal to the base first injected fuel quantity Spb during the response delay period dT2, the air-fuel ratio becomes too high in the region in which the pre-spray is formed. Consequently, the ignitability in ignition of the pre-spray by the ignition plug 5 is deteriorated, and the generation of flame by which combustion of the second injected fuel is started becomes unstable.

In view of the above circumstances, in this example, during the response delay period dT2 in changing the boost pressure in the decelerating operation state, the first injected fuel quantity and the second injected fuel quantity corresponding to the target total fuel injection quantity Sat are corrected as shown in graph of FIG. 10B. Specifically, during the response delay period dT2 in changing the boost pressure in the decelerating operation state also, the first injected fuel quantity is made larger than the base first injected fuel quantity Spb, and the second injected fuel quantity is made smaller than the base second injected fuel quantity Smb, as during the response delay period in changing the boost pressure in the accelerating operation state. In other words, during the response delay period dT2 in changing the boost pressure also, the first injection ratio is made higher than and the second injection ratio is made lower than those during the steady-state operation in which the engine load of the internal combustion engine 1 is equal to the target engine load Qet in the case shown in graph of FIG. 10A and the total fuel injection quantity in one combustion cycle is equal to the target total fuel injection quantity Sat in the case shown in graph of FIG. 10B (namely, the first injection ratio is made higher than the base first injection ratio in the case where the total fuel injection quantity in one combustion cycle is equal to the target total fuel injection quantity Sat, and the second injection ratio is made lower than the base second injection ratio in the case where the total fuel injection quantity in one combustion cycle is equal to the target total fuel injection quantity Sat). Thus, during the response delay period dT2 in changing the boost pressure, the quantity of fuel present around the ignition plug 5 at the time when the first injection is performed increases. Therefore, it is possible to prevent the air-fuel ratio in the region in which the pre-spray is formed can be prevented from becoming excessively high. Consequently, the ignitability in ignition of the pre-spray by the ignition plug 5 can be enhanced, and flame by which combustion of the second injected fuel is started can be generated reliably. Consequently, stability of diesel combustion can be improved.

Figure 10C:
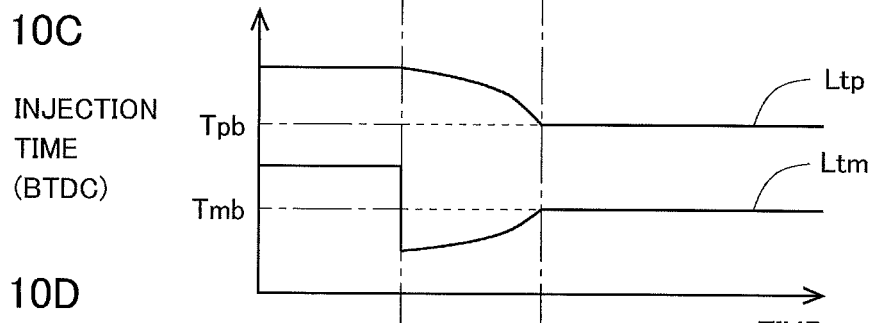
Figure 10D:
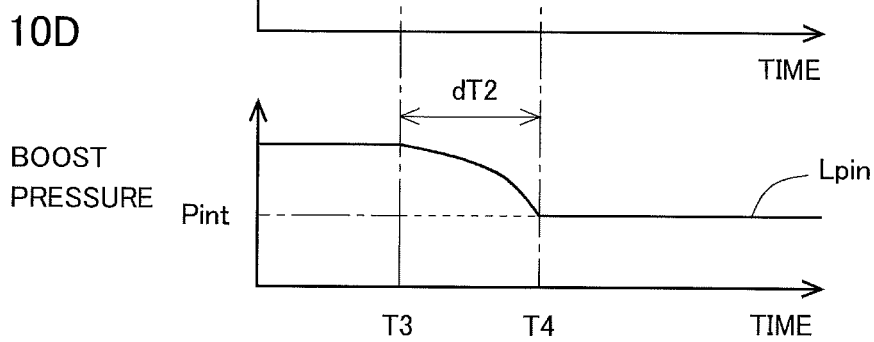

In this example, as shown in graph of FIG. 10C, during the response delay period dT2 in changing the boost pressure, during which the first injected fuel quantity and the second injected fuel quantity are corrected, the first injection time and the second injection time are also corrected. Specifically, during the response delay period dT2 in changing the boost pressure in the decelerating operation state also, the first injected fuel quantity is made larger than the base first injected fuel quantity Spb, and the first injection time is advanced from (or made earlier than) the base first injection time Tpb, as during the response delay period in changing the boost pressure in the accelerating operation state. In other words, during the response delay period dT2 in changing the boost pressure also, the first injection time is advanced from (or made earlier than) that during the steady-state operation in which the engine load of the internal combustion engine 1 is equal to the target engine load Qet in the case shown in graph of FIG. 10A and the total fuel injection quantity in one combustion cycle is equal to the target total fuel injection quantity Sat in the case shown in graph of FIG. 10B. In this case, the degree of advancement of the first injection time from the base first injection time Tpb is set in accordance with the amount of increase in the first injected fuel quantity from the base first injected fuel quantity Spb. In the case where the first injection time is advanced, the time of ignition by the ignition plug 5 is also advanced so as to keep an optimum ignition interval.

During the response delay period dT2 in deceleration operation, the actual boost pressure of the intake air is higher than the target boost pressure Pint, and consequently the pressure in the cylinder is higher than that during steady-state operation in which the total fuel injection quantity in one combustion cycle is equal to the target total fuel injection quantity Sat in the case shown in graph of FIG. 10B. Hence, during the response delay period dT2, the penetration of the fuel spray at the same injection time is lower than that during steady-state operation in which the total fuel injection quantity in one combustion cycle is equal to the target total fuel injection quantity Sat. Therefore, if the first injection time is set to the base first injection time Tpb during the response delay period dT2, it may be difficult for the pre-spray injected by the fuel injection valve 6 to reach the ignition plug 5. If it is difficult for the pre-spray to reach the ignition plug 5, the ignitability of the pre-spray deteriorates. If the first injection time is advanced from (or made earlier than) the base first injection time Tpb, the penetration of the pre-spray increases, helping the pre-spray to reach the ignition plug 5. For this reason, advancing the first injection time from the base first injection time Tpb when making the first injected fuel quantity larger than the base first injected fuel quantity Spb can improve the ignitability of the pre-spray. If the pre-spray is ignited by the ignition plug 5 during the response delay period dT2 in changing the boost pressure in the decelerating operation state with the first injection time being set to the base first injection time Tpb, the pressure in the cylinder is so high that the first injected fuel is not apt to diffuse, and there is a possibility that the quantity of the first injected fuel that is burned by propagation of flame may increase too much. In this case, while the ignitability of the pre-spray during the response delay period dT2 in changing the boost pressure is improved, an excessively large amount of oxygen present around the ignition plug 5 will be consumed in combustion of the first injected fuel. In consequence, the amount of smoke generated will increase due to deficiency of oxygen available for combustion of the second injected fuel when the second injection is performed. Making the first injection time earlier than the base first injection time Tpb facilitates diffusion of the first injected fuel, enabling the prevention of excessive increase in the quantity of the first injected fuel burned by propagation of flame. Thus, it is possible to prevent oxygen present around the ignition plug 5 from being consumed in combustion of the first injected fuel too much. Therefore, by advancing the first injection time from the base first injection time Tpb when making the first injected fuel quantity larger than the base first injected fuel quantity Spb, the ignitability in ignition of the pre-spray can be enhanced, and the amount of smoke generated can be reduced.

During the response delay period dT2 in changing the boost pressure in the decelerating operation state also, the second injected fuel quantity is made smaller than the base second injected fuel quantity Smb, and the second injection time is retarded from (or made later than) the base second injection time Tmb, as during the response delay period in changing the boost pressure in the accelerating operation state. In other words, during the response delay period dT2 in changing the boost pressure also, the second injection time is retarded from (or made later than) that during the steady-state operation in which the engine load of the internal combustion engine 1 is equal to the target engine load Qet and the total fuel injection quantity in one combustion cycle is equal to the target total fuel injection quantity Sat. In this case, the degree of advancement of the second injection time Tm from the base second injection time Tmb is set in accordance with the amount of increase in the second injected fuel quantity from the base second injected fuel quantity Smb. Thus, the second injection time can be kept at the proper injection time.

Also in cases where the above-described correction of the first injected fuel quantity and the second injected fuel quantity is performed during the response delay period dT2 in changing the boost pressure with the first injection time and the second injection time being set to the base first injection time Tpb and the base second injection time Tmb respectively, the advantageous effect of improvement of the ignitability in ignition of the pre-spray by the ignition plug 5 can be enjoyed. Therefore, the correction of the first injection time and the second injection time during the response delay period dT2 in changing the boost pressure is not essential control that is necessary in order to improve the ignitability in ignition of the pre-spray.

During the response delay period in changing the boost pressure in the transient operation state, only one of the above-described correction of the first injection time and correction of the second injection time may be performed. In the case where both or one of the first injection time and the second injection time is corrected in the above-described manner, the interval between them becomes larger than that in the case where the first injection time and the second injection time are set to the base first injection time and the base second injection time respectively. In the case where both or one of the first injection time and the second injection time is corrected, the correction is performed to such an extent that the interval between them allows combustion of the second injected fuel to be started by flame generated by ignition of the pre-spray, in order to maintain the mode of combustion according to this example.

In the case shown in FIGS. 9A, 9B, 9C, and 9D, the total fuel injection quantity in one combustion cycle is increased to the target total fuel injection quantity Sat instantly at the time T1 when the engine load of the internal combustion engine 1 is increased to the target engine load Qet. In the case shown in FIGS. 10A, 10B, 10C, and 10D, the total fuel injection quantity in one combustion cycle is decreased to the target total fuel injection quantity Sat instantly at the time T3 when the engine load of the internal combustion engine 1 is decreased to the target engine load Qet. However, in the transient operation state, the total fuel injection quantity in one combustion cycle may be changed gradually. Specifically, in the case of accelerating operation, the total fuel injection quantity in one combustion cycle may be increased to the target total fuel injection quantity gradually over a certain period of time after the required engine load is increased (namely after the accelerator opening degree is increased). In the case of decelerating operation, the total fuel injection quantity in one combustion cycle may be decreased to the target total fuel injection quantity gradually over a certain period of time after the required engine load is decreased (namely after the accelerator opening degree is decreased). In such cases also, there is a response delay in the change of the boost pressure relative to the change of the fuel injection quantity. Therefore, in such cases also, the above-described correction of the first injection ratio and the second injection ratio can improve the combustion condition. In the case where the total fuel injection quantity in one combustion cycle is changed gradually during transient operation, the increasing correction of the first injected fuel quantity and the decreasing correction of the second injected fuel quantity are performed on the basis of the base first injected fuel quantity and the base second injected fuel quantity corresponding to the total fuel injection quantity in one combustion cycle at the moment during the transient operation.

[Combustion Control Flow]

Figure 11:
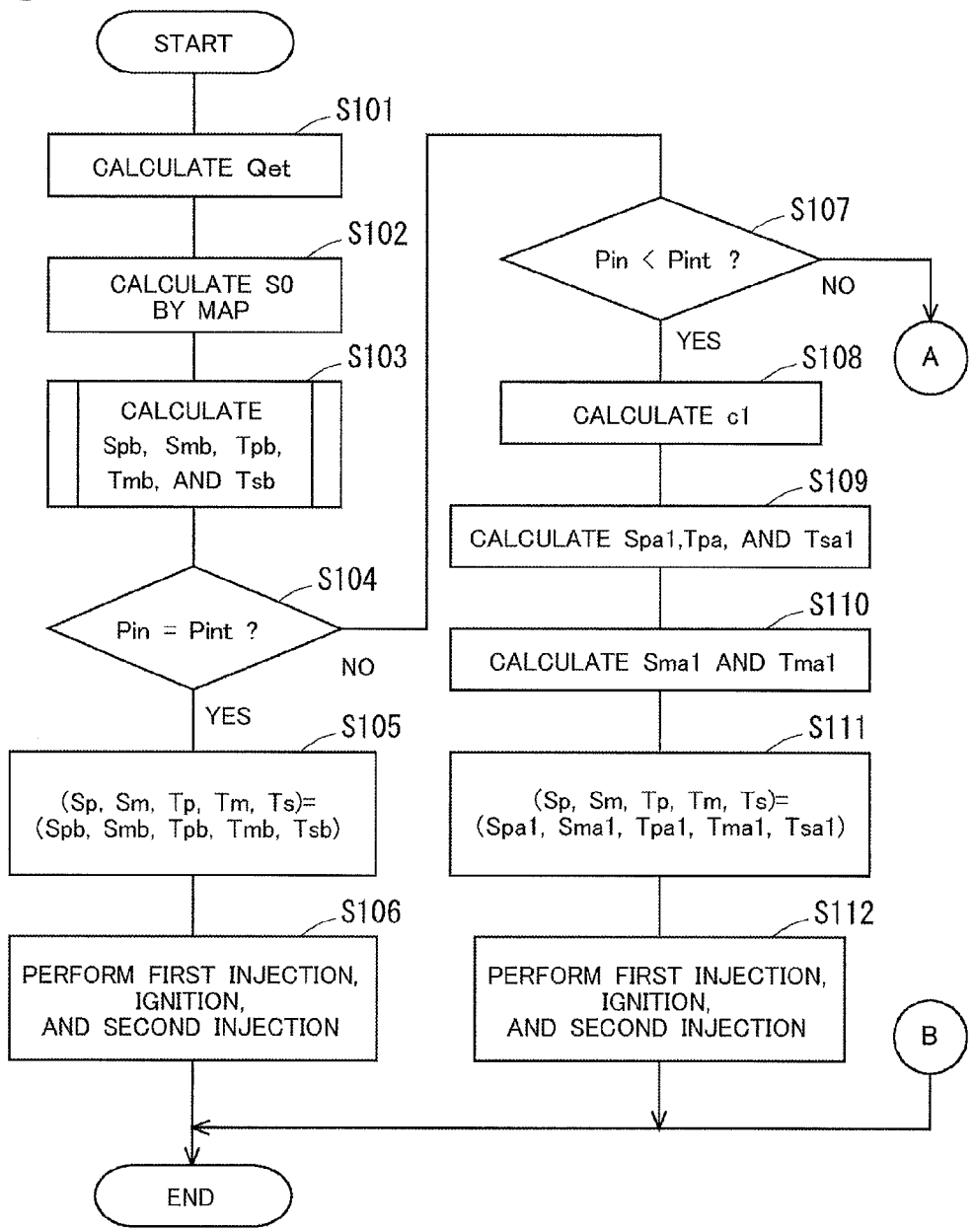
FIG. 11 is a flow chart showing a part of a control flow of combustion control according to example 1 of the present invention.
Figure 12:
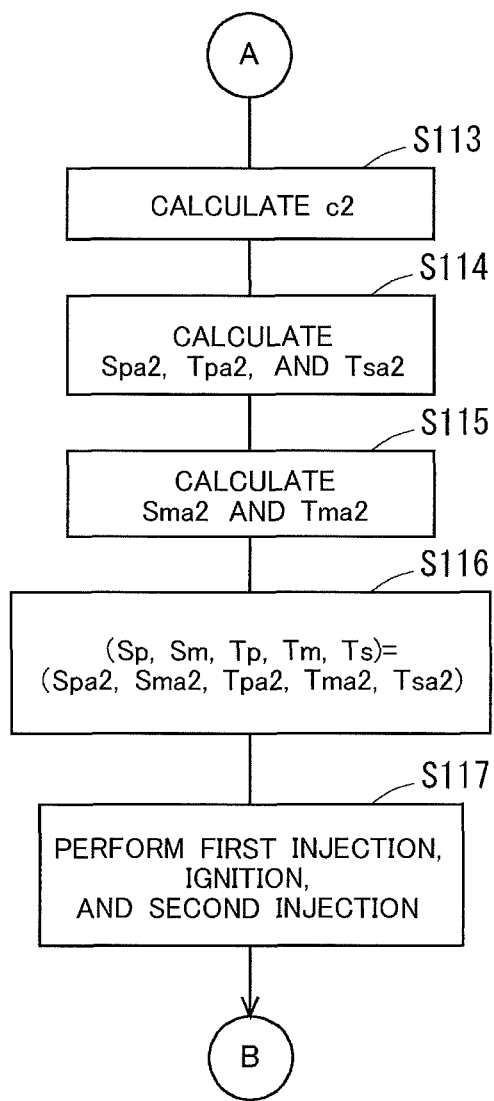
FIG. 12 is a flow chart showing another part of the control flow of the combustion control according to example 1 of the present invention.
Figure 13:
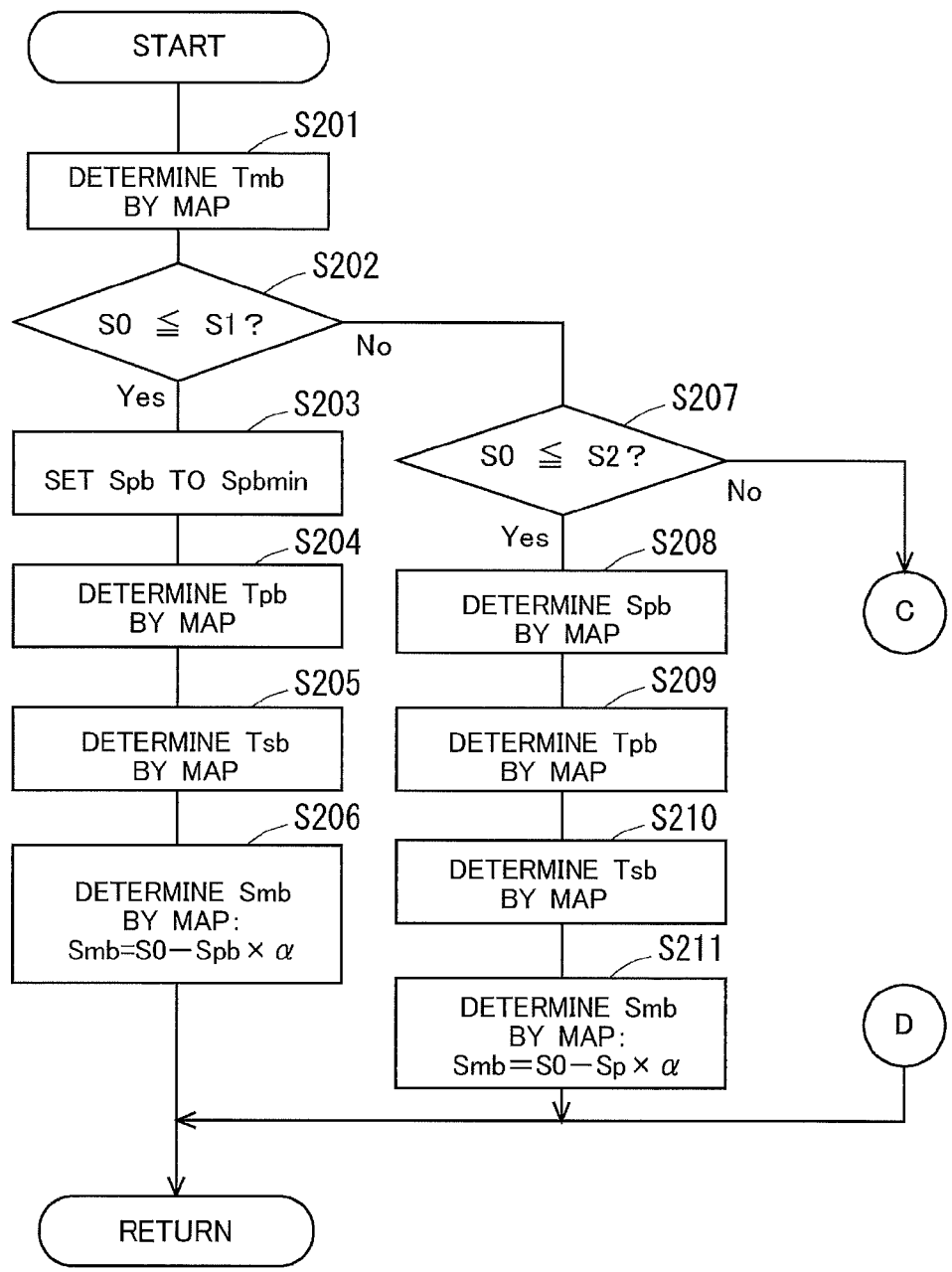
FIG. 13 is a flow chart showing a part of a flow of calculating parameters of the combustion control according to example 1 of the present invention.
Figure 14:
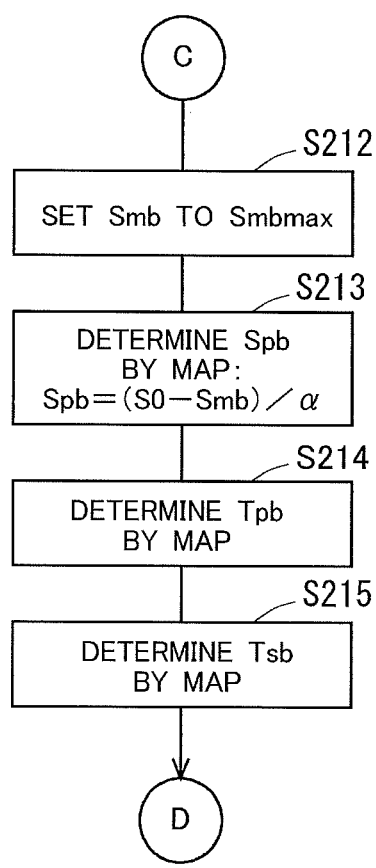
FIG. 14 is a flow chart showing another part of the flow of calculating parameters of the combustion control according to example 1 of the present invention.

A control flow of the combustion control according to this example will be described with reference to FIGS. 11 to 14. FIGS. 11 and 12 are flow charts of the control flow of the combustion control according to this example. FIGS. 13 and 14 are flow charts of calculation of the base values of parameters used in the combustion control according to this example, which include the base first injected fuel quantity Spb, the base second injected fuel quantity Smb, the base first injection time Tpb, the base second injection time Tmb, and the base ignition time Tsb. These flows are stored in the ECU 20 in advance and carried out repeatedly at predetermined intervals by executing a control program stored in the ECU 20 while the internal combustion engine 1 is operating.

Figure 15A:
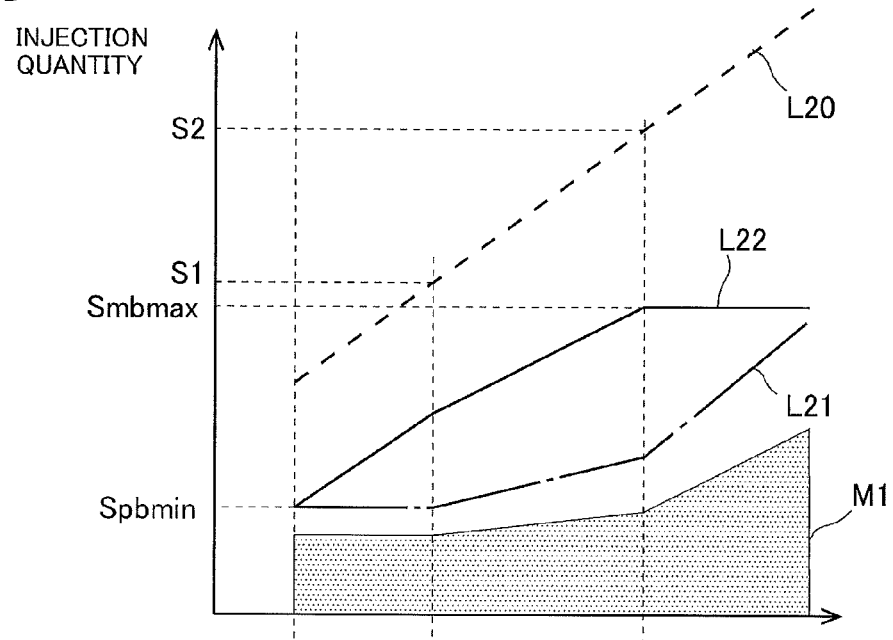
FIGS. 15A and 15B show maps used to calculate the parameters of the combustion control according to example 1 of the present invention.
Figure 15B:
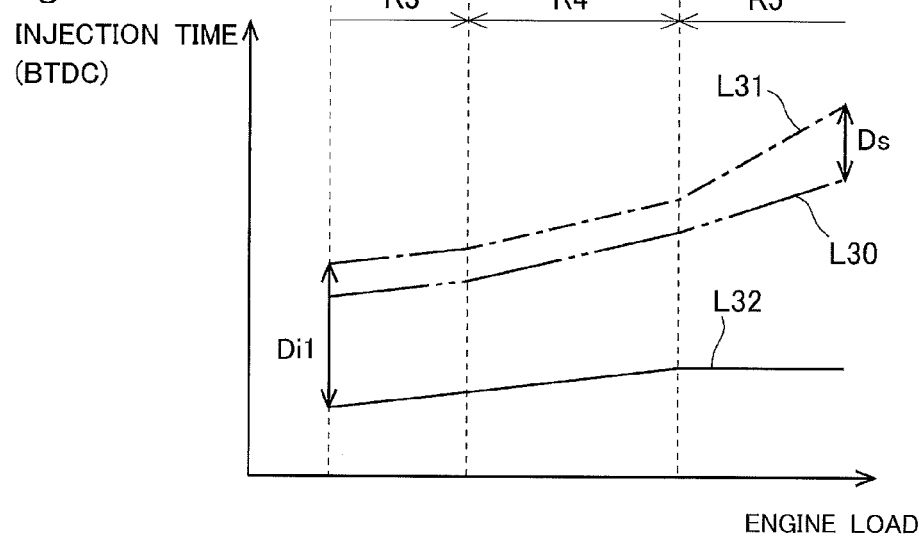

FIGS. 15A and 15B show exemplary maps used to calculate the load-adapted injection quantity (i.e. fuel injection quantity adapted to the engine load of the internal combustion engine 1) S0, the base first injected fuel quantity Spb, the base second injected fuel quantity Smb, the base first injection time Tpb, the base second injection time Tmb, and the base ignition time Tsb in the combustion control according to this example. In the upper graph of FIG. 15A, line L20 represents relationship between the engine load of the internal combustion engine 1 and the load-adapted injection quantity S0, line L21 represents relationship between the engine load and the base first injected fuel quantity Spb, and L22 represents relationship between the engine load and the base second injected fuel quantity Smb. In graph of FIG. 15A, M1 represents the amount of unburned residue of the first injected fuel that remains without being burned by the propagation of flame generated by ignition by the ignition plug 5. In graph of FIG. 15A, S1 is a load-adapted fuel injection quantity corresponding to the engine load on the border between an operation range R3 (which will be hereinafter referred to as "the low load range R3") and another operation range R4 (which will be hereinafter referred to as "the middle load range R4"). This fuel injection quantity S1 will be hereinafter referred to as "the first predetermined quantity S1". In graph of FIG. 16A, S2 (>S1) is a load-adapted fuel injection quantity corresponding to the engine load on the border between the middle range R4 and another operation range R5 (which will be hereinafter referred to as "the high load range R5"). This fuel injection quantity S2 will be hereinafter referred to as "the second predetermined quantity S2".

In the lower graph of FIG. 15B, line L31 represents relationship between the engine load of the internal combustion engine 1 and the base first injection time Tpb, line L30 represents relationship between the engine load and the base ignition time Tsb, and line L32 represents relationship between the engine load and the base second injection time Tmb. The distance between line L31 and line L32 represents the first injection interval Di1, and the distance between line L31 and L30 represents the ignition interval Ds. The vertical axis of graph of FIG. 15B represents the crank angle relative to the top dead center of the compression stroke (BTDC), where larger values represent earlier times during the compression stroke.

In the control flow of the combustion control shown in FIG. 11, firstly in step S101, a target engine load Qet of the internal combustion engine 1 is calculated based on the measurement value of the accelerator position sensor 22. Then, in step S102, a load-adapted injection quantity S0 is calculated based on the target engine load Qet calculated in step S101. Specifically, the load-adapted injection quantity S0 corresponding to the target engine load Qet is calculated using the map represented by line L20 in graph of FIG. 15A. In this example, the relationship between the target engine load and the load-adapted injection quantity S0 is recorded in the control map in which the load-adapted injection quantity S0 increases as the target engine load increases, as represented by line L20. Then, in step S103, the base first injected fuel quantity Spb corresponding to the target engine load Qet, the base second injected fuel quantity Smb corresponding to the target engine load Qet, the base first injection time Tpb corresponding to the target engine load Qet, the base second injection time Tmb corresponding to the target engine load Qet, and the base ignition time Tsb corresponding to the target engine load Qet are calculated according to the flows shown in FIGS. 13 and 14.

In the flow shown in FIG. 13, firstly in step S201, the base second injection time Tmb corresponding to the target engine load Qet is determined using the control map represented by line L32 in graph of FIG. 15B. As described above, in order to improve the thermal efficiency of the internal combustion engine 1, the base second injection time Tmb is set to the proper injection time before the top dead center of the compression stroke. The proper injection time in the internal combustion engine 1 has been measured by an experiment conducted previously for every value of the engine load, and the control map represented by line L32 has been prepared based on the result of the 1 measurement. The base second injection time Tmb is gradually advanced as the engine load increases up to a certain engine load. However, in the high load range R5 (namely, in the range in which the load-adapted injection quantity S0 is equal to or larger than S2), the degree of advancement is kept at an upper limit value. This is because the proper injection time of the second injection time is determined in accordance with the second injected fuel quantity Sm, and the base second injected fuel quantity Smb is fixed to a maximum base second injected fuel quantity Smbmax in the high load range R5, as will be described later.

Then, in step S202, it is determined whether or not the load-adapted injection quantity S0 calculated in step S102 in the flow shown in FIG. 11 is equal to or smaller than the first predetermined quantity S1, in other words, it is determined whether or not the target engine load Qet of the internal combustion engine 1 is in the low load range R3. The low load range R3 is defined as an operation range in which the fuel injection quantity is so small that even if only the second injected fuel quantity is increased in response to increases in the engine load, the possibility of increase in the amount of smoke and the possibility of unstable combustion due to the evaporation latent heat of the second injected fuel are low. If the determination made in step S202 is affirmative, the processing of step S203 is executed next. If the determination made in step S202 is negative, the processing of step S207 is executed next.

If the determination made in step S202 is affirmative, in other words, if the load-adapted injection quantity S0 is equal to or smaller than the first predetermined quantity S1 (namely, if the engine load of the internal combustion engine 1 is in the low load range R3), in step S203, the base first injected fuel quantity Spb is set to a minimum base first injected fuel quantity Spbmin based on the control map represented by line L21 in graph of FIG. 15A. The minimum base first injected fuel quantity Spbmin is the lower value of the base first injected fuel quantity that enables generation of flame serving as an ignition source for starting combustion of the second injected fuel, when the second injection is performed. If the first injected fuel quantity Sp is large, combustion caused by ignition by the ignition plug 5 (i.e. spray guide combustion) is facilitated, and therefore there is a possibility that the unburned residue rate of the first injected fuel may become small. Setting the base first injected fuel quantity Spb to the minimum base first injected fuel quantity Spbmin can make the unburned residue rate as high as possible. Therefore, in the low load range R3, the base first injected fuel quantity Spb is set to the minimum base first injected fuel quantity Spbmin. This makes it possible to attain high thermal efficiency while ensuring stable combustion. As described above, in the low load range R3, only the second injected fuel quantity Sm is increased in response to increases in the engine load, and the base first injected fuel quantity Spb is fixed at the minimum base first injected fuel quantity Spbmin, in the low load range R3, as represented by line L21 in graph of FIG. 15A.

Then, in step S204, the base first injection time Tpb is determined using the control map represented by line L31 in graph of FIG. 15B. In this processing step, the base first injection time Tpb is determined in relation to the base second injection time Tmb determined in step S201 in such a way as to set an appropriate first injection interval Di1 with which a satisfactory thermal efficiency is attained when the first injected fuel quantity is the minimum base first injected fuel quantity Spbmin. As described above, in the low load range R3, the base first injected fuel quantity Spb is fixed at the minimum base first injected fuel quantity Spbmin. Consequently, the first injection interval Di1 is also kept constant in the low load range R3. Therefore, in the low load range R3, when the base second injection time Tmb is changed in response to a change in the engine load, the base first injection time Tpb is also changed in accordance with the change of the base second injection time Tmb.

Then, in step S205, the base ignition time Tsb is determined using the control map represented by line L30 in graph of FIG. 15B. As shown in graph of FIG. 15B, the ignition interval Ds, which is the interval between the base first injection time Tpb and the base ignition time Tsb, is kept constant. Therefore, in the low load range R3, when the base first injection time Tpb is changed in accordance with the change of the base second injection time Tmb, the base ignition time Tsb is also changed in accordance with the change of the base first injection time Tpb.

Then, in step S206, the base second injected fuel quantity Smb is determined using the control map represented by line L22 in graph of FIG. 15A. In the low load range R3, the relationship between the load-adapted injection quantity S0 represented by line S20 and the base second injected fuel quantity Smb is expressed by the following equation 2:

$$Smb = S0 - Spb \times \alpha \qquad \text{(Equation 2)},$$

where $\alpha$ is the unburned residue rate of the first injected fuel.

As described before, in the basic combustion control according to this example, the unburned residue of the first injected fuel self-ignites and is burned by diffusion combustion together with the second injected fuel to contribute to the engine power. Therefore, in terms of contribution to the engine power, a portion of the first injected fuel or the unburned residue of the first injected fuel can be regarded to be equivalent to the second injected fuel. Therefore, an appropriate value of the base second injected fuel quantity Smb can be determined by determining a factor $\alpha$ representing the unburned residue rate of the first injected fuel in advance by an experiment and calculating the base second injected fuel quantity Smb according to the above equation 2, which takes into account this factor $\alpha$. The unburned residue rate of the first injected fuel changes depending on the ignition interval Ds and the first injection interval Di1. Hence, the value of the factor $\alpha$ is determined based on them. In the low load range R3, since the ignition interval Ds and the first injection interval Di1 are both constant, the factor $\alpha$ in the above equation 2 is also a constant value. Moreover, in the low load range R3, the base first injected fuel quantity Spb is fixed at the minimum base first injected fuel quantity Spbmin for the above-described reason, and hence Spb=Spbmin in the above equation 2. In cases where the quantity of fuel burned by ignition by the ignition plug 5 (that is, the quantity of fuel burned by spray guide combustion) is very small relative to the first injected fuel quantity, the factor $\alpha$ may be set to be equal to 1 in the control process. In this case, the control is performed in such a way that the load-adapted injection quantity S0 is equal to the target total fuel injection quantity (or the total fuel injection quantity in one combustion cycle corresponding to the target engine load Qet).

The base values of the parameters relating to the first injection, second injection, and ignition in the low load range R3 are determined in the above-described way. When the operation state of the internal combustion engine 1 is steady-state operation (in other words, when the actual boost pressure is equal to the target boost pressure corresponding to the target engine load Qet) in the low load range R3, if the combustion control is performed with the first injected fuel quantity, the second injected fuel quantity, the first injection time, the second injection time, and the ignition time being set to the respective base values determined as above, an amount of unburned residue of the first injected fuel represented by M1 in graph of FIG. 15A remains after the ignition of the pre-spray of the first injected fuel. As described above, in the low load range R3, the base first injected fuel quantity Spb is fixed at the minimum base first injected fuel quantity Spbmin and the ignition interval Ds and the first injection interval Di1 are also fixed. Consequently, the quantity of the unburned residue of the first injected fuel is substantially constant.

If the determination made in step S202 is negative, namely if the load-adapted injection quantity S0 is larger than the first predetermined quantity S1, it is determined in step S207 whether or not the load-adapted injection quantity S0 determined in step S102 in the flow shown in FIG. 11 is equal to or smaller than the second predetermined quantity S2, in other words, it is determined whether or not the target engine load Qet of the internal combustion engine 1 is in the middle load range R4. The middle load range R4 is defined as an operation range in which if only the second injected fuel quantity is increased in response to increases in the engine load, the possibility of increase in the amount of smoke and the possibility of unstable combustion due to the evaporation latent heat of the second injected fuel are high. Therefore, in the middle load range R4, not only the second injected fuel quantity but also the first injected fuel quantity is increased in response to increases in the engine load. The second predetermined quantity S2 is set as a fuel injection quantity corresponding to the engine load above which the base second injected fuel quantity is set to its upper limit value (the maximum base second injected fuel quantity Smbmax) in view of the amount of smoke generated and the combustion stability, namely, the engine load for which the quantity of fuel that can be injected at the proper injection time reaches the upper limit value. If the determination made in step S207 is affirmative, the processing of step S208 is executed next. If the determination made in step S207 is negative, the processing of step S212 is executed.

If the determination made in step S207 is affirmative, in other words, if the load-adapted injection quantity S0 is larger than the first predetermined quantity S1 and equal to or smaller than the second predetermined quantity S2 (namely, if the engine load of the internal combustion engine 1 is in the middle load range R4), the base first injected fuel quantity Spb is determined using the control map represented by line L21 in graph of FIG. 15A, in step S208. In this processing step, the higher the engine load of the internal combustion engine 1 is, the larger the base first injected fuel quantity Spb is. Then, in step S209, the base first injection time Tpb is determined using the control map represented by line L31 in graph of FIG. 15B. If the first injection interval Di1, which is the interval between the base first injection time Tpb and the base second injection time Tmb, is fixed while the base first injected fuel quantity Spb is increased in response to an increase in the engine load of the internal combustion engine 1, when the first injection is performed with the first injected fuel quantity being set to the base first injected fuel quantity Spb, the larger the base first injected fuel quantity Spb is, the more likely the unburned residue of the first injected fuel and the second injected fuel overlap when the second injection is performed, and the more the amount of smoke generated increases. In view of this, the higher the engine load of the internal combustion engine 1 is, the more the base first injection time Tpb is advanced so as to increase the first injection interval Di1, in step S209. In other words, in the middle load range R4, the base first injection time Tpb is advanced to a degree larger than the degree of advancement of the base second injection time Tmb, and the higher the engine load is, the larger the degree of advancement of the base first injection time Tpb is.

Controlling the base first injection time Tpb in this way can reduce the overlapping of the unburned residue of the first injected fuel and the second injected fuel even when the quantity of the unburned residue of the first injected fuel increases due to an increase in the base first injected fuel quantity Spb. In consequence, the amount of smoke generated due to the overlapping of the unburned residue of the first injected fuel and the second injected fuel can be reduced. Moreover, although the quantity of the unburned residue of the first injected fuel increases with increases in the engine load, the unburned residue is burned in combustion occurring after the start of the second injection to contribute to the engine power as described above, and therefore the thermal efficiency of the internal combustion engine 1 can be kept at high levels.

Then, in step S210, the base ignition time Tsb is determined using the control map represented by line L30 in graph of FIG. 15B. As shown in graph FIG. 15B, in the middle load range R4 also, the ignition interval Ds, which is the interval between the base first injection time Tpb and the base ignition time Tsb, is kept constant. Therefore, when the base first injection time Tpb is advanced to a degree larger than the degree of advancement of the base second injection time Tmb, the base ignition time Tsb is also advanced to a degree substantially the same as the base first injection time Tpb.

Then, in step S211, the base second injected fuel quantity Smb is determined using the control map represented by line L22 in graph of FIG. 15A. In the middle load range R4 also, as with in the low load range R3, the relationship represented by line L22 between the load-adjusted injection quantity S0 and the base second injected fuel quantity Smb is expressed by the aforementioned equation 2. Therefore, the base second injected fuel quantity Smb can be determined taking into account characteristics of the basic combustion control according to this example, as in the processing of step S206. As described before, in the middle load range R4, the base first injected fuel quantity Spb is increased in response to increases in the engine load. Therefore, the increase rate of the base second injected fuel quantity Smb (which is the rate of the increase in the base second injected fuel quantity Smb to the increase in the engine load) in the middle load range R4 is smaller than the increase rate of the base second injected fuel quantity Smb in the low load range R3, in which the base first injected fuel quantity Spb is fixed. Therefore, it is possible to reduce the increase in the smoke due to the increase in the second injected fuel quantity and the occurrence of misfire due to the increase in the evaporation latent heat of the second injected fuel.

The base values of parameters relating to the first injection, second injection, and ignition in the middle load range R4 are determined in the above-described way. When the operation state of the internal combustion engine is steady-state operation (in other words, when the actual boost pressure is equal to the target boost pressure corresponding to the target engine load Qet) in the middle load range R4, if the combustion control is performed with the first injected fuel quantity, the second injected fuel quantity, the first injection time, the second injection time, and the ignition time being set to the respective base values determined as above, an amount of unburned residue of the first injected fuel represented by M1 in graph of FIG. 15A remains after the ignition of the pre-spray of the first injected fuel. As described above, in the middle load range R4, the base first injected fuel quantity Spb is increased in response to increases in the engine load, and the base first fuel injection time Tpb and the base ignition time Tsb are advanced with the ignition interval Ds being kept constant. Consequently, the quantity of the unburned residue of the first injected fuel increases with increases in the engine load.

If the determination made in step S207 is negative, in other words, if the load-adapted injection quantity S0 is larger than the second predetermined value S2, the engine load of the internal combustion engine 1 is in the high load range R5. As described above, the second predetermined quantity S2 is set as a fuel injection quantity corresponding to the engine load above which the base second injected fuel quantity Smb is set to its upper limit value in view of the amount of smoke generated and the combustion stability. Therefore, the high load range R5 is set as an operation range in which only the base first injected furl quantity Spb is increased in response to increases in the engine load.

If the determination made in step S207 is negative, in step S212, the base second injected fuel quantity Smb is set to the maximum base second injected fuel quantity Smbmax according to line L22 in graph of FIG. 15A. The maximum base second injected fuel quantity Smbmax is the largest base second injected fuel quantity with which the amount of smoke generated can be kept within an allowable range and stable combustion can be ensured (namely, misfire due to the evaporation latent heat of the second injected fuel can be prevented from occurring). As shown by line L22 in graph of FIG. 15A, in the high load range R5, the base second injected fuel quantity Smb is fixed at the maximum base second injected fuel quantity Smbmax.

Then, in step S213, the base first injected fuel quantity Spb is determined using the control map represented by line L21 in graph of FIG. 15A. In the high load range R5, the relationship represented by line L21 between the load-adapted injection quantity S0 and the base first injected fuel quantity Spb is expressed by the following equation 3:

$$Spb = (S0 - Smb)/\alpha \quad \text{(Equation 3)},$$

where $\alpha$ is the unburned residue rate of the first injected fuel, as with in equation 2. According to the above equation 3, the base first injected fuel quantity Spb can be determined taking into account characteristics of the basic combustion control according to this example. In the high load range R5, the base second injected fuel quantity Smb is fixed at the maximum base second injected fuel quantity Smbmax for the above-described reason, and hence Smb=Smbmax in the above equation 3. Moreover, in the high load range R5, since the base second injected fuel quantity Smb is fixed at the maximum base second injected fuel quantity Smbmax, the increase rate of the base first injected fuel quantity Spb (i.e. the rate of the increase in the base first injected fuel quantity Spb to the increase in the engine load) is higher than the increase rate of the base first injected fuel quantity Spb in the middle load range R4, in which the base second injected fuel quantity Smb is also increased in response to increases in the engine load.

Then, in step S214, the base first injection time Tpb is determined using the control map represented by line L31 in graph of FIG. 15B. In the high load range R5, since the base second injected fuel quantity Smb is fixed at the maximum base second injected fuel quantity Smbmax, the base second injection time Tmb determined in step S302 is also fixed. On the other hand, as described above, the increase rate of the base first injected fuel quantity Spb in the high load range R5 is larger than the increase rate of the base first injected fuel quantity Spb in the middle load range R4. Therefore, in the high load range R5, it is necessary to make the first injection interval Di1 longer than the first injection interval Di1 in the middle load range R4 in order to reduce overlapping of the unburned residue of the first injected fuel and the second injected fuel when the second injection is performed, and it is also necessary to make the increase rate of the first injection interval Di1 (which is the rate of the increase in the first injection interval Di1 to the increase in the engine load) higher than the increase rate of the first injection interval Di1 in the middle load range R4. Therefore, in step S214, the base first injection time Tpb is advanced in such a way that the higher the engine load of the internal combustion engine 1 is, the longer the first injection interval Di1 is made. Then, the advancement rate of the base first injection time Tpb (which is the rate of the degree of advancement of the base first injection time Tpb to the increase in the engine load) is higher than the advancement rate of the base first injection time Tpb in the middle load range R4. By controlling the base first injection time Tpb in this way, only the first injected fuel quantity is increased in response to increases in the engine load, and the overlapping of the unburned residue of the first injected fuel and the second injected fuel can be reduced, even though the unburned residue of the first injected fuel increases. Consequently, the amount of smoke generated due to the overlapping of the unburned residue of the first injected fuel and the second injected fuel can be reduced. Moreover, even though the unburned residue of the first injected fuel increases as the engine load increases, the thermal efficiency of the internal combustion engine 1 can be kept at high levels because the unburned residue is burned in combustion occurring after the start of the second injection to contribute to the engine power.

Then, in step S215, the base ignition time Tsb is determined using the control map represented by line L30 in graph of FIG. 15B. In the high load range R5 also, the ignition interval Ds, which is the interval between the base first injection time Tpb and the base ignition time Tsb, is kept constant, as shown in graph of FIG. 15B. Therefore, when the base first injection time Tpb is advanced in response to an increase in the engine load, the base ignition time Tsb is also advanced to a degree substantially the same as the base first injection time Tsb, as with in the middle load range R4.

The base values of the parameters relating to the first injection, second injection, and ignition in the high load range R5 are determined in the above-described way. When the operation state of the internal combustion engine is steady-state operation (in other words, when the actual boost pressure is equal to the target boost pressure corresponding to the target engine load Qet) in the high load range R5, if the combustion control is performed with the first injected fuel quantity, the second injected fuel quantity, the first injection time, the second injection time, and the ignition time being set to the respective base values determined as above, an amount of unburned residue of the first injected fuel represented by M1 in graph of FIG. 15A remains after the ignition of the pre-spray of the first injected fuel. As described above, in the high load range R5, as the engine load increases, the base first injected fuel quantity Spb is increased, and the base first injection time Tpb and the base ignition time Tsb are advanced with the ignition interval Ds being kept constant. In consequence, as described above, as the engine load increases, the unburned residue of the first injected fuel increases. Moreover, in the high load range R5, the increase rate of the base first injected fuel quantity Spb and the advancement rate of the base first injection time Tpb (or the increase rate of the first injection interval Di1) are higher than those in the middle load range R4. Consequently, the increase rate of the unburned residue of the first injected fuel relative to the increase in the engine load is higher than that in the middle load range R4. Therefore, it is possible to attain the engine power required by the increase in the engine load only by increasing the first injected fuel quantity.

Referring back to the flow chart in FIG. 11, after the base first injected fuel quantity Spb, the base second injected fuel quantity Smb, the base first injection time Tpb, the base second injection time Tmb, and the base ignition time Tsb corresponding to the target engine load Qet are calculated in step S103, it is determined in step S104 whether or not the actual boost pressure Pin measured by the pressure sensor 73 is substantially equal to the target boost pressure Pint corresponding to the target engine load Qet calculated in step S101. If the actual boost pressure Pin is equal to the target boost pressure Pint, it may be concluded that the operation state of the internal combustion engine 1 is steady-state operation. On the other hand, if the actual boost pressure Pin is different from the target boost pressure Pint, it may be concluded that the operation state of the internal combustion engine 1 is transient operation and that it is in the response delay period in changing the boost pressure now. In step S104, if the difference between the actual boost pressure Pin and the target boost pressure Pint is in a predetermined range, it may be determined that the actual pressure Pin is substantially equal to the target boost pressure Pint. If the determination made in step S104 is affirmative, namely if the operation state of the internal combustion engine 1 is steady-state operation, the processing of step S105 is executed next.

In step S105, the parameters of the combustion control are set to the base values calculated in step S103. Specifically, the first injected fuel quantity Sp, the second injected fuel quantity Sm, the first injection time Tp, the second injection time Tm, and the ignition time Ts are set to the base first injected fuel quantity Spb, the base second injected fuel quantity Smb, the base first injection time Tpb, the base second injection time Tmb, and the base ignition time Tsb calculated in step S103, respectively. Then, in step S106, the first injection and the second injection by the fuel injection valve 6 and ignition by the ignition plug 5 are performed according to the first injected fuel quantity Sp, the second injected fuel quantity Sm, the first injection time Tp, the second injection time Tm, and the ignition time Ts set in step S105. Thereafter, the execution of this process is once terminated.

If the determination made in step S104 is negative, namely if the operation state of the internal combustion engine 1 is transient operation and it is in the response delay period in changing the boost pressure now, the processing of step S107 is executed next. In step S107, it is determined whether or not the actual boost pressure Pin is lower than the target boost pressure Pint. As described above, during the response delay period in changing the boost pressure in the accelerating operation state (e.g. the response delay period dT1 in FIGS. 9A, 9B, 9C, and 9D), the actual boost pressure Pin is lower than the target boost pressure Pint. During the response delay period in changing the boost pressure in the decelerating operation state (e.g. the response delay period dT2 in FIGS. 10A, 10B, 10O, and 10D), the actual boost pressure Pin is higher than the target boost pressure Pint. Therefore, if the determination made in step S107 is affirmative, it may be concluded that the operation state of the internal combustion engine 1 is accelerating operation. Then, in step S108, a factor c1 used to calculate a corrected first injected fuel quantity Spa1, a corrected first injection time Tpa1, and a corrected ignition time Tsa1 in the accelerating operation state is calculated. The factor c1 is calculated based on the actual boost pressure Pin measured by the pressure sensor 73 and the target boost pressure Pint corresponding to the target engine load Qet calculated in step S101 by the following equation 4:

$$c1 = Pint/Pin \qquad \text{(Equation 4)}.$$

In this example, the relationship between the engine load of the internal combustion engine 1 and the boost pressure is determined in advance by, for example, an experiment and stored in the ECU 20 as a map or function. The target boost pressure Pint is calculated using this map or function.

Then, in step S109, the corrected first injected fuel quantity Spa1, the corrected first injection time Tpa1, and the corrected ignition time Tsa1 are calculated by the following equations 5 to 7 using the factor c1 calculated in step S108:

$$Spa1 = Spb \times c1 \qquad \text{(Equation 5)},$$

$$Tpa1 = Tpb \times c1 \qquad \text{(Equation 6)},$$

and $$Tsa1 = Tsb \times c1 \qquad \text{(Equation 7)}.$$

Then, in step S110, a corrected second injected fuel quantity Sma1 and a corrected second injection time Tma1 are calculated by the following equations 8 and 9:

$$Sma1 = Sat - Spa1 \qquad \text{(Equation 8)},$$

where Sat is the target total fuel injection quantity (Sat=Spb+Smb), and $$Tma1 = Tmb \times (Sma1/Smb) \qquad \text{(Equation 9)}.$$

According to the above equations 5 to 9, during the response delay period in changing the boost pressure in the accelerating operation state, in which the actual boost pressure Pin is lower than the target boost pressure Pint (e.g. the response delay period dT1 in FIGS. 9A, 9B, 9C, and 9D), the corrected first injected fuel quantity Spa1 is larger than the base first injected fuel quantity Spb, and the corrected second injected fuel quantity Sma1 is smaller than the base second injected fuel quantity Smb. Moreover, the corrected first injection time Tpa1 and the corrected ignition time Tsa1 are larger than the respective base values. (In other words, the corrected first injection time Tpa1 is earlier than the base first injection time Tpb, and the corrected ignition time Tsa1 is earlier than the base ignition time Tsb.) The corrected second injection time Tma1 is smaller than its base value. (In other words, the corrected second injection time Tma1 is later than the base second injection time Tmb.)

Then, in step S111, the parameters of the combustion control are set to the corrected values calculated in steps S109 and S110. Specifically, the first injected fuel quantity Sp, the second injected fuel quantity Sm, the first injection time Tp, the second injection time Tm, and the ignition time Ts are set to the corrected first injected fuel quantity Spa1, the corrected second injected fuel quantity Sma1, the corrected first injection time Tpa1, the corrected second injection time Tma1, and the corrected ignition time Tsa1 respectively. Then, in step S112, the first injection and the second injection by the fuel injection valve 6 and ignition by the ignition plug 5 are performed according to the first injected fuel quantity Sp, the second injected fuel quantity Sm, the first injection time Tp, the second injection time Tm, and the ignition time Ts set in step S111. Thereafter, the execution of this process is once terminated.

If the determination made in step S107 is negative, it may be concluded that the operation state of the internal combustion engine 1 is decelerating operation. Then, in step S113, a factor c2 used to calculate a corrected first injected fuel quantity Spa2, a corrected first injection time Tpa2, and a corrected ignition time Tsa2 in the decelerating operation state is calculated. The factor c2 is calculated based on the actual boost pressure Pin measured by the pressure sensor 73 and the target boost pressure Pint corresponding to the target engine load Qet calculated in step S101 by the following equation 10:

$$c2 = Pin/Pint \qquad \text{(Equation 10)}.$$

Then, in step S114, the corrected first injected fuel quantity Spa2, the corrected first injection time Tpa2, and the corrected ignition time Tsa2 are calculated by the following equations 11 to 13 using the factor c2 calculated in step S113:

$$Spa2 = Spb \times c2 \qquad \text{(Equation 11)},$$

$$Tpa2 = Tpb \times c2 \qquad \text{(Equation 12)},$$

and $$Tsa2 = Tsb \times c2 \qquad \text{(Equation 13)}.$$

Then in step S115, a corrected second injected fuel quantity Sma2 and a corrected second injection time Tma2 are calculated by the following equations 14 and 15:

$$Sma2 = Sat - Spa2 \qquad \text{(Equation 14)},$$

where Sat is the target total fuel injection quantity (Sat=Spb+Smb), and $$Tma2 = Tmb \times (Sma2/Smb) \qquad \text{(Equation 15)}.$$

According to the above equations 11 to 15, during the response delay period in changing the boost pressure in the decelerating operation state, in which the actual boost pressure Pin is higher than the target boost pressure Pint (e.g. the response delay period dT2 in FIGS. 10A, 10B, 10C, and 10D), the corrected first injected fuel quantity Spa2 is larger than the base first injected fuel quantity Spb, and the corrected second injected fuel quantity Sma2 is smaller than the base second injected fuel quantity Smb. Moreover, the corrected first injection time Tpa2 and the corrected ignition time Tsa2 are larger than the respective base values. (In other words, the corrected first injection time Tpa2 is earlier than the base first injection time Tpb, and the corrected ignition time Tsa2 is earlier than the base ignition time Tsb.) The corrected second injection time Tma2 is smaller than its base value. (In other words, the corrected second injection time Tma2 is later than the base second injection time Tmb.)

In step S116, the parameters of the combustion control are set to the base values calculated in steps S114 and S115. Specifically, the first injected fuel quantity Sp, the second injected fuel quantity Sm, the first injection time Tp, the second injection time Tm, and the ignition time Ts are set to the corrected first injected fuel quantity Spa2, the corrected second injected fuel quantity Sma2, the corrected first injection time Tpa2, the corrected second injection time Tma2, and the corrected ignition time Tsa2 respectively. Then, in step S117, the first injection and the second injection by the fuel injection valve 6 and ignition by the ignition plug 5 are performed according to the first injected fuel quantity Sp, the second injected fuel quantity Sm, the first injection time Tp, the second injection time Tm, and the ignition time Ts set in step S116. Thereafter, the execution of this process is once terminated.

Equations to be used to calculate corrected values of the parameters of the combustion control in this example are not limited to the above equations 4 to 15. In cases where other correction factors and equations are used, the above-described relationships between the base values of the parameters and the corrected values of them also apply during the response delay period in changing the boost pressure in the accelerating operation state, in which the actual boost pressure Pin is lower than the target boost pressure Pint, and during the response delay period in changing the boost pressure in the decelerating operation state, in which the actual boost pressure Pin is higher than the target boost pressure Pint.

In the above-described control, corrected values of the parameters of the combustion control are calculated by equations 4 to 15. Alternatively, the values of the parameters of the combustion control corresponding to the actual boost pressure in the transient operation state may be determined by other methods. For example, a plurality of maps corresponding to different boost pressures respectively and representing relationship between the engine load of the internal combustion engine 1 and the parameters of the combustion control may be prepared and stored in the ECU 20. In this case, one of the maps is selected based on the actual boost pressure and used to calculate the values of the parameters of the combustion control.

In the above-described control flow, the parameters of the combustion control are corrected during the time period in which the actual boost pressure during transient operation is different from the target boost pressure. However, it is not necessarily required that the parameters of the combustion control be corrected throughout the entirety of the response delay period in changing the boost pressure. In the case where the parameters of the combustion control are corrected in a part of the response delay period in changing the boost pressure, improvement of the combustion condition can be achieved during that partial period.

In this example, what are shown in FIGS. 15A and 15B is only exemplary relationships between the engine load of the internal combustion engine 1 and the base values of the parameters of the combustion control, and the relationships between them are not limited to those shown in FIGS. 15A and 15B. For example, in the low load range R3, the base first injected fuel quantity Spb may be increased in response to increases in the engine load. Furthermore, in the high load range R5, the base second injected fuel quantity Smb may be increased in response to increases in the engine load within an allowable range, which is determined taking account of the amount of smoke generated and stability of combustion.

Example 2

In this example, operation ranges equivalent to the low load range R3, the middle load range R4, and the high load range R5 shown in FIGS. 15A and 15B will be referred to as low load range R3, first middle load range R4, and second middle load range R5. In this example also, the basic combustion control and the transient operation control same as those in example 1 are performed in the low load range R3, the first middle load range R4, and the second middle load range R5. In this example, the operation range in which the engine load is higher than the second middle load range will be referred to as high load range, in which high load combustion control is performed. In the following, the high load combustion control according to this example will be described.

[High Load Combustion Control]

In the internal combustion engine 1, when the engine load increases, it is necessary to increase the quantity of fuel injected into the combustion chamber. However, as described above, if the second injected fuel quantity is increased too much, there is a possibility that the amount of smoke may increase and/or the temperature in the combustion chamber may be lowered by the evaporation latent heat of the second injected fuel to make the combustion unstable. As described above, when the first injected fuel quantity is increased, it is possible to reduce the amount of smoke generated by advancing the first injection time, namely by increasing the first injection interval Di1, accordingly. However, the first injection interval Di1 has an upper bound (Di1b in FIG. 7) as shown in FIG. 7, because it is necessary that flame generated by ignition of the first injected fuel serve as an ignition source for combustion of the second injected fuel. If the first injected fuel quantity is further increased with the first injection interval Di1 being kept at the aforementioned upper bound, the unburned residue of the first injected fuel and the second injected fuel are apt to overlap when the second injection is performed. Therefore, if the quantity of the first injected fuel is increased too much, there is a possibility that the amount of smoke generated may increase. In view of this, in the internal combustion engine 1 according to this example, in the high load range in which the quantity of fuel required to be injected into the combustion chamber in one combustion cycle is relatively large, the high load combustion control is performed. In the high load combustion control, third injection through the fuel injection valve 6 is performed in addition to the first fuel injection and the second fuel injection performed in the above-described basic combustion control.

The third injection is performed at a third injection time prior to the first injection time during the compression stroke with a second injection interval Di2 between the third injection time and the first injection time. The second injection interval Di2 is set in such a way that the fuel injected by the third injection (which will be hereinafter referred to as the third injected fuel) is burned by self-ignition or diffusion combustion after the start of the second injection.

Figure 16A:
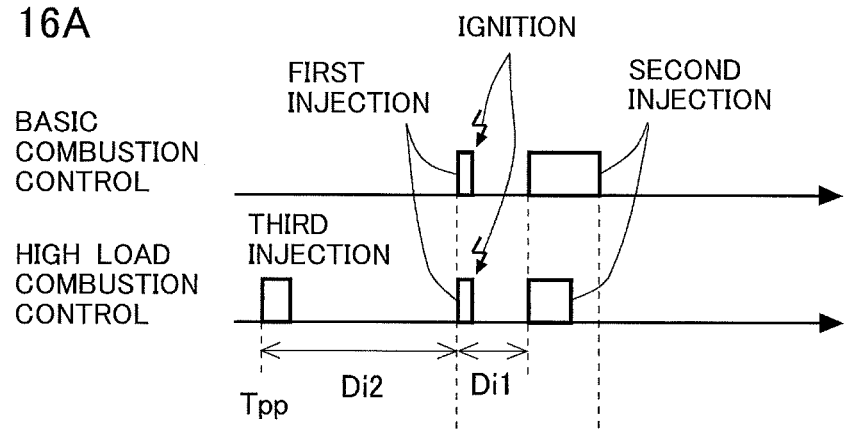
FIGS. 16A and 16B show a variation in the change in the rate of heat release in the combustion chamber between the case where the basic combustion control is performed and in the case where the high load combustion control is performed in the example of the present invention.
Figure 16B:
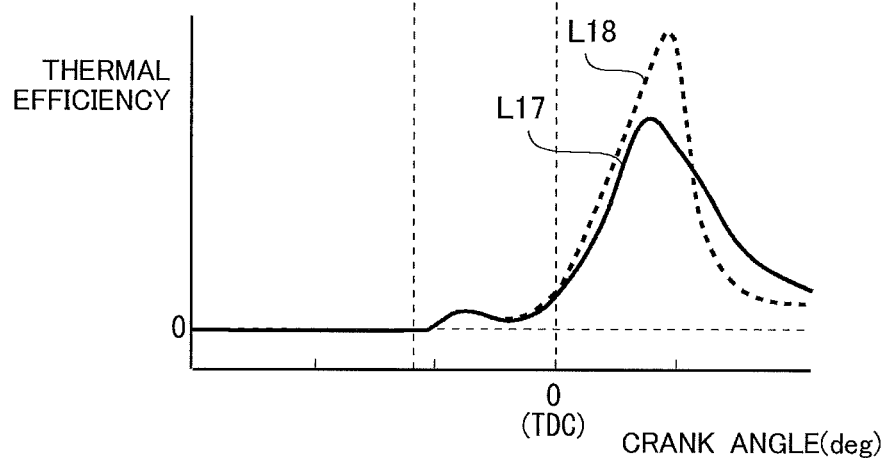

FIGS. 16A and 16B show the change in the rate of heat release in the combustion chamber in the case where the basic combustion control is performed and in the case where the high load combustion control is performed. Diagram of FIG. 16A shows when the fuel injections and ignition are performed in the respective combustion controls. In graph of FIG. 16B, curve L17 represents the change in the rate of heat release in the case where the basic combustion control is performed, and curve L18 represents the change in the rate of heat release in the case where the high load combustion control is performed. In the cases shown in FIGS. 16A and 16B, the total fuel injection quantity in one combustion cycle is the same among the two combustion controls. Thus, the second injected fuel quantity is smaller in the high load combustion control than in the basic combustion control. In the high load combustion control, a quantity of fuel equal to the difference in the second injected fuel quantity from that in the case of the basic combustion control is injected by the third injection. In the case shown in FIGS. 16A and 16B, the engine speed of the internal combustion engine 1 is 2000 rpm.

Since the third injection time Tpp is prior to the first injection time Tp during the compression stroke, the pressure in the combustion chamber at the third injection time Tpp is lower than that at the first injection time Tp. Therefore, the penetration of the spray of the third injected fuel is relatively high, and consequently the third injected fuel tends to diffuse more extensively in the combustion chamber than the first injected fuel. Therefore, if the second injection interval Di2 is set appropriately, it is possible to prevent most part of the third injected fuel from being burned by flame generated by ignition of the pre-spray of the first injected fuel and to enable it to be burned by self-ignition or diffusion combustion after the start of the second injection. In graph of FIG. 16B, the first peak of the rate of heat release represented by line L18 (which is a peak of the rate of heat release attributed to combustion caused by ignition of the pre-spray of the first injected fuel) is substantially the same as the first peak of the rate of heat release represented by line L17 in its time of occurrence and magnitude. It is conjectured from this that the third injected fuel is not burned upon ignition of the pre-spray of the first injected fuel.

It is considered that the third injected fuel, which is burned by self-ignition or diffusion combustion after the start of the second injection, acts in the same manner as the unburned residue of the first injected fuel in the combustion. In graph of FIG. 16B, the second peak of the rate of heat release represented by line L18 (which is the highest peak of the rate of heat release occurring after the top dead center of the compression stroke) is higher than the second peak of the rate of heat release represented by line L17. Moreover, the falling rate from the second peak of the rate of heat release (i.e. the inclination of the graph after the second peak) is higher in line L18 than line L17. It is conjectured from this also that the third injected fuel contributes to the promotion of self-ignition of fuel after the start of the second injection, as with the unburned residue of the first injected fuel.

Since the third injection time is prior to the first injection time, the third injected fuel has diffused more extensively in the combustion chamber than the unburned residue of the first injected fuel at the time when the second injection is performed. Therefore, although the third injected fuel is present in the combustion chamber at the time when the second injection is performed, the third injected fuel is less likely to overlap with the second injected fuel than the unburned residue of the first injected fuel. Therefore, the third injected fuel is less likely to be a cause of smoke than the first injected fuel and the second injected fuel.

In the case where the third injection is performed, at least one of the first injected fuel quantity and the second injected fuel quantity can be made smaller than in the case where a quantity of fuel required by the engine load of the internal combustion engine 1 is injected only by the first injection and the second injection. Therefore, performing the third injection can reduce the amount of smoke derived from the first injected fuel or the second injected fuel. FIGS. 17A and 17B show relationship between the thermal efficiency of the internal combustion engine 1 and the third injected fuel quantity (graph of FIG. 17A) and relationship between the amount of smoke generated and the third injected fuel quantity (graph of FIG. 17B) in the high load combustion control, in a case where the third injected fuel quantity is varied with the total fuel injection quantity by all the injections in one combustion cycle being fixed. In the case shown in FIGS. 17A and 17B, increases in the third injected fuel quantity are counterbalanced by decreases in the second injected fuel quantity, and the first injected fuel quantity is fixed. As shown in graph of FIG. 17A, even when the third injected fuel quantity is increased in the high load combustion control, the thermal efficiency of the internal combustion engine 1 is kept nearly constant. This also shows that the most part of the third injected fuel is burned in combustion occurring after the start of the second injection. As shown in graph of FIG. 17B, as the third injected fuel quantity is increased in the high load combustion control, the amount of smoke generated decreases. This also shows that the third injected fuel is unlikely to be a cause of smoke.

Therefore, in the internal combustion engine 1 according to this example, the high load combustion control as described above is performed in the high load operation state in which the total fuel injection quantity is relatively large, whereby diesel combustion can be caused to occur with reduced smoke as compared to that with the basic combustion control, also in the high load operation state.

[Transient Operation Control in High Load Range]

Control during transient operation in the high load range performed in this example will be described. As described above, it is considered that the third injected fuel acts in the same manner as the unburned residue of the first injected fuel in the combustion. Therefore, in the high load range, the first injection ratio is set to a value equal to the base first injection ratio for the same total fuel injection quantity in one combustion cycle. Moreover, during transient operation by which the engine load is changed to a target engine load, the ratio of the second injected fuel quantity to the total fuel injection quantity in one combustion cycle (i.e. the second injection ratio) and the ratio of the third injected fuel quantity to the total fuel injection quantity in one combustion cycle (i.e. the third injection ratio) are set to values different from the second injection ratio during steady-state operation for the same total fuel injection quantity in one combustion cycle (i.e. the base second injection ratio) and the third injection ratio during steady-state operation for the same total fuel injection quantity in one combustion cycle, in order to improve the combustion condition during transient operation in the high load range. In the following, the third injection ratio during transient operation will be referred to as "the base third injection ratio".

In this example, during transient operation in the high load range also, when the engine load of the internal combustion engine 1 is changed, the total fuel injection quantity in one combustion cycle is increased or decreased instantly to a target total fuel injection quantity corresponding to the target engine load of the transient operation, like in the case shown in FIGS. 9A, 9B, 9C, and 9D or FIGS. 10A, 10B, 10C, and 10D. Moreover, during the response delay period in changing the boost pressure in this operation, the second injected fuel quantity and the third injected fuel quantity relative to the total fuel injection quantity are corrected. A base value of the third injected fuel quantity determined based on the target total fuel injection quantity will be referred to as "the base third injected fuel quantity". The value of the base third injected fuel quantity is determined on the assumption that the operation state of the internal combustion engine 1 is steady-state operation, namely on the assumption that the actual boost pressure is at a value adapted to the engine load. During the response delay period in changing the boost pressure during transient operation in the high load range, the third injected fuel quantity is made larger than the base third injected fuel quantity, and the second injected fuel quantity is made smaller than the base second injected fuel quantity. In other words, during the response delay period in changing the boost pressure, the third injection ratio is made higher and the second injection ratio is made lower than those during the steady-state operation in which the engine load of the internal combustion engine 1 is equal to the target engine load in that transient operation and the total fuel injection quantity in one combustion cycle is equal to the target total fuel injection quantity in that transient operation (namely, the third injection ratio is made higher than the base third injection ratio in the case where the total fuel injection quantity in one combustion cycle is equal to the target total fuel injection quantity in that transient operation, and the second injection ratio is made lower than the base second injection ratio in the case where the total fuel injection quantity in one combustion cycle is equal to the target total fuel injection quantity in that transient operation).

By the above-described control, during the response delay period in changing the boost pressure in the accelerating operation state, in which the quantity of oxygen is deficient relative to the quantity of fuel in the combustion chamber, the quantity of oxygen needed to burn the second injected fuel when the second injection is performed becomes smaller. Therefore, it is possible to prevent deficiency of oxygen needed to burn the second injected fuel. Consequently, the amount of smoke generated can be reduced. As described above, the third injected fuel is less likely to be a cause of smoke than the first injected fuel and the second injected fuel. Therefore, making the third injected fuel quantity larger than the base third injected fuel quantity during the response delay period in changing the boost pressure in the accelerating operation state is unlikely to lead to an increase in the amount of smoke generated.

As described above, a large part of the third injected fuel is not burned by propagation of flame generated by ignition of the pre-spray of the first injected fuel. Nevertheless, a portion of the third injected fuel present around the ignition plug 5 at the time when the pre-spray of the first injected fuel is ignited is burned by the ignition. Increasing the third injected fuel quantity leads to an increase in the third injected fuel present around the ignition plug 5 at the time of ignition of the pre-spray. Consequently, the air-fuel ratio in the region in which the pre-spray is formed becomes lower than that in the case where the third injected fuel quantity is equal to the base third injected fuel quantity. Therefore, by the above-described control, the air-fuel ratio in the region in which the pre-spray is formed can be prevented from becoming excessively high during the response delay period in changing the boost pressure in the decelerating operation state, in which the quantity of oxygen is overabundant relative to the quantity of fuel in the combustion chamber. Consequently, the ignitability in ignition of the pre-spray by the ignition plug 5 can be enhanced, and flame by which combustion of the second injected fuel is started can be generated reliably. Consequently, stability of diesel combustion can be improved.

In the high load combustion control according to this example, the third injection time is determined based on the engine load of the internal combustion engine 1 in such a way that the second injection interval as described above is provided between the first injection time and the third injection time. A base value of the third injection time corresponding to the base third injected fuel quantity will be referred to as "the base third injection time". The value of the third base injection time is determined on the assumption that the operation state of the internal combustion engine 1 is steady-state operation, namely on the assumption that the actual boost pressure is at a value adapted to the engine load.

In the high load range, in the transient operation state also, the first injection time is set to the base first injection time for the same total fuel injection quantity in one combustion cycle. Moreover, during the response delay period in changing the boost pressure, in which the second injected fuel quantity and the third injected fuel quantity are corrected as described above, the second injection time and the third injection time are also corrected. Specifically, during the response delay period in changing the boost pressure during transient operation in the high load range, the third injected fuel quantity is made larger than the base third injected fuel quantity, and the third injection time is advanced from (or made earlier than) the base third injection time. In other words, during the response delay period in changing the boost pressure during transient operation in the high load range, the third injection time is advanced from (or made earlier than) that during the steady-state operation in which the engine load of the internal combustion engine 1 is equal to the target engine load in that transient operation and the total fuel injection quantity in one combustion cycle is equal to the target total fuel injection quantity in that transient operation. In this case, the degree of advancement of the third injection time from the base third injection time is set in accordance with the amount of increase in the third injected fuel quantity from the base third injected fuel quantity.

As the third injection time is advanced, the third injected fuel tends to diffuse more extensively in the combustion chamber. Hence, the quantity of the third injected fuel that is not burned by propagation of flame generated by ignition by the ignition plug 5 but by self-ignition or diffusion combustion after the start of the second injection increases. During the response delay period in changing the boost pressure in the accelerating operation state during which the pressure in the cylinder is lower than that during the steady-state operation in which the total fuel injection quantity in one combustion cycle is equal to the target total fuel injection quantity Sat in the accelerating operation state, advancing the third injection time from the base third injection time when making the third injected fuel quantity larger than the base third injected fuel quantity can provide advantageous effects same as advancing the first injection time from the base first injection time when making the first injected fuel quantity larger than the base first injected fuel quantity. Specifically, the amount of smoke generated can be reduced, and the deterioration of thermal efficiency due to the increase in the third injected fuel quantity can be reduced. Moreover, during the response delay period in changing the boost pressure in the decelerating operation state during which the pressure in the cylinder is higher than that during the steady-state operation in which the total fuel injection quantity in one combustion cycle is equal to the target total fuel injection quantity Sat in the decelerating operation state, the third injected fuel is not apt to diffuse. Therefore, if the third injection time is set to the base third injection time while making the third injected fuel quantity larger than the base third injected fuel quantity, there is a possibility that the quantity of the third injected fuel that is burned by propagation of flame generated by ignition of the pre-spray may increase excessively. If this is the case, while the ignitability of the pre-spray during the response delay period in changing the boost pressure is improved, oxygen present around the ignition plug 5 is consumed too much in the combustion of the third injected fuel. In consequence, oxygen available for combustion of the second injected fuel when the second injection is performed becomes deficient, leading to an increase in the amount of smoke generated. In this case, if the third injection time is advanced from the base third injection time, the third injected fuel is apt to diffuse more extensively. Therefore, the quantity of the third injected fuel that is burned by propagation of flame generated by ignition of the pre-spray can be prevented from increasing too much. Therefore, oxygen present around the ignition plug 5 can be prevented from being consumed too much in combustion of the third injected fuel. For the above reasons, as with advancing the first injection time when making the first injected fuel quantity larger than the base first injected fuel quantity, advancing the third injection time from the base third injection time when making the third injected fuel quantity larger than the base third injected quantity can improve the ignitability in ignition of the pre-spray and reduce the amount of smoke generated.

During the response delay period in changing the boost pressure during transient operation in the high load range, the second injected fuel quantity is made smaller than the base second injected fuel quantity, and the second injection time is retarded from (or made later than) the base second injection time. In other words, during the response delay period in changing the boost pressure during transient operation in the high load range, the second injection time is retarded from (or made later than) that during steady-state operation in which the engine load of the internal combustion engine 1 is equal to the target engine load and the total fuel injection quantity in one combustion cycle is equal to the target total fuel injection quantity. In this case, the degree of retardation of the second injection time from the base second injection time is set in accordance with the amount of decrease in the second injected fuel quantity from the base second injected fuel quantity. By retarding the second injection time, knocking can be prevented from occurring during accelerating operation. Moreover, the second injection time can be kept at the proper injection time. The second injection time can be kept at the proper injection time during decelerating operation also.

Also in cases where the above-described correction of the second injected fuel quantity and the third injected fuel quantity is performed during the response delay period in changing the boost pressure in the accelerating operation state with the second injection time and the third injection time being set to the base second injection time and the base third injection time respectively, the amount of smoke generated can be reduced to some extent. Also in cases where the above-described correction of the second injected fuel quantity and the third injected fuel quantity is performed during the response delay period in changing the boost pressure in the decelerating operation state with the second injection time and the third injection time being set to the base second injection time and the base third injection time respectively, the advantageous effect of improvement of the ignitability in ignition of the pre-spray by the ignition plug 5 can be enjoyed. Therefore, the correction of the second injection time and the third injection time during the response delay period in changing the boost pressure is not essential control that is necessary in order to achieve the advantageous effects of reducing the amount of smoke generated in the accelerating operation state or improving the ignitability in ignition of the pre-spray in the decelerating operation state.

During the response delay period in changing the boost pressure in the transient operation state, only one of the above-described correction of the second injection time and correction of the third injection time may be performed. In the case where the third injection time is advanced in the above-described manner for correction, the interval between the third injection time and the first injection time becomes larger than that in the case where the third injection time is set to the base third injection time. In the case where the third injection time is advanced for correction, it is advanced to such a degree that the interval between the third injection time and the first injection time allows the third injected fuel to burn by self-ignition or diffusion combustion after the start of the second injection, in order to maintain the mode of combustion according to this example. In the case where the second injection time is retarded in the above-described manner for correction, the interval between the first injection time and the second injection time becomes larger than that in the case where the second injection time is set to the base second injection time. In the case where the second injection time is retarded for correction, it is retarded to such a degree that the interval between the first injection time and the second injection time allows combustion of the second injected fuel to be started by flame generated by ignition of the pre-spray, in order to maintain the mode of combustion according to this example.

In the transient operation state in the high load range also, the total fuel injection quantity in one combustion cycle may be changed gradually. Specifically, in the case of accelerating operation, the total fuel injection quantity in one combustion cycle may be increased to the target total fuel injection quantity gradually over a certain period of time after the required engine load is increased (namely after the accelerator opening degree is increased). In the case of decelerating operation, the total fuel injection quantity in one combustion cycle may be decreased to the target total fuel injection quantity gradually over a certain period of time after the required engine load is decreased (namely after the accelerator opening degree is decreased). In such cases also, there is a response delay in changing the boost pressure. Therefore, the above-described correction of the second injection ratio and the third injection ratio in the transient operation state can improve the combustion condition. In the case where the total fuel injection quantity in one combustion cycle is changed gradually during transient operation, the increasing correction of the third injected fuel quantity and the decreasing correction of the second injected fuel quantity are performed on the basis of the base third injected fuel quantity and the base second injected fuel quantity corresponding to the total fuel injection quantity in one combustion cycle at the moment during the transient operation.

[Combustion Control Flow]

Figure 18:
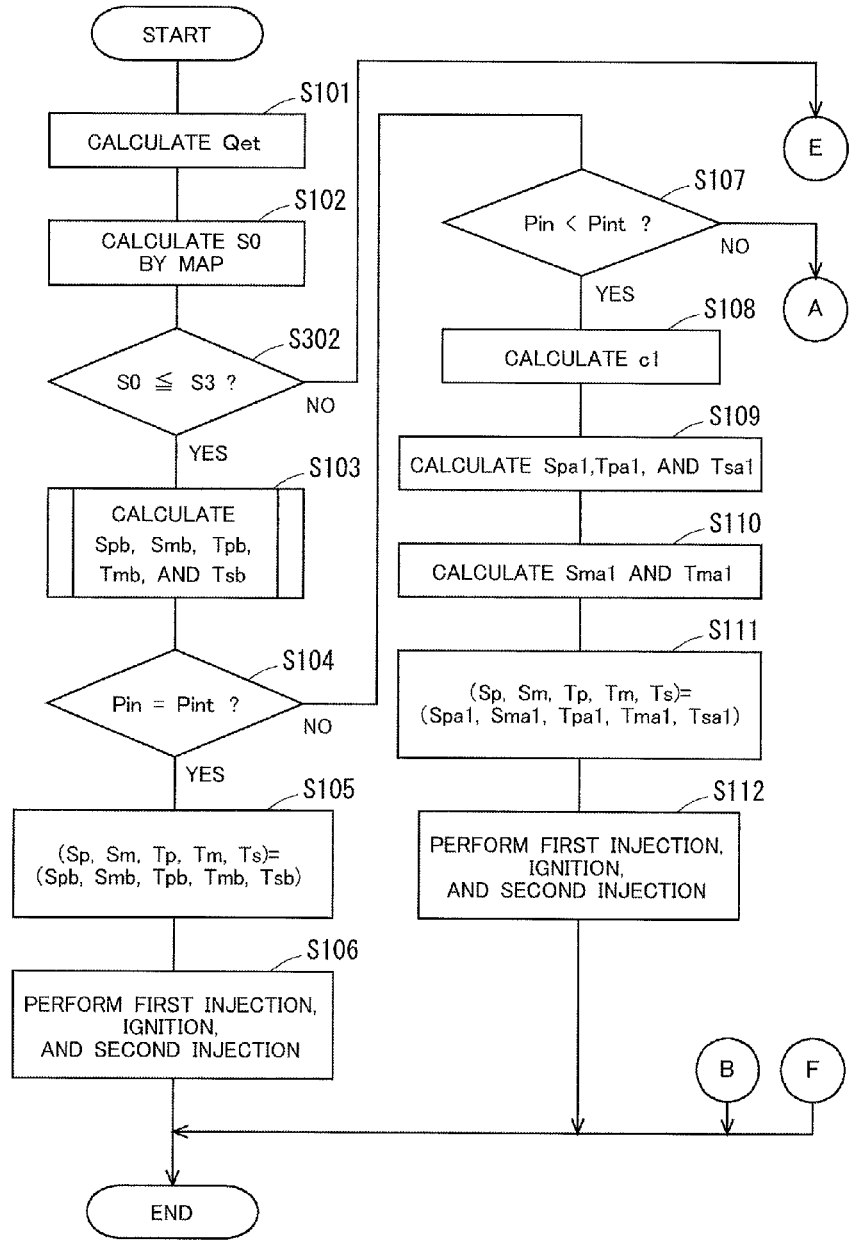
FIG. 18 is a flow chart showing a part of a control flow of combustion control according to example 2 of the present invention.
Figure 19:
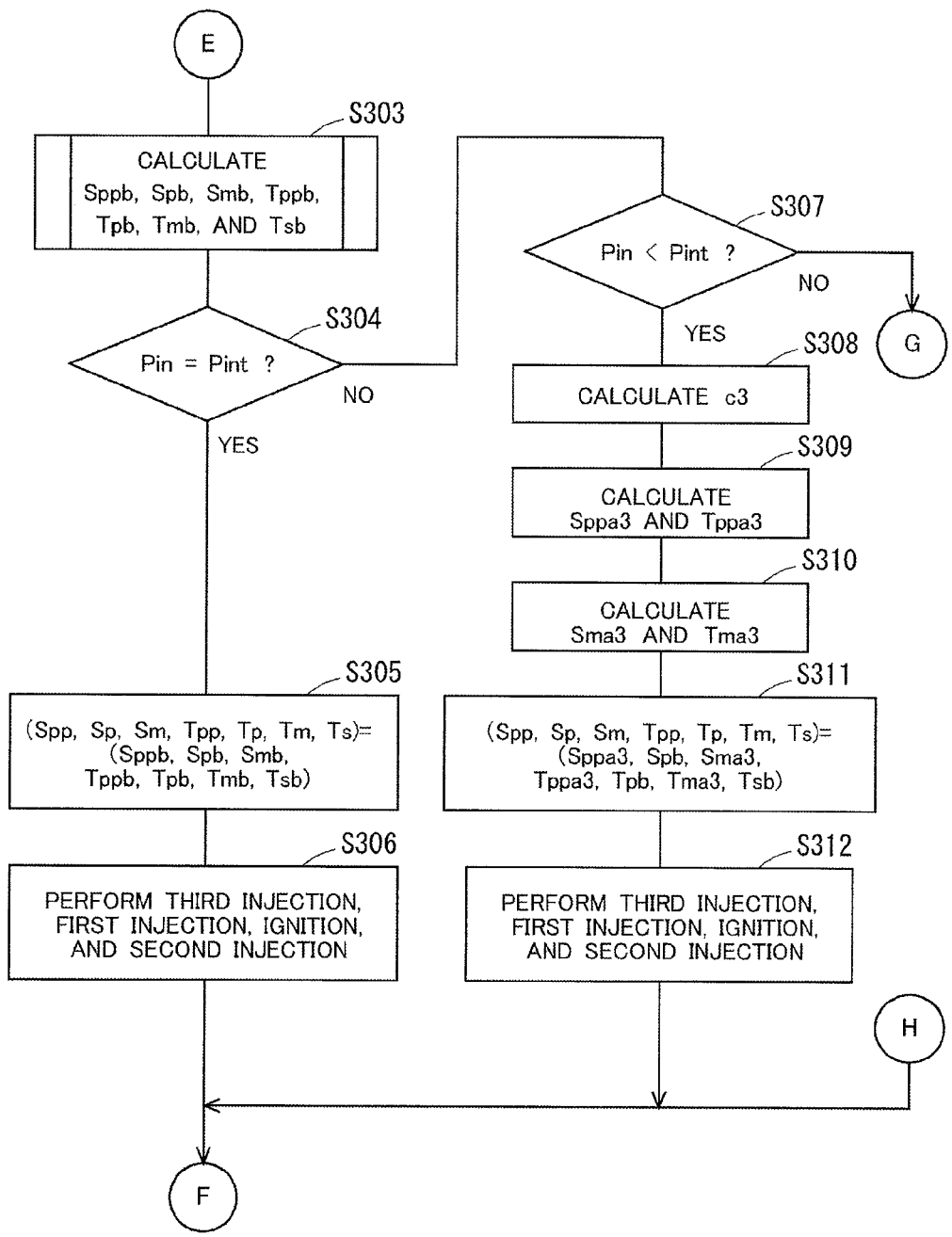
FIG. 19 is a flow chart showing another part of the control flow of the combustion control according to example 2 of the present invention.
Figure 20:
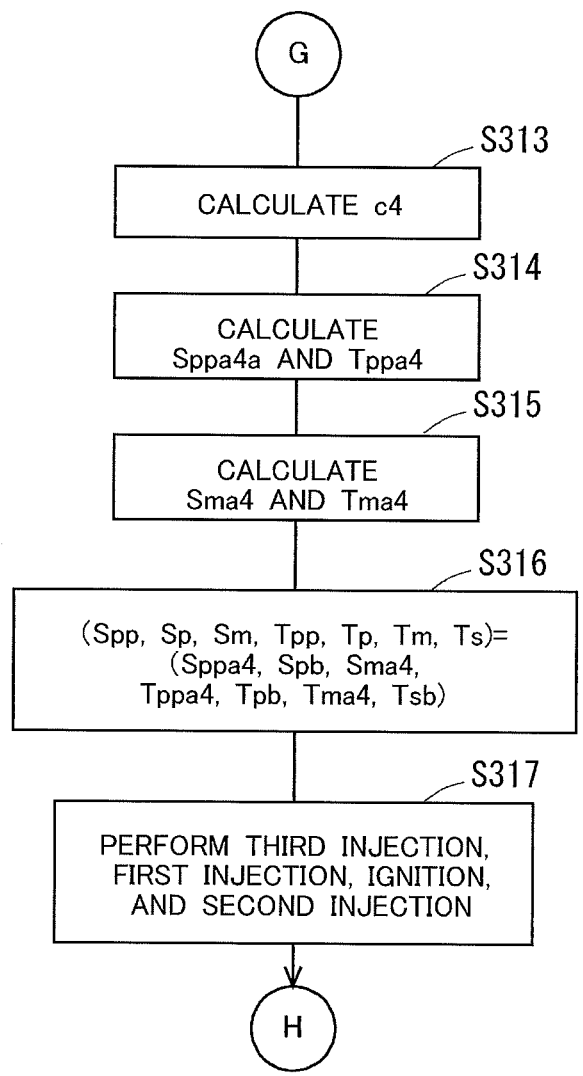
FIG. 20 is a flow chart showing still another part of the control flow of the combustion control according to example 2 of the present invention.
Figure 21:
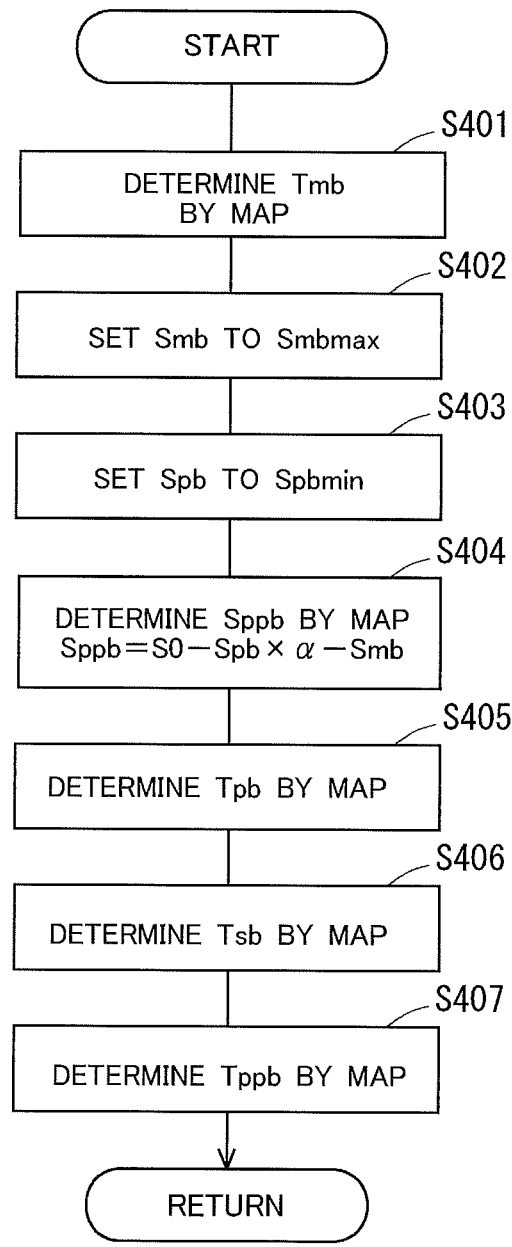
FIG. 21 is a flow chart showing a flow of calculating the parameters of the combustion control according to example 2 of the present invention.

In the following, a control flow of the combustion control according to this example will be described with reference to FIGS. 18 to 21. FIGS. 18 to 20 are flow charts of the control flow of the combustion control according to this example. Steps S101 through S112 in this flow are the same as those in the flow shown in FIG. 11. The processing in these steps will not be described unless necessary. FIG. 21 is a flow chart of calculation of the base values of parameters used in the combustion control according to this example, which include the base first injected fuel quantity Spb, the base second injected fuel quantity Smb, the base third injected fuel quantity Sppb, the base first injection time Tpb, the base second injection time Tmb, the base third injection time Tppb, and the base ignition time Tsb. As will be described later, this flow is the flow of calculating the base values of the parameters in the high load range R6. In this example also, the base values of the parameters in the low load range R3, the first middle load range R4, and the second middle load range R5 are calculated according to the flows shown in FIGS. 13 and 14. The flows shown in FIGS. 18 to 21 are stored in the ECU 20 in advance and carried out repeatedly at predetermined intervals by executing a control program stored in the ECU 20 while the internal combustion engine 1 is operating.

Figure 22A:
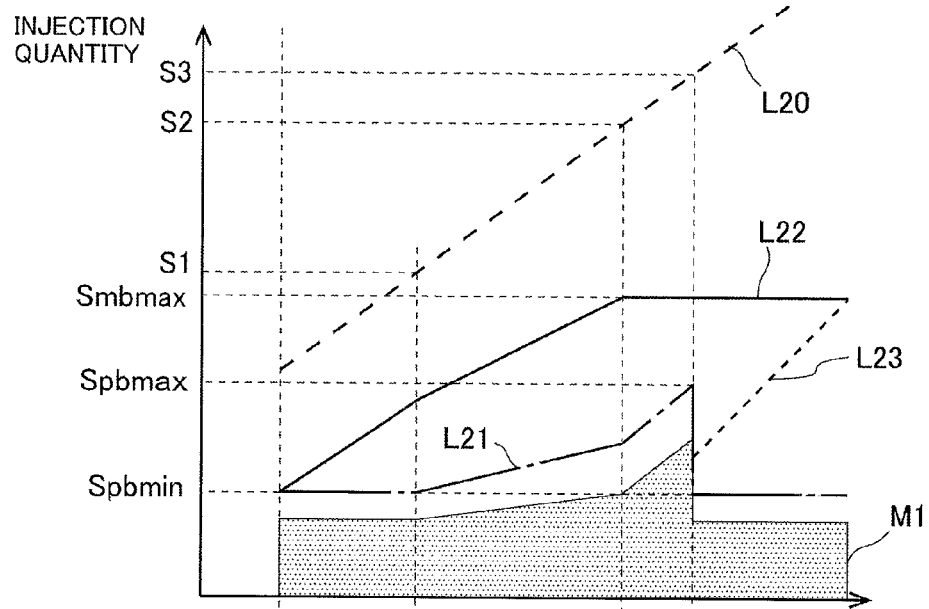
FIGS. 22A and 22B show maps used to calculate the parameters of the combustion control according to example 2 of the present invention.
Figure 22B:
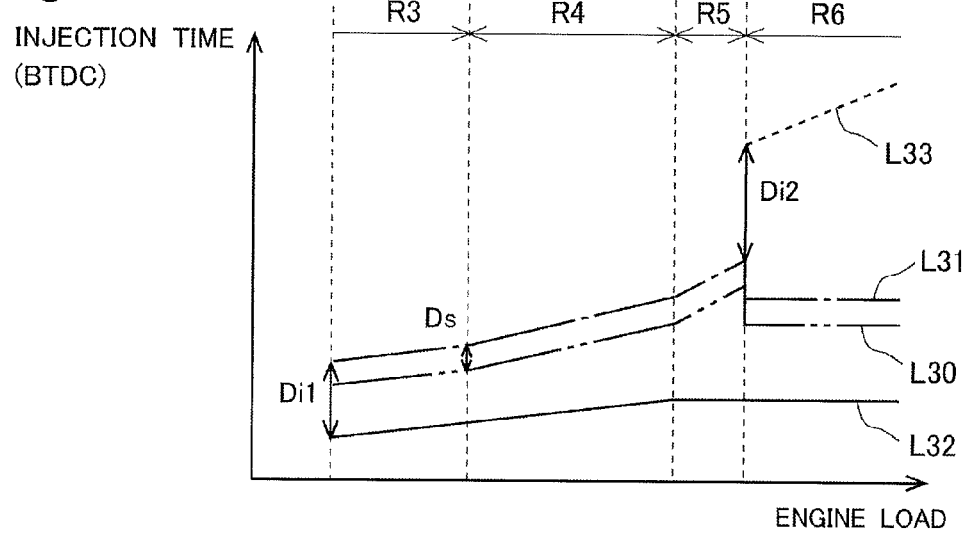

FIGS. 22A and 22B show exemplary maps used to calculate the load-adapted injection quantity S0, the base first injected fuel quantity Spb, the base second injected fuel quantity Smb, the base third injected fuel quantity Sppb, the base first injection time Tpb, the base second injection time Tmb, the base third injection time Tppb, and the base ignition time Tsb in the combustion control according to this example. In the upper graph of FIG. 22A, as in graph of FIG. 15A, line L20 represents relationship between the engine load of the internal combustion engine 1 and the load-adapted injection quantity S0, line L21 represents relationship between the engine load and the base first injected fuel quantity Spb, and line L22 represents relationship between the engine load and the base second injected fuel quantity Smb. In graph of FIG. 22A, line L23 represents relationship between the engine load of the internal combustion engine 1 and the base third injected fuel quantity Sppb. In graph of FIG. 22A, M1 represents the amount of unburned residue of the first injected fuel that remains without being burned by the propagation of flame generated by ignition by the ignition plug 5. In graph of FIG. 22A, the first predetermined quantity S1 is a fuel injection quantity corresponding to the engine load on the border between the low load range R3 and the first middle load range R4, and the second predetermined quantity S2 is a fuel injection quantity corresponding to the engine load on the border between the first middle range R4 and the second middle load range R5. Furthermore, in graph of FIG. 22A, S3 (>S2) is a fuel injection quantity corresponding to the engine load on the border between the second middle load range R5 and the high load range R6. This fuel injection quantity S3 will be hereinafter referred to as the third predetermined quantity S3.

In the lower graph of FIG. 22B, as in graph of FIG. 15B, line L31 represents relationship between the engine load of the internal combustion engine 1 and the first injection time Tp, line L30 represents relationship between the engine load and the ignition time Ts, and line L32 represents relationship between the engine load and the second injection time Tm. Furthermore, in graph of FIG. 22B, line L33 represents relationship between the engine load and the third injection time Tpp. The distance between line L31 and line L32 represents the first injection interval Di1, the distance between line L31 and line L30 represents the ignition interval Ds, and the distance between line L33 and line L31 represents the second injection interval Di2. As with the vertical axis in graph of FIG. 15B, the vertical axis of graph of FIG. 22B represents the crank angle (BTDC) from the top dead center of the compression stroke, where larger values represent earlier times during the compression stroke. In step S103 of the control flow shown in FIG. 18, the base first injected fuel quantity Spb, the base second injected fuel quantity Smb, the base first injection time Tpb, the base second injection time Tmb, and the base ignition time Tsb are calculated according to the flows shown in FIGS. 13 and 14. The maps shown in FIGS. 22A and 22B are used in the steps of calculating the parameter in this process. In the maps shown in FIGS. 22A and 22B, the relationships between the engine load of the internal combustion engine 1 and the control parameters in the low load range R3, the first middle load range R4, and the second middle range R5 are the same as those in the maps shown in FIGS. 15A and 15B.

In the control flow of the combustion control shown in FIG. 18, after the load-adapted injection quantity S0 is calculated in step S102, the processing of step S302 is executed. In step S302, it is determined whether or not the load adapted injection quantity S0 is equal to or smaller than the third predetermined quantity S3. If the determination made in step S302 is affirmative, namely if the load-adapted injection quantity S0 is equal to or smaller than the third predetermined quantity S3, the target engine load Qet of the internal combustion engine 1 is in the low load range R3, the first middle load range R4, or the second middle load range R5. In this case, the processing of step S103 is executed next. On the other hand, if the determination made in step S302 is negative, namely if the load-adapted injection quantity S0 is larger than the third predetermined quantity S3, the engine load of the internal combustion engine 1 is in the high load range R6. The third predetermined quantity S3 is set as a fuel injection quantity adapted to the engine load at which not only the base second injected fuel quantity Smb but also the base first injected fuel quantity Spb reaches its upper limit value in view of the amount of smoke generated when a quantity of fuel adequate for the load-adapted injection quantity S0 is injected only by the first injection and the second injection without performing the third injection. In other words, the third predetermined quantity S3 is equal to the sum of the upper limit value of the base first injected fuel quantity and the upper limit value of the base second injected fuel quantity. Therefore, the high load range R6 is defined as an operation range in which the third injection is performed in addition to the first injection and the second injection, and the base third injected fuel quantity Sppb is increased in response to increases in the engine load.

If the determination made in step S302 is negative, the base first injected fuel quantity Spb corresponding the target engine load Qet, the base second injected fuel quantity Smb corresponding the target engine load Qet, the base third injected fuel quantity Sppb corresponding the target engine load Qet, the base first injection time Tpb corresponding the target engine load Qet, the base second injection time Tmb corresponding the target engine load Qet, the base third injection time Tppb corresponding the target engine load Qet, and the base ignition time Tsb corresponding the target engine load Qet are calculated in step S303 according to the flow shown in FIG. 21.

In the flow shown in FIG. 21, first in step S401, the base second injection time Tm corresponding the target engine load Qet is determined using the map represented by line L32 in graph of FIG. 22B. As will be described later, in the high load range R6, the base second injected fuel quantity Smb is fixed at the maximum base second injected fuel quantity Smbmax, as in the second middle load range R5. Therefore, in the high load range R6, the degree of advancement of the base second injection time Tmb is fixed at its upper limit value, in the same manner as in the second middle load range R5.

Then, in step S402, the base second injected fuel quantity Smb is set to the maximum base second injected fuel quantity Smbmax according to the map represented by line L22 in graph of FIG. 22A, in the same manner as in the case where the engine load is in the second middle load range R5. Thus, in the high load rage R6, the base second injected fuel quantity Smb is fixed at the maximum base second injected fuel quantity Smbmax as represented by line L22 in graph of FIG. 22A, in the same manner as in the second middle load range R5.

Then, in step S403, the base first injected fuel quantity Spb is set to the minimum base first injected fuel quantity Spbmin according to the map represented by line L21 in graph of FIG. 22A. Thus, in the high load range R6, the base first injected fuel quantity Spb is fixed at the minimum base first injected fuel quantity Spbmin as represented by line L21 in graph of FIG. 22A, in the same manner as in the low load range R3.

Then, in step S404, the base third injected fuel quantity Sppb is determined using the map represented by line L23 in graph of FIG. 22A. In the high load range R6, the relationship represented by line L23 between the load-adapted injection quantity S0 and the base third injected fuel quantity Sppb is expressed by the following equation 16:

$$Sppb = S0 - Spb \times \alpha - Smb \qquad \text{(Equation 16)},$$

where $\alpha$ is the unburned residue rate of the first injected fuel, as in equation 2. As described above, in the high load combustion control according to this example, the most part of the third injected fuel is burned by self-ignition or diffusion combustion together with the second injected fuel to contribute to the engine power in normal cases (namely when the actual boost pressure is equal to the boost pressure adapted to the engine load, as is the case in steady-state operation). Therefore, in terms of contribution to the engine power, the third injected fuel can be regarded to be equivalent to the second injected fuel. Therefore, a value of the base third injected fuel quantity Sppb adequate for attaining the fuel injection quantity adapted to the engine load can be determined by calculation according to the above equation 10. In the high load range R6, the base second injected fuel quantity Smb is fixed to the maximum base second injected fuel quantity Smbmax, and hence Smb=Smbmax in the above equation 10. Furthermore, in the high load range R6, the base first injected fuel quantity Spb is fixed at the minimum base first injected fuel quantity Spbmin, and hence Spb=Spbmin in the above equation 10. As will be described later, in the high load range R6, the base first injection time Tpb, the base second injection time Tmb, and the base ignition time Tsb are all constant, and the ignition interval Ds and the first injection interval Di1 are both constant accordingly. In consequence, the factor $\alpha$ in the above equation 10 is a constant value. Therefore, in the high load range R6, as the engine load increases, the base third injected fuel quantity Sppb is increased in accordance with the increase in the engine load.

In cases where it is necessary to inject a relatively large quantity of fuel as the third injected fuel or where it is difficult to provide a sufficiently long second injection interval, the proportion of the fuel that is burned by flame generated by ignition after the first injection in the third injected fuel may become large. If this proportion becomes significantly large, it is necessary in determining the base third injected fuel quantity Sppb to take into account the quantity of fuel burned by flame generated by ignition after the first injection. In such cases, the base third injected fuel quantity Sppb may be calculated according to the following equation 16':

$$Sppb = (S0 - Spb \times \alpha - Smb) \times (1/\beta) \qquad \text{(Equation 16')},$$

where $\beta$ is the proportion of the fuel subject to self-ignition or diffusion combustion after the start of the second injection in the third injected fuel.

The factor $\beta$ in the above equation 16' can be determined in advance based on, for example, an experiment. An appropriate value of the base third injected fuel quantity Sppb can be determined by calculation according to the above equation 16', which takes into account the above-mentioned factor $\beta$.

Then, in step S405, the base first injection time Tpb is determined using the map represented by line 31 in graph of FIG. 22B. In the high load range R6, since the base second injected fuel quantity Smb is fixed at the maximum base second injected fuel quantity Smbmax, the base second injection time Tmb determined in step S401 is also kept constant. Moreover, in the high load range R6, the base first injected fuel quantity Spb is also fixed at the minimum base first injected fuel quantity Spbmin. Consequently, in the high load range R6, the base first injection time Tpb, which is determined in relation to the base second injection time Tmb in such a way as to set an appropriate first injection interval Di1 with which a satisfactory thermal efficiency is attained when the base first injected fuel quantity Spb is the minimum base first injected fuel quantity Spbmin, is also constant.

Then, in step S406, the base ignition time Tsb is determined using the control map represented by line L30 in graph of FIG. 22B. As shown in graph of FIG. 22B, the ignition interval Dsb, which is the interval between the base first injection time Tpb and the base ignition time Tsb, is kept constant. Consequently, in the high load range R6, the base ignition time Tsb is also kept constant.

Then, in step S407, the base third injection time Tppb is determined using the control map represented by line L33 in graph of FIG. 22B. As described above, in the high load combustion control according to this example, it is necessary to provide an appropriate second injection interval Di2 as the interval between the base first injection time Tpb and the base third injection time Tppb so that the third injected fuel is burned by self-ignition or diffusion combustion after the start of the second injection. Therefore, the base third injection time Tppb is determined relative to the base first injection time Tpb in such a way that the second injection interval Di2 as such is provided. In the high load range R6, as described above, the base third injected fuel quantity Sppb is increased in response to increases in the engine load. Therefore, in the high load range R6, as shown in graph of FIG. 22B, as the engine load increases up to a certain engine load, the base third injection time Tppb is advanced in such a way as to increase the second injection interval Di2. The larger the second injection interval Di2 is, the more extensively the third injected fuel is diffused in the combustion chamber till the time at which the first injection is performed. The more the third injection time is advanced, the lower the pressure in the combustion chamber at the third injection time is, and hence the higher the penetration of the spray of the third injected fuel is relatively. For this reason also, the more the base third injection time Tppb is advanced, the more extensively the third injected fuel is diffused in the combustion chamber. As the third injected fuel is diffused more extensively in the combustion chamber, the third injected fuel is unlikely to be burned by propagation of flame generated by ignition of the pre-spray of the first injected fuel (namely, the proportion of the fuel that is burned by propagation of flame generated by ignition in the third injected fuel decreases more).

In the high load range R6, the base values of the parameters relating to the first injection, second injection, third injection, and ignition are determined in the above-describe way. When the operation state of the internal combustion engine 1 is steady-state operation (in other words, when the actual boost pressure is equal to the target boost pressure corresponding to the target engine load Qet) in the high load range R6, if the combustion control is performed with the first injected fuel quantity, the second injected fuel quantity, the third injected fuel quantity, the first injection time, the second injection time, the third injection time and the ignition time being set to the respective base values determined as above, an amount of unburned residue of the first injected fuel represented by M1 in graph of FIG. 22A remains after the ignition of the pre-spray of the first injected fuel. As described above, in the high load range R6, the base first injected fuel quantity Spb, the first injection interval D1i, and the ignition interval Ds are equal to those in the low load range R3. Consequently, the quantity of the unburned residue of the first injected fuel is substantially constant, as in the low load range R3.

Referring back to the flow chart in FIG. 19, after the base first injected fuel quantity Spb, the base second injected fuel quantity Smb, the base third injected fuel quantity Sppb, the base first injection time Tpb, the base second injection time Tmb, the base third injection time Tppb, and the base ignition time Tsb corresponding to the target engine load Qet are calculated in step S303, it is determined in step S304 whether or not the actual boost pressure Pin measured by the pressure sensor 73 is substantially equal to the target boost pressure Pint corresponding to the target engine load Qet calculated in step S101. Thus, the processing executed in step S304 is the same as the processing in step S104. Like in step S104, if the difference between the actual boost pressure Pin and the target boost pressure Pint is in a predetermined range, it may be determined in step S304 that the actual pressure Pin is substantially equal to the target boost pressure Pint. If the determination made in step S304 is affirmative, namely if the operation state of the internal combustion engine 1 is steady-state operation, the processing of step S305 is executed next.

In step S305, the parameters of the combustion control are set to the base values calculated in step S303. Specifically, the first injected fuel quantity Sp, the second injected fuel quantity Sm, the third injected fuel quantity Spp, the first injection time Tp, the second injection time Tm, the third injection time Tpp, and the ignition time Ts are set to the base first injected fuel quantity Spb, the base second injected fuel quantity Smb, the base third injected fuel quantity Sppb, the base first injection time Tpb, the base second injection time Tmb, the base third injection time Tppb, and the base ignition time Tsb calculated in step S303, respectively. Then, in step S306, the first injection, the second injection, and the third injection by the fuel injection valve 6 and ignition by the ignition plug 5 are performed according to the first injected fuel quantity Sp, the second injected fuel quantity Sm, the third injected fuel quantity Spp, the first injection time Tp, the second injection time Tm, the third injection time Tpp, and the ignition time Ts set in step S305. Thereafter, the execution of this process is once terminated.

If the determination made in step S304 is negative, namely if the operation state of the internal combustion engine 1 is transient operation and it is in the response delay period in changing the boost pressure now, the processing of step S307 is executed next. In step S307, it is determined whether or not the actual boost pressure Pin is lower than the target boost pressure Pint. In step S307, the processing same as step S107 is executed. If the determination made in step S307 is affirmative, in other words, if the operation state of the internal combustion engine 1 is accelerating operation, a factor c3 used to calculate a corrected third injected fuel quantity Sppa3 and a corrected third injection time Tppa3 in the accelerating operation state in the high load range is calculated in step S308. The factor c3 is calculated based on the actual boost pressure Pin measured by the pressure sensor 73 and the target boost pressure Pint corresponding to the target engine load Qet calculated in step S101 by the following equation 17:

$$c3 = Pint/Pin \qquad \text{(Equation 17)}.$$

Then, in step S309, the corrected third injected fuel quantity Sppa3 and the corrected third injection time Tppa3 are calculated by the following equations 18 and 19 using the factor c3 calculated in step S308:

$$Sppa3 = Sppb \times c3 \qquad \text{(Equation 18)},$$

and $$Tppa3 = Tppb \times c3 \qquad \text{(Equation 19)}.$$

Then, in step S310, a corrected second injected fuel quantity Sma3 and a corrected second injection time Tma3 are calculated by the following equations 20 and 21:

$$Sma3 = Sat - Spb - Sppa3 \quad \text{(Equation 20)},$$

where Sat is the target total fuel injection quantity (Sat=Spb+Smb+Sppb), and $$Tma3 = Tmb \times (Sma3/Smb) \quad \text{(Equation 21)}.$$

According to the above equations 18 to 21, during the response delay period in changing the boost pressure in the accelerating operation state, in which the actual boost pressure Pin is lower than the target boost pressure Pint, the corrected third injected fuel quantity Sppa3 is larger than the base third injected fuel quantity Sppb, and the corrected second injected fuel quantity Sma3 is smaller than the base second injected fuel quantity Smb. Moreover, the corrected third injection time Tppa3 is larger than its base value. (In other words, the corrected third injection time Tppa3 is earlier than the base third injection time Tppb.) The corrected second injection time Tma3 is smaller than its base value. (In other words, the corrected second injection time Tma3 is later than the base second injection time Tmb.)

Then, in step S311, the first injected fuel quantity Sp, the first injection time Tp, and the ignition time Ts are set to the base first injected fuel quantity Spb, the base first injection time Tpb, and the base ignition time Tsb calculated in step S303 respectively. Thus, the first injected fuel quantity Sp is set to the base first injected fuel quantity Spb even during the response delay period in changing the boost pressure in the accelerating operation state. Consequently, the first injection ratio is set to the value equal to the base first injection ratio for the same total fuel injection quantity in one combustion cycle. Moreover, even during the response delay period in changing the boost pressure in the accelerating operation sate, the first injection time Tp is set to the base first injection time Tpb, and the ignition time Ts is set to the base ignition time Tsb. In step S311, furthermore, the second injected fuel quantity Sm, the third injected fuel quantity Spp, the second injection time Tm, and the third injection time Tpp are set to the corrected second injected fuel quantity Sma3, the corrected third injected fuel quantity Sppa3, the corrected second injection time Tma3, and the corrected third injection time Tppa3 calculated in steps S309 and S310 respectively. Then, in step S312, the first injection, the second injection, and the third injection by the fuel injection valve 6 and ignition by the ignition plug 5 are performed according to the first injected fuel quantity Sp, the second injected fuel quantity Sm, the third injected fuel quantity Spp, the first injection time Tp, the second injection time Tm, the third injection time Tpp and the ignition time Ts set in step S311. Thereafter, the execution of this process is once terminated.

If the determination made in step S307 is negative, it may be concluded that the operation state of the internal combustion engine 1 is decelerating operation. Then, in step S313, a factor c4 used to calculate a corrected third injected fuel quantity Sppa4 and a corrected third injection time Tppa4 in the decelerating operation state in the high load range is calculated. The factor c4 is calculated based on the actual boost pressure Pin measured by the pressure sensor 73 and the target boost pressure Pint corresponding to the target engine load Qet calculated in step S101 by the following equation 22:

$$c4 = Pin/Pint \quad \text{(Equation 22)}.$$

Then, in step S314, the corrected third injected fuel quantity Sppa4 and the corrected third injection time Tppa4 are calculated by the following equations 23 and 24 using the factor c4 calculated in step S313:

$$Sppa4 = Sppb \times c4 \quad \text{(Equation 23)},$$

and $$Tppa4 = Tppb \times c4 \quad \text{(Equation 24)}.$$

Then in step S315, a corrected second injected fuel quantity Sma4 and a corrected second injection time Tma4 are calculated by the following equations 25 and 26:

$$Sma4 = Sat - Spb - Sppa4 \quad \text{(Equation 25)},$$

where Sat is the target total fuel injection quantity (Sat=Spb+Smb+Sppb), and $$Tma4 = Tmb \times (Sma4/Smb) \quad \text{(Equation 26)}.$$

According to the above equations 23 to 26, during the response delay period in changing the boost pressure in the decelerating operation state, in which the actual boost pressure Pin is higher than the target boost pressure Pint, the corrected third injected fuel quantity Sppa4 is larger than the base third injected fuel quantity Sppb, and the corrected second injected fuel quantity Sma4 is smaller than the base second injected fuel quantity Smb. Moreover, the corrected third injection time Tppa4 is larger than its base value. (In other words, the corrected third injection time Tppa4 is earlier than the base third injection time Tppb.) The corrected second injection time Tma4 is smaller than its base value. (In other words, the corrected second injection time Tma4 is later than the base second injection time Tmb.)

Then, in step S316, the first injected fuel quantity Sp, the first injection time Tp, and the ignition time Ts are set to the base first injected fuel quantity Spb, the base first injection time Tpb, and the base ignition time Tsb calculated in step S303 respectively. Thus, the first injected fuel quantity Sp is set to the base first injected fuel quantity Spb even during the response delay period in changing the boost pressure in the decelerating operation state. Consequently, the first injection ratio is set to the value equal to the base first injection ratio for the same total fuel injection quantity in one combustion cycle. Moreover, even during the response delay period in changing the boost pressure in the decelerating operation state, the first injection time Tp is set to the base first injection time Tpb, and the ignition time Ts is set to the base ignition time Tsb. In step S316, furthermore, the second injected fuel quantity Sm, the third injected fuel quantity Spp, the second injection time Tm, and the third injection time Tpp are set to the corrected second injected fuel quantity Sma4, the corrected third injected fuel quantity Sppa4, the corrected second injection time Tma4, and the corrected third injection time Tppa4 calculated in steps S314 and S315 respectively. Then, in step S317, the first injection, the second injection, and the third injection by the fuel injection valve 6 and ignition by the ignition plug 5 are performed according to the first injected fuel quantity Sp, the second injected fuel quantity Sm, the third injected fuel quantity Spp, the first injection time Tp, the second injection time Tm, the third injection time Tpp and the ignition time Ts set in step S316. Thereafter, the execution of this process is once terminated.

According to the above-described control flow, the third injection time is advanced from the base third injection time during the response delay period in changing the boost pressure in the transient operation state in the high load range. However, if the third injection time is too early in the compression stroke, the third injected fuel is likely to adhere to the surface of the cylinder bore. Therefore, in order to reduce the adhesion of the third injected fuel to the bore surface, an upper limit value (maximum advancement) may be set for the third injection time. If the base third injection time Tppb reaches the upper limit value in the course of advancing the base third injection time Tppb in response to increases in the engine load, the base third injection time Tppb is kept at the upper limit value, even when the base third injected fuel quantity Sppb is increased in response to further increases in the engine load. Moreover, when the value of the corrected third injection time Tppa3, Tppa4 calculated by equation 19 or 24 presented above exceeds the upper limit value, the third injection time Tpp is set to this upper limit value.

Equations to be used to calculate corrected values of the parameters used to control the second injection and the third injection in the high load range in this example are not limited to the above equations 17 to 26. In cases where other correction factors and equations are used, the above-described relationships between the base values of the parameters used to control the second injection and the third injection and the corrected values of them also apply during the response delay period in changing the boost pressure in the accelerating operation state, in which the actual boost pressure Pin is lower than the target boost pressure Pint, and during the response delay period in changing the boost pressure in the decelerating operation state, in which the actual boost pressure Pin is higher than the target boost pressure Pint.

In the above-described control flow, corrected values of the parameters used to control the second injection and the third injection are calculated by equations 4 to 15. Alternatively, the values of the parameters corresponding to the actual boost pressure in the transient operation state may be determined by other methods. For example, values of the parameters used to control the second injection and the third injection may be calculated using a plurality of maps corresponding to different boost pressures respectively, as in the alternative method of calculating the corrected values of the parameters of the combustion control described by way of example in the description of example 1.

In the above-described control flow, the parameters used to control the second injection and the third injection are corrected during the time period in which the actual boost pressure during transient operation in the high load range is different from the target boost pressure. However, it is not necessarily required that the parameters used to control the second injection and the third injection be corrected throughout the entirety of the response delay period in changing the boost pressure. In the case where the parameters used to control the second injection and the third injection are corrected in a part of the response delay period in changing the boost pressure in the high load range, improvement of the combustion condition can be achieved during that partial period.

In this example, what are shown in FIGS. 22A and 22B is only exemplary relationships between the engine load of the internal combustion engine 1 and the base values of the parameters of the combustion control, and the relationships between them are not limited to those shown in FIGS. 22A and 22B. For example, in the high load range R6, the base first injected fuel quantity Spb may be fixed at the maximum base first injected fuel quantity SPBmax. Furthermore, in the high load range R6, the base first injected fuel quantity Spb or the base second injected fuel quantity Smb may be increased in response to increases in the engine load within an allowable range, which is determined taking account of the amount of smoke generated and stability of combustion.

Further features of the present invention will become apparent from the following description of exemplary embodiments with reference to the attached drawings.

This application claims the benefits of Japanese Patent Application No. 2014-218251, filed on Oct. 27, 2014, and of Japanese Patent Application No. 2015-179905, filed on Sep. 11, 2015, each of which is hereby incorporated by reference herein in its entirety.

REFERENCE SIGNS LIST

1: internal combustion engine
2: cylinder
3: piston
5: ignition plug
6: fuel injection valve
7: intake port
8: exhaust port
9: intake valve
10: exhaust valve
20: ECU
21: crank position sensor
22: accelerator position sensor
30: turbocharger
30*a*: compressor
30*b*: turbine
71: throttle valve
72: air flow meter
73: pressure sensor
Tp: first injection time
Tm: second injection time
Tpp: third injection time
Ts: ignition time
Di1: first injection interval
Di2: second injection interval
Ds: ignition interval
Sp: first injected fuel quantity
Sm: second injected fuel quantity
Spp: third injected fuel quantity

What is claimed is:

1. A control apparatus for an internal combustion engine comprising:
a supercharger that supercharges intake air of an internal combustion engine;
a fuel injection valve capable of injecting fuel into a combustion chamber of the internal combustion engine;
an ignition plug whose position relative to said fuel injection valve is set in such a way that fuel spray injected through said fuel injection valve passes through an ignition-capable region and the ignition plug can ignite the fuel spray directly; and
a controller comprising at least one processor configured to perform first injection through said fuel injection valve at a first injection time during the compression stroke, ignites pre-spray formed by the first injection by said ignition plug, and starts to perform second injection through said fuel injection valve at a second injection time after the ignition of said pre-spray by said ignition plug and before the top dead center of the compression stroke with a predetermined first injection interval between said first injection time and said second injection time, said first injection interval being set in such a way that combustion of the fuel injected by said second injection is started by flame generated by ignition of said pre-spray, thereby causing self-ignition of fuel to occur and causing at least a portion of fuel injected by said second injection to be burned by diffusion combustion, wherein in a first operation state by which the engine load of the internal combustion engine is changed to a target engine load, said controller performs, in at least a part of a period until the actual boost pressure reaches a target boost pressure corresponding to said target engine load, first fuel injection control in which a first injection ratio, which is defined as the ratio of the fuel injection quantity in said first injection to the total fuel injection quantity in one combustion cycle, is made larger than a base first injection ratio, which is defined as the ratio of the fuel injection quantity in said first injection to the total fuel injection quantity in one combustion cycle in a second operation state in which the engine load of the internal combustion engine is equal to said target engine load and the actual boost pressure is equal to said target boost pressure.

2. A control apparatus for an internal combustion engine according to claim 1, wherein when performing said first fuel injection control, said controller makes said first injection time earlier than a base first injection time, which is defined as the first injection time in said second operation state.

3. A control apparatus for an internal combustion engine according to claim 1, wherein in a high load range in which the engine load of the internal combustion engine is higher than a predetermined load, said controller performs third injection through said fuel injection valve in addition to said first injection and said second injection at a third injection time prior to said first injection time during the compression stroke with a predetermined second injection interval between said first injection and said third injection, said second injection interval being set in such a way that the fuel injected by said third injection is burned by self-ignition or diffusion combustion after the start of said second injection, in said first operation state in an operation range in which the engine load of the internal combustion engine is equal to or lower than said predetermined load, said controller performs said first fuel injection control, and in said first operation state in said high load range, said controller performs second fuel injection control in which said first injection ratio is controlled to a value equal to said base first injection ratio, and a third injection ratio, which is defined as the ratio of the fuel injection quantity in said third injection to the total fuel injection quantity in one combustion cycle, is made higher than a base third injection ratio, which is defined as the ratio of the fuel injection quantity in said third injection to the total fuel injection quantity in one combustion cycle in said second operation state, in at least a part of the period until the actual boost pressure reaches said target boost pressure.

4. A control apparatus for an internal combustion engine according to claim 3, wherein when performing said second fuel injection control, said controller controls said first injection time to a base first injection time, which is defined as the first injection time in said second operation state, and makes said third injection time earlier than a base third injection time, which is defined as the third injection time in said second operation state.

5. A control apparatus for an internal combustion engine according to claim 1, wherein said first operation state is an accelerating operation state in which the engine load of the internal combustion engine is increased.

6. A control apparatus for an internal combustion engine according to claim 1, wherein said first operation state is an decelerating operation state in which the engine load of the internal combustion engine is decreased.

* * * * *